United States Patent
Chen

(10) Patent No.: US 10,432,427 B2
(45) Date of Patent: Oct. 1, 2019

(54) BORDER GATEWAY PROTOCOL FOR COMMUNICATION AMONG SOFTWARE DEFINED NETWORK CONTROLLERS

(71) Applicant: Futurewei Technologies, Inc., Plano, TX (US)

(72) Inventor: Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 289 days.

(21) Appl. No.: 15/446,820

(22) Filed: Mar. 1, 2017

(65) Prior Publication Data

US 2017/0257228 A1 Sep. 7, 2017

Related U.S. Application Data

(60) Provisional application No. 62/303,144, filed on Mar. 3, 2016.

(51) Int. Cl.
*G06F 15/16* (2006.01)
*H04L 12/46* (2006.01)
(Continued)

(52) U.S. Cl.
CPC .......... *H04L 12/4633* (2013.01); *H04L 12/66* (2013.01); *H04L 45/04* (2013.01); *H04L 47/825* (2013.01)

(58) Field of Classification Search
USPC ........................................................ 709/227
See application file for complete search history.

(56) References Cited

U.S. PATENT DOCUMENTS

| 7,701,940 B2 * | 4/2010 | Novello | H04L 47/11 370/229 |
| 9,019,865 B2 * | 4/2015 | Gredler | H04L 45/04 370/254 |

(Continued)

FOREIGN PATENT DOCUMENTS

| CN | 105247826 A | 1/2016 |
| EP | 2784993 A1 | 10/2014 |

(Continued)

OTHER PUBLICATIONS

Chen, et al., "BGP for Communications Among Controllers," draft-chen-idr-com-cntlrs-01, Jan. 5, 2017, 77 pages.

(Continued)

*Primary Examiner* — Alicia Baturay
(74) *Attorney, Agent, or Firm* — Conley Rose, P.C.

(57) ABSTRACT

A first network element comprising a memory comprising instructions executable by a processor and a processor coupled to the memory and configured to execute the instructions. Executing the instructions causes the processor to receive, from a second network element during a border gateway protocol communication session, a communications capabilities message indicating capabilities of the second network element, receive, from the second network element, an advertisement message indicating connections and accesses of a second domain controlled by the second network element, receive a request to route data between a source located in a first domain and a destination, transmit a first request message to the second network element to cause the second network element to compute a path segment through the second domain, and transmit a second request message to create a segment of an end-to-end tunnel between the source and the destination crossing the first domain and the second domain.

17 Claims, 22 Drawing Sheets

(51) Int. Cl.
*H04L 12/66* (2006.01)
*H04L 12/911* (2013.01)
*H04L 12/715* (2013.01)

(56) References Cited

U.S. PATENT DOCUMENTS

| | | | |
|---|---|---|---|
| 9,137,052 B2 * | 9/2015 | Koponen | H04L 12/66 |
| 9,210,075 B2 * | 12/2015 | Bhattacharya | H04L 45/50 |
| 9,331,956 B2 * | 5/2016 | Wang | H04L 47/724 |
| 9,537,753 B2 * | 1/2017 | Alvarez | H04L 41/0803 |
| 10,038,621 B2 * | 7/2018 | Caviglia | H04L 45/44 |
| 10,218,600 B2 * | 2/2019 | Chen | H04L 45/122 |
| 2014/0086253 A1 | 3/2014 | Yong | |
| 2014/0146664 A1 | 5/2014 | Amante | |
| 2014/0161128 A1 | 6/2014 | Dhody et al. | |
| 2014/0201374 A1 | 7/2014 | Ashwood-Smith et al. | |
| 2015/0103844 A1 | 4/2015 | Zhao et al. | |
| 2015/0163151 A1 | 6/2015 | Li | |
| 2015/0215235 A1 | 7/2015 | Li et al. | |
| 2016/0028604 A1 | 1/2016 | Chakrabarti et al. | |
| 2016/0043934 A1 | 2/2016 | Ubaldi et al. | |
| 2016/0269280 A1 * | 9/2016 | Lu | H04L 45/42 |
| 2017/0063685 A1 * | 3/2017 | Vedantham | H04L 45/02 |
| 2017/0223063 A1 * | 8/2017 | Herrero | H04L 63/0272 |

FOREIGN PATENT DOCUMENTS

| | | |
|---|---|---|
| EP | 2892183 A1 | 7/2015 |
| WO | 2017113518 A1 | 7/2017 |

OTHER PUBLICATIONS

Chen, et al., "BGP for Communications Among Controllers," draft-chen-idr-com-sdns-00, Mar. 21, 2016, 77 pages.
Hares, et al., "Administrative Domains and Routing Domains—A Model for Routing in the Internet," RFC 1136, Dec. 1989, 10 pages.
Rekhter, et al., "A Boarder Gateway Protocol 4 (BGP-4)," RFC 1771, Mar. 1995, 57 pages.
Bradner, "Key Words for Use in RFCs to Indicate Requirement Levels," RFC 2119, Mar. 1997, 3 pages.
Chandra, et al., "Capabilities Advertisement with BGP-4," RFC 2842, May 2000, 5 pages.
Bates, et al., "Multiprotocol Extensions for BGP-4," RFC 2858, Jun. 2000, 11 pages.
Rekhter, et al., Carrying Label Information in BGP-4, RFC 3107, May 2001, 8 pages.
Awduche, et al., "RSVP-TE: Extensions to RSVP for LSP Tunnels," RFC 3209, Dec. 2001, 61 pages.
Berger, ED., "Generalized Multi-Protocol Label Switching (GMPLS) Signaling Functional Description," RFC 3471, Jan. 2003, 34 pages.
Berger, ED., "Generalized Multi-Protocol Label Switching (GMPLS) Signaling Resource ReserVation Protocol-Traffic Engineering (RSVP-TE) Extensions," RFC 3473, Jan. 2003, 42 pages.
Kompella, et al., "Signalling Unnumbered Links in Resource ReSerVation Protocol-Traffic Engineering (RSVP-TE)," RFC 3477, Jan. 2003, 9 pages.
Katz, et al., "Traffic Engineering (TE) Extensions to OSPF Version 2," RFC 3630, Sep. 2003, 14 pages.
Pan., ED., et al., "Fast Reroute Extensions to RSVP-TE for LSP Tunnels," RFC 4090, May 2005, 38 pages.
Rekhter, ED, et al., "A Boarder Gateway Protocol 4 (BGP-4)," RFC 4271, Jan. 2006, 104 pages.
Bates, et al., "Multiprotocol Extensions for BGP-4," RFC 4760, Jan. 2007, 12 pages.
Li, et al., "IS-IS Extensions for Traffic Engineering," RFC 5305, Oct. 2008, 17 pages.
Chen, et al., "ISIS Extensions in Support of Inter-Autonomous Systems (AS) MPLS and GMPLS Traffic Engineering," RFC 5316, Dec. 2008, 19 pages.
Chen, et al., "OSPF Extensions in Support of Inter-Autonomous System (AS) MPLS and GMPLS Traffic Engineering," RFC 5392, Jan. 2009, 17 pages.
Scudder, et al., "Capabilities Advertisement with BGP-4," RFC 5492, Feb. 2009, 7 pages.
King, ED., et al., "The Application of the Path Computation Element Architecture to the Determination of a Sequence of Domains in MPLS and GMPLS," RFC 6805, Nov. 2012, 33 pages.
Foreign Communication From A Counterpart Application, PCT Application No. PCT/CN2017/075487, English Translation of International Search Report dated May 22, 2017, 4 pages.
Tekalp, A., M., "Video Services over Software-Defined Networks," XP055405632, Dec. 6, 2013, 26 pages.
Zhao, Y., et al., "Experimental Demonstration of Hierarchical Controlled Software Defined Networking (HC-SDN) Deployed with PCE Protocol for Large Scale Multi-domain Flexi-Grid Optical Networks," XP055405614, Asia Communications and Photonics Conference, Nov. 15, 2013, 4 pages.
Civanlar, S., et al., "Distributed management of service-enabled flow-paths across multiple SDN domains," XP033192792, European Conference on Networks and Communications (EUCNC), Jun. 29, 2015, pp. 360-364.
Soheil, Y., et al., "Kandoo: A Framework for Efficient and Scalable Offloading of Control Applications," XP058008058, Hot Topics in Software Defined Networks, Aug. 13, 2012, pp. 19-24.
Vilalta, R., et al., "Hierarchical SDN Orchestration for Multi-technology Multi-domain Networks with Hierarchical ABNO," XP032820138, European Conference on Optical Communication (ECOC), Sep. 27, 2015, 4 pages.
Foreign Communication From A Counterpart Application, European Application No. 17759276.3, Extended European Search Report dated Feb. 18, 2019, 14 pages.

* cited by examiner

```
1200
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Type (6)       1210 |         Length (4)       1220 |
+-+-+-+-+-+-+-+-+-+-+-+-+-+-+-+-+-+-+-+-+-+-+-+-+-+-+-+-+-+-+-+-+
|                  Inter-Domain Link Type                  1230 |
+-+-+-+-+-+-+-+-+-+-+-+-+-+-+-+-+-+-+-+-+-+-+-+-+-+-+-+-+-+-+-+-+
```

*FIG. 12*

```
1300
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Type (7)       1310 |         Length (4)       1320 |
+-+-+-+-+-+-+-+-+-+-+-+-+-+-+-+-+-+-+-+-+-+-+-+-+-+-+-+-+-+-+-+-+
|                     Remote AS Number                     1330 |
+-+-+-+-+-+-+-+-+-+-+-+-+-+-+-+-+-+-+-+-+-+-+-+-+-+-+-+-+-+-+-+-+
```

*FIG. 13*

```
1400
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Type (8)       1410 |         Length (4)       1420 |
+-+-+-+-+-+-+-+-+-+-+-+-+-+-+-+-+-+-+-+-+-+-+-+-+-+-+-+-+-+-+-+-+
|                        Area Number                       1430 |
+-+-+-+-+-+-+-+-+-+-+-+-+-+-+-+-+-+-+-+-+-+-+-+-+-+-+-+-+-+-+-+-+
```

*FIG. 14*

```
1500
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Type (9)       1510 |         Length (4)       1520 |
+-+-+-+-+-+-+-+-+-+-+-+-+-+-+-+-+-+-+-+-+-+-+-+-+-+-+-+-+-+-+-+-+
|                       OSPF Router ID                     1530 |
+-+-+-+-+-+-+-+-+-+-+-+-+-+-+-+-+-+-+-+-+-+-+-+-+-+-+-+-+-+-+-+-+
```

*FIG. 15*

```
1600
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Type (10)      1610 |         Length (4)       1620 |
+-+-+-+-+-+-+-+-+-+-+-+-+-+-+-+-+-+-+-+-+-+-+-+-+-+-+-+-+-+-+-+-+
|                         ISO Node-ID                      1630 ~
+-+-+-+-+-+-+-+-+-+-+-+-+-+-+-+-+-+-+-+-+-+-+-+-+-+-+-+-+-+-+-+-+
```

*FIG. 16*

```
1700
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |         Type (11)        1710 |         Length         1720  |
 +-+-+-+-+-+-+-+-+-+-+-+-+-+-+-+-+-+-+-+-+-+-+-+-+-+-+-+-+-+-+-+-+
 |                  IPv4 Remote ASBR ID                   1730  |
 +-+-+-+-+-+-+-+-+-+-+-+-+-+-+-+-+-+-+-+-+-+-+-+-+-+-+-+-+-+-+-+-+
```

*FIG. 17*

```
1800
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |         Type (13)        1810 |         Length         1820  |
 +-+-+-+-+-+-+-+-+-+-+-+-+-+-+-+-+-+-+-+-+-+-+-+-+-+-+-+-+-+-+-+-+
 |            Local Interface IPv4 Address(es)                  |
 ~                                                        1830  ~
 +-+-+-+-+-+-+-+-+-+-+-+-+-+-+-+-+-+-+-+-+-+-+-+-+-+-+-+-+-+-+-+-+
```

*FIG. 18*

```
1900
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |         Type (15)        1910 |         Length         1920  |
 +-+-+-+-+-+-+-+-+-+-+-+-+-+-+-+-+-+-+-+-+-+-+-+-+-+-+-+-+-+-+-+-+
 |           Neighbor Interface IPv4 Address(es)                |
 ~                                                        1930  ~
 +-+-+-+-+-+-+-+-+-+-+-+-+-+-+-+-+-+-+-+-+-+-+-+-+-+-+-+-+-+-+-+-+
```

*FIG. 19*

```
2000
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |       Type (tTBD3)       2010 |         Length         2020  |
 +-+-+-+-+-+-+-+-+-+-+-+-+-+-+-+-+-+-+-+-+-+-+-+-+-+-+-+-+-+-+-+-+
 |                       AS Number                        2030  |
 +-+-+-+-+-+-+-+-+-+-+-+-+-+-+-+-+-+-+-+-+-+-+-+-+-+-+-+-+-+-+-+-+
 |                    Area-ID Sub-TLV                           |
 ~                                                        2040  ~
 +-+-+-+-+-+-+-+-+-+-+-+-+-+-+-+-+-+-+-+-+-+-+-+-+-+-+-+-+-+-+-+-+
 |                Access IPv4 Prefix Sub-TLVs                   |
 ~                                                        2050  ~
 +-+-+-+-+-+-+-+-+-+-+-+-+-+-+-+-+-+-+-+-+-+-+-+-+-+-+-+-+-+-+-+-+
```

*FIG. 20*

```
2400
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |       Type (tTBD16)   2410 |         Length          2420 |
 +-+-+-+-+-+-+-+-+-+-+-+-+-+-+-+-+-+-+-+-+-+-+-+-+-+-+-+-+-+-+-+-+
 |                       Tunnel ID                       2430 |
 +-+-+-+-+-+-+-+-+-+-+-+-+-+-+-+-+-+-+-+-+-+-+-+-+-+-+-+-+-+-+-+-+
 |          Path ID   2440 |          Reserved         2450 |
 +-+-+-+-+-+-+-+-+-+-+-+-+-+-+-+-+-+-+-+-+-+-+-+-+-+-+-+-+-+-+-+-+
 ~                    Optional Sub-TLVs                  2460 ~
 +-+-+-+-+-+-+-+-+-+-+-+-+-+-+-+-+-+-+-+-+-+-+-+-+-+-+-+-+-+-+-+-+
```

*FIG. 24*

```
2500
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |       Type (tTBD11)   2510 |         Length          2520 |
 +-+-+-+-+-+-+-+-+-+-+-+-+-+-+-+-+-+-+-+-+-+-+-+-+-+-+-+-+-+-+-+-+
 |           Exception Node 1 IPv4 Address              2530 |
 +-+-+-+-+-+-+-+-+-+-+-+-+-+-+-+-+-+-+-+-+-+-+-+-+-+-+-+-+-+-+-+-+
 |                       . . . . . .                          |
 ~                                                            ~
 +-+-+-+-+-+-+-+-+-+-+-+-+-+-+-+-+-+-+-+-+-+-+-+-+-+-+-+-+-+-+-+-+
 |           Exception Node n IPv4 Address              2530 |
 +-+-+-+-+-+-+-+-+-+-+-+-+-+-+-+-+-+-+-+-+-+-+-+-+-+-+-+-+-+-+-+-+
```

*FIG. 25*

```
2600
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |       Type (tTBD22)   2610 |         Length          2620 |
 +-+-+-+-+-+-+-+-+-+-+-+-+-+-+-+-+-+-+-+-+-+-+-+-+-+-+-+-+-+-+-+-+
 |                       Bandwidth                       2630 |
 +-+-+-+-+-+-+-+-+-+-+-+-+-+-+-+-+-+-+-+-+-+-+-+-+-+-+-+-+-+-+-+-+
```

*FIG. 26*

```
3000
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Type (3)       3010 |          Length        3020 |
+-+-+-+-+-+-+-+-+-+-+-+-+-+-+-+-+-+-+-+-+-+-+-+-+-+-+-+-+-+-+-+-+
|                 Autonomous System Number              3030 |
+-+-+-+-+-+-+-+-+-+-+-+-+-+-+-+-+-+-+-+-+-+-+-+-+-+-+-+-+-+-+-+-+
```

*FIG. 30*

```
3100
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        Type (tTBD7)     3110 |          Length        3120 |
+-+-+-+-+-+-+-+-+-+-+-+-+-+-+-+-+-+-+-+-+-+-+-+-+-+-+-+-+-+-+-+-+
|              Destination Node 1 IPv4 Address          3130 |
+-+-+-+-+-+-+-+-+-+-+-+-+-+-+-+-+-+-+-+-+-+-+-+-+-+-+-+-+-+-+-+-+
|                    . . . . . .                             |
~                                                            ~
+-+-+-+-+-+-+-+-+-+-+-+-+-+-+-+-+-+-+-+-+-+-+-+-+-+-+-+-+-+-+-+-+
|              Destination Node n IPv4 Address          3130 |
+-+-+-+-+-+-+-+-+-+-+-+-+-+-+-+-+-+-+-+-+-+-+-+-+-+-+-+-+-+-+-+-+
```

*FIG. 31*

```
3200
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        NLRI-Type (2)    3210 |        NLRI-Length     3220 |
+-+-+-+-+-+-+-+-+-+-+-+-+-+-+-+-+-+-+-+-+-+-+-+-+-+-+-+-+-+-+-+-+
~          Controller Request Parameters (variable)     3230 ~
+-+-+-+-+-+-+-+-+-+-+-+-+-+-+-+-+-+-+-+-+-+-+-+-+-+-+-+-+-+-+-+-+
~                  Start-Node (variable)                3240 ~
+-+-+-+-+-+-+-+-+-+-+-+-+-+-+-+-+-+-+-+-+-+-+-+-+-+-+-+-+-+-+-+-+
~                Tunnel-ID-Info (variable)              3250 ~
+-+-+-+-+-+-+-+-+-+-+-+-+-+-+-+-+-+-+-+-+-+-+-+-+-+-+-+-+-+-+-+-+
~               Segment End List (variable)             3260 ~
+-+-+-+-+-+-+-+-+-+-+-+-+-+-+-+-+-+-+-+-+-+-+-+-+-+-+-+-+-+-+-+-+
~                  Metric List (variable)               3270 ~
+-+-+-+-+-+-+-+-+-+-+-+-+-+-+-+-+-+-+-+-+-+-+-+-+-+-+-+-+-+-+-+-+
~                   No Path (variable)                  3280 ~
+-+-+-+-+-+-+-+-+-+-+-+-+-+-+-+-+-+-+-+-+-+-+-+-+-+-+-+-+-+-+-+-+
```

*FIG. 32*

```
3900
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         NLRI-Type (7)   3910 |         NLRI-Length     3920  |
+-+-+-+-+-+-+-+-+-+-+-+-+-+-+-+-+-+-+-+-+-+-+-+-+-+-+-+-+-+-+-+-+
~            Controller Request Parameters (variable)    3930  ~
+-+-+-+-+-+-+-+-+-+-+-+-+-+-+-+-+-+-+-+-+-+-+-+-+-+-+-+-+-+-+-+-+
~                   Tunnel-ID-Info (variable)            3940  ~
+-+-+-+-+-+-+-+-+-+-+-+-+-+-+-+-+-+-+-+-+-+-+-+-+-+-+-+-+-+-+-+-+
~                      Start-Node (variable)             3950  ~
+-+-+-+-+-+-+-+-+-+-+-+-+-+-+-+-+-+-+-+-+-+-+-+-+-+-+-+-+-+-+-+-+
~                       End-Node (variable)              3960  ~
+-+-+-+-+-+-+-+-+-+-+-+-+-+-+-+-+-+-+-+-+-+-+-+-+-+-+-+-+-+-+-+-+
~                        Label (variable)                3970  ~
+-+-+-+-+-+-+-+-+-+-+-+-+-+-+-+-+-+-+-+-+-+-+-+-+-+-+-+-+-+-+-+-+
~                      Interface (variable)              3980  ~
+-+-+-+-+-+-+-+-+-+-+-+-+-+-+-+-+-+-+-+-+-+-+-+-+-+-+-+-+-+-+-+-+
```

*FIG. 39*

```
4000
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       Type (tTBD18)    4010 |         Length          4020  |
+-+-+-+-+-+-+-+-+-+-+-+-+-+-+-+-+-+-+-+-+-+-+-+-+-+-+-+-+-+-+-+-+
|                        (top label)                     4030  |
+-+-+-+-+-+-+-+-+-+-+-+-+-+-+-+-+-+-+-+-+-+-+-+-+-+-+-+-+-+-+-+-+
```

*FIG. 40*

```
4100
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       Type (tTBD19)    4110 |         Length          4120  |
+-+-+-+-+-+-+-+-+-+-+-+-+-+-+-+-+-+-+-+-+-+-+-+-+-+-+-+-+-+-+-+-+
|                      Interface Index                   4130  |
+-+-+-+-+-+-+-+-+-+-+-+-+-+-+-+-+-+-+-+-+-+-+-+-+-+-+-+-+-+-+-+-+
```

*FIG. 41*

```
4200
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       Type (tTBD20)    4210 |         Length          4220  |
+-+-+-+-+-+-+-+-+-+-+-+-+-+-+-+-+-+-+-+-+-+-+-+-+-+-+-+-+-+-+-+-+
|                   Interface IPv4 Address               4230  |
+-+-+-+-+-+-+-+-+-+-+-+-+-+-+-+-+-+-+-+-+-+-+-+-+-+-+-+-+-+-+-+-+
```

*FIG. 42*

```
4300
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         NLRI-Type (8)      4310 |         NLRI-Length   4320  |
+-+-+-+-+-+-+-+-+-+-+-+-+-+-+-+-+-+-+-+-+-+-+-+-+-+-+-+-+-+-+-+-+
~            Controller Request Parameters (variable)  4330    ~
+-+-+-+-+-+-+-+-+-+-+-+-+-+-+-+-+-+-+-+-+-+-+-+-+-+-+-+-+-+-+-+-+
~                   Tunnel-ID-Info (variable)          4340    ~
+-+-+-+-+-+-+-+-+-+-+-+-+-+-+-+-+-+-+-+-+-+-+-+-+-+-+-+-+-+-+-+-+
~                       Status (variable)              4350    ~
+-+-+-+-+-+-+-+-+-+-+-+-+-+-+-+-+-+-+-+-+-+-+-+-+-+-+-+-+-+-+-+-+
~                       Label (variable)               4360    ~
+-+-+-+-+-+-+-+-+-+-+-+-+-+-+-+-+-+-+-+-+-+-+-+-+-+-+-+-+-+-+-+-+
~                     Interface (variable)             4370    ~
+-+-+-+-+-+-+-+-+-+-+-+-+-+-+-+-+-+-+-+-+-+-+-+-+-+-+-+-+-+-+-+-+
~               Error Code and Reasons (variable)      4380    ~
+-+-+-+-+-+-+-+-+-+-+-+-+-+-+-+-+-+-+-+-+-+-+-+-+-+-+-+-+-+-+-+-+
```

*FIG. 43*

```
4400
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         NLRI-Type (9)      4410 |         NLRI-Length   4420  |
+-+-+-+-+-+-+-+-+-+-+-+-+-+-+-+-+-+-+-+-+-+-+-+-+-+-+-+-+-+-+-+-+
~            Controller Request Parameters (variable)  4430    ~
+-+-+-+-+-+-+-+-+-+-+-+-+-+-+-+-+-+-+-+-+-+-+-+-+-+-+-+-+-+-+-+-+
~                   Tunnel-ID-Info (variable)          4440    ~
+-+-+-+-+-+-+-+-+-+-+-+-+-+-+-+-+-+-+-+-+-+-+-+-+-+-+-+-+-+-+-+-+
```

*FIG. 44*

```
4500
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         NLRI-Type (10)     4510 |         NLRI-Length   4520  |
+-+-+-+-+-+-+-+-+-+-+-+-+-+-+-+-+-+-+-+-+-+-+-+-+-+-+-+-+-+-+-+-+
~            Controller Request Parameters (variable)  4530    ~
+-+-+-+-+-+-+-+-+-+-+-+-+-+-+-+-+-+-+-+-+-+-+-+-+-+-+-+-+-+-+-+-+
~                   Tunnel-ID-Info (variable)          4540    ~
+-+-+-+-+-+-+-+-+-+-+-+-+-+-+-+-+-+-+-+-+-+-+-+-+-+-+-+-+-+-+-+-+
~                       Status (variable)              4560    ~
+-+-+-+-+-+-+-+-+-+-+-+-+-+-+-+-+-+-+-+-+-+-+-+-+-+-+-+-+-+-+-+-+
~               Error Code and Reasons (variable)      4570    ~
+-+-+-+-+-+-+-+-+-+-+-+-+-+-+-+-+-+-+-+-+-+-+-+-+-+-+-+-+-+-+-+-+
```

*FIG. 45*

```
4800
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       Type (tTBD25)   4810 |          Length          4820 |
+-+-+-+-+-+-+-+-+-+-+-+-+-+-+-+-+-+-+-+-+-+-+-+-+-+-+-+-+-+-+-+-+
~                       ER Sub-TLV                        4830 ~
+-+-+-+-+-+-+-+-+-+-+-+-+-+-+-+-+-+-+-+-+-+-+-+-+-+-+-+-+-+-+-+-+
~                      SER Sub-TLV                        4840 ~
+-+-+-+-+-+-+-+-+-+-+-+-+-+-+-+-+-+-+-+-+-+-+-+-+-+-+-+-+-+-+-+-+
~                          . . . . .                           ~
~                                                              ~
+-+-+-+-+-+-+-+-+-+-+-+-+-+-+-+-+-+-+-+-+-+-+-+-+-+-+-+-+-+-+-+-+
~                      SER Sub-TLV                        4840 ~
+-+-+-+-+-+-+-+-+-+-+-+-+-+-+-+-+-+-+-+-+-+-+-+-+-+-+-+-+-+-+-+-+
```

*FIG. 48*

```
4900
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       Type (1)        4910 |          Length          4920 |
+-+-+-+-+-+-+-+-+-+-+-+-+-+-+-+-+-+-+-+-+-+-+-+-+-+-+-+-+-+-+-+-+
~                      Node Sub-TLV                       4930 ~
+-+-+-+-+-+-+-+-+-+-+-+-+-+-+-+-+-+-+-+-+-+-+-+-+-+-+-+-+-+-+-+-+
~                          . . . . .                           ~
~                                                              ~
+-+-+-+-+-+-+-+-+-+-+-+-+-+-+-+-+-+-+-+-+-+-+-+-+-+-+-+-+-+-+-+-+
~                      Node Sub-TLV                       4930 ~
+-+-+-+-+-+-+-+-+-+-+-+-+-+-+-+-+-+-+-+-+-+-+-+-+-+-+-+-+-+-+-+-+
~                   Cost2Node Sub-TLV                     4940 ~
+-+-+-+-+-+-+-+-+-+-+-+-+-+-+-+-+-+-+-+-+-+-+-+-+-+-+-+-+-+-+-+-+
```

*FIG. 49*

```
5000
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       Type (2)        5010 |          Length          5020 |
+-+-+-+-+-+-+-+-+-+-+-+-+-+-+-+-+-+-+-+-+-+-+-+-+-+-+-+-+-+-+-+-+
~                      Node Sub-TLV                       5030 ~
+-+-+-+-+-+-+-+-+-+-+-+-+-+-+-+-+-+-+-+-+-+-+-+-+-+-+-+-+-+-+-+-+
~                          . . . . .                           ~
~                                                              ~
+-+-+-+-+-+-+-+-+-+-+-+-+-+-+-+-+-+-+-+-+-+-+-+-+-+-+-+-+-+-+-+-+
~                      Node Sub-TLV                       5030 ~
+-+-+-+-+-+-+-+-+-+-+-+-+-+-+-+-+-+-+-+-+-+-+-+-+-+-+-+-+-+-+-+-+
~                   Cost2Node Sub-TLV                     5040 ~
+-+-+-+-+-+-+-+-+-+-+-+-+-+-+-+-+-+-+-+-+-+-+-+-+-+-+-+-+-+-+-+-+
```

*FIG. 50*

```
5100
   0                   1                   2                   3
   0 1 2 3 4 5 6 7 8 9 0 1 2 3 4 5 6 7 8 9 0 1 2 3 4 5 6 7 8 9 0 1
  +-+-+-+-+-+-+-+-+-+-+-+-+-+-+-+-+-+-+-+-+-+-+-+-+-+-+-+-+-+-+-+-+
  |           Type (4)      5110 |           Length        5120 |
  +-+-+-+-+-+-+-+-+-+-+-+-+-+-+-+-+-+-+-+-+-+-+-+-+-+-+-+-+-+-+-+-+
  |                           Cost                          5130 |
  +-+-+-+-+-+-+-+-+-+-+-+-+-+-+-+-+-+-+-+-+-+-+-+-+-+-+-+-+-+-+-+-+
```

*FIG. 51*

```
5200
   0                   1                   2                   3
   0 1 2 3 4 5 6 7 8 9 0 1 2 3 4 5 6 7 8 9 0 1 2 3 4 5 6 7 8 9 0 1
  +-+-+-+-+-+-+-+-+-+-+-+-+-+-+-+-+-+-+-+-+-+-+-+-+-+-+-+-+-+-+-+-+
  |        Type (tTBD13)   5210 |           Length        5220 |
  +-+-+-+-+-+-+-+-+-+-+-+-+-+-+-+-+-+-+-+-+-+-+-+-+-+-+-+-+-+-+-+-+
  ~            IPv4 Candidate-Node Sub-TLV                  5230 ~
  +-+-+-+-+-+-+-+-+-+-+-+-+-+-+-+-+-+-+-+-+-+-+-+-+-+-+-+-+-+-+-+-+
  |                      . . . . . .                             |
  ~                                                              ~
  +-+-+-+-+-+-+-+-+-+-+-+-+-+-+-+-+-+-+-+-+-+-+-+-+-+-+-+-+-+-+-+-+
  ~            IPv4 Candidate-Node Sub-TLV                  5230 ~
  +-+-+-+-+-+-+-+-+-+-+-+-+-+-+-+-+-+-+-+-+-+-+-+-+-+-+-+-+-+-+-+-+
```

*FIG. 52*

```
5300
   0                   1                   2                   3
   0 1 2 3 4 5 6 7 8 9 0 1 2 3 4 5 6 7 8 9 0 1 2 3 4 5 6 7 8 9 0 1
  +-+-+-+-+-+-+-+-+-+-+-+-+-+-+-+-+-+-+-+-+-+-+-+-+-+-+-+-+-+-+-+-+
  |           Type (1)      5310 |           Length        5320 |
  +-+-+-+-+-+-+-+-+-+-+-+-+-+-+-+-+-+-+-+-+-+-+-+-+-+-+-+-+-+-+-+-+
  |              Candidate-Node IPv4 Address                5330 |
  +-+-+-+-+-+-+-+-+-+-+-+-+-+-+-+-+-+-+-+-+-+-+-+-+-+-+-+-+-+-+-+-+
  |              Previous-Hop Node IPv4 Address             5340 |
  +-+-+-+-+-+-+-+-+-+-+-+-+-+-+-+-+-+-+-+-+-+-+-+-+-+-+-+-+-+-+-+-+
  |                    Candidate-Node Cost                  5350 |
  +-+-+-+-+-+-+-+-+-+-+-+-+-+-+-+-+-+-+-+-+-+-+-+-+-+-+-+-+-+-+-+-+
```

*FIG. 53*

```
5700
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Type (3)    5710 |          Length         5720 |
+-+-+-+-+-+-+-+-+-+-+-+-+-+-+-+-+-+-+-+-+-+-+-+-+-+-+-+-+-+-+-+-+
|            From Controller IPv4 Address            | 5730
+-+-+-+-+-+-+-+-+-+-+-+-+-+-+-+-+-+-+-+-+-+-+-+-+-+-+-+-+-+-+-+-+
~                  (Optional Sub-TLVs)                 5740 ~
+-+-+-+-+-+-+-+-+-+-+-+-+-+-+-+-+-+-+-+-+-+-+-+-+-+-+-+-+-+-+-+-+
```

*FIG. 57*

```
5800
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Type (5)    5810 |          Length         5820 |
+-+-+-+-+-+-+-+-+-+-+-+-+-+-+-+-+-+-+-+-+-+-+-+-+-+-+-+-+-+-+-+-+
|           Target Controller IPv4 Address           | 5830
+-+-+-+-+-+-+-+-+-+-+-+-+-+-+-+-+-+-+-+-+-+-+-+-+-+-+-+-+-+-+-+-+
~                  (Optional Sub-TLVs)                 5840 ~
+-+-+-+-+-+-+-+-+-+-+-+-+-+-+-+-+-+-+-+-+-+-+-+-+-+-+-+-+-+-+-+-+
```

*FIG. 58*

BORDER GATEWAY PROTOCOL FOR COMMUNICATION AMONG SOFTWARE DEFINED NETWORK CONTROLLERS

CROSS-REFERENCE TO RELATED APPLICATIONS

The present application claims priority to U.S. Provisional Patent Application No. 62/303,144 filed Mar. 3, 2016 by Huaimo Chen and entitled "Border Gateway Protocol for Communication Among Software Defined Network Controllers," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A network domain is a collection of network elements within a common sphere of address management or routing procedure which are operated by a single organization or administrative authority. Examples of such domains include interior gateway protocol (IGP) areas, such as Open Shortest Path First (OSPF) and Intermediate System to Intermediate System (ISIS) areas, and Autonomous Systems. A network running a Border Gateway Protocol (BGP) is organized as multiple Autonomous Systems, each of which has a number of IGP areas. The concepts of Software Defined Networks (SDN) reduce the overall network Capital Expenditure (CapEx) and Operational Expenditure (OpEx), whilst facilitating the deployment of services and enabling new features. The principles of SDN include centralized control to allow optimized usage of network resources and provisioning of network elements across domains.

For a network with a number of domains, multiple SDN controllers may be employed with each of the domains in the network controlled by an SDN controller. Architectures of controllers for achieving a centralized control on the network include a hierarchical architecture, a distributed architecture, and a hybrid of a hierarchical and a distributed architecture of controllers. At a top level of a hierarchical architecture is a parent controller that is not a child controller. The parent controller controls a number of child controllers, some of which are not parent controllers, and each of which controls a domain. At lower levels of the hierarchical architecture, some child controllers are both parent controllers and child controllers, each of which controls multiple child controllers, and so on.

SUMMARY

In a distributed architecture of controllers, there are a number of controllers, each of which controls a domain of a multi-domain network. The controllers are interconnected and therefore adjacent to each other. The distributed controllers coordinate to control the network. However, existing communication protocols lack support for communications among Software Defined Network (SDN) controllers. The inventive concepts disclosed herein solve the problem of the prior art by extending a Border Gateway Protocol (BGP) to support communications among SDN controllers.

In an embodiment, the disclosure includes a first network element comprising a memory comprising instructions executable by a processor and a processor coupled to the memory and configured to execute the instructions. Executing the instructions causes the processor to receive, from a second network element during a BGP communication session, a communications capabilities message indicating capabilities of the second network element, receive, from the second network element, an advertisement message indicating connections and accesses of a second domain controlled by the second network element, receive a request to route data between a source located in a first domain and a destination, transmit a first request message to the second network element to cause the second network element to compute a path segment through the second domain, and transmit a second request message to create an end-to-end (E2E) tunnel between the source and the destination crossing the first domain and the second domain.

Optionally, in any of the preceding embodiments, the first request message is a Request for Computing Path Segment (CPSReq), the first network element is a parent controller of the second network element, and the processor further receives, from the second network element, a Reply for Computing Path Segment (CPSRep) containing information relating to the path segment requested for computation according to the CPSReq. Optionally, in any of the preceding embodiments, the first request message is a first Request for Growing Shortest Path Tree (SPT) (GSReq), and the processor further receives, from the second network element, a Reply for Growing SPT (GSRep) containing information relating to the path segment and growing a SPT requested for computation according to the GSReq. Optionally, in any of the preceding embodiments, transmitting the first request message to the second network element causes the second network element to transmit a second GSReq to a third network element controlling a third domain after computing the path segment and growing the SPT according to the first GSReq when the destination is not located in the second domain. Optionally, in any of the preceding embodiments, the destination is located in the third domain, the first network element transmits the second request message to the third network element to cause the third network element to create a first tunnel segment of the E2E tunnel crossing the third domain, and the first network element transmits a third request message to the second network element to cause the second network to create a second tunnel segment of the E2E tunnel crossing the second domain. Optionally, in any of the preceding embodiments, the destination is located in the third domain and the first network element transmits the second request message to the third network element to cause the third network element to create a first tunnel segment of the E2E tunnel crossing the third domain and transmit a third request message to the second network element to cause the second network to create a second tunnel segment of the E2E tunnel crossing the second domain. Optionally, in any of the preceding embodiments, the destination is located in the third domain and transmitting the second request message includes a flag in the first request message that instructs the third network controller to create a first tunnel segment of the E2E tunnel crossing the third domain after a shortest path between the source and the destination is determined and transmit a third request message to the second network element to cause the second network to create a second tunnel segment of the E2E tunnel crossing the second domain after the third network element creates the first tunnel segment. Optionally, in any of the preceding embodiments, receiving the communications capabilities message comprises receiving an Open Message comprising a communications among SDN controllers (CSC) capability triplet and the CSC capability triplet comprises a plurality of capability flags configured to convey capabilities of the second network element. Optionally, in any of the preceding embodiments, the capability flags comprise a Path Segments flag configured to indicate support for computing path segments in a SDN communicating according to BGP, a Tunnel Segment flag configured to indicate support for creating tunnel segments in the SDN communicating according to BGP, an E2E Tunnel flag configured to indicate support for creating and maintaining an E2E label switched path (LSP) tunnel in the SDN communicating according to BGP, a Parent Controller flag configured to indicate functionality as a parent controller in the SDN communicating according to BGP, a Child Controller flag configured to indicate functionality as a child controller in the SDN communicating according to BGP, a Distributed Controller flag configured to indicate functionality as a distributed controller in the SDN communicating according to BGP, and a plurality of Level flags configured to collectively indicate a hierarchical level of the second network element when the SDN is a hierarchical SDN control system. Optionally, in any of the preceding embodiments, the first request message and the second request message each comprise a Controller Request Parameters (CRP) type-length-value (TLV). Optionally, in any of the preceding embodiments, the CRP TLV specifies an optimization scheme for segments created according to the first request message and the second request message and a responsibility of distributed controllers in a SDN when the SDN is a distributed SDN control system.

In an embodiment, the disclosure includes a first network element configured to control a first domain, the first network element comprising a memory comprising instructions executable by a processor and a processor coupled to the memory and configured to execute the instructions. Executing the instructions causes the processor to transmit, to a second network element during a BGP communication session, a communication capabilities message indicating capabilities of the first network element, transmit an advertisement message to the second network element, wherein the advertisement message indicates connections and accesses of the first domain, receive a first request message that instructs the first network element to compute path segments for use in creating an E2E tunnel, wherein each path segment connects one edge node of the first domain to another edge node of the first domain, compute the path segments according to the first request message, receive a second request message that instructs the first network element to create a first tunnel segment through the first domain for use in the E2E tunnel, wherein the second request message indicates at least a start node and an end node for the tunnel segment, and create the first tunnel segment according to the second request message.

Optionally, in any of the preceding embodiments, a destination of the E2E tunnel is located in a second domain controlled by a third network element, wherein the first network element receives the first request message from the second network element, and wherein the first network element receives the second request message from the third network element. Optionally, in any of the preceding embodiments, a destination of the E2E tunnel is located in the first domain, wherein a shortest path from a source of the E2E tunnel to the destination of the E2E tunnel crosses a third domain controlled by a third network element, and wherein the processor further transmits, to the third network element, a third request message to cause the third network to create a second tunnel segment of the E2E tunnel crossing the third domain after the first network element creates the first tunnel segment. Optionally, in any of the preceding embodiments, transmitting the communication capabilities message comprises transmitting an Open Message comprising a CSC capability triplet, and wherein the CSC capability triplet comprises a plurality of capability flags configured to convey capabilities of the first network element.

In an embodiment, the disclosure includes a network element implemented method of communication among SDN controllers communicating according to a BGP, comprising declaring capabilities of the network element in a SDN according to a CSC capability triplet included in an Open Message, computing a path segment in the SDN for use in creating an E2E tunnel, and creating a first tunnel segment corresponding to the path segment in the SDN, wherein the first tunnel segment forms a portion of the E2E tunnel.

Optionally, in any of the preceding embodiments, the method further includes receiving a request for GSReq, computing the path segment in the SDN for use in creating the E2E tunnel in response to the GSReq, growing a SPT based on the puted path segment and in response to the GSReq, receiving a first request to create a first tunnel segment, and creating the first tunnel segment corresponding to the path segment in the SDN in response to the request to create the first tunnel segment. Optionally, in any of the preceding embodiments, the method further includes transmitting a second request to create a second tunnel segment to a controller of an upstream domain along a path of the E2E tunnel. Optionally, in any of the preceding embodiments, the method further includes creating the first tunnel segment corresponding to the path segment in the SDN automatically after a shortest path from a source of the E2E tunnel to a destination of the E2E tunnel is computed, and transmitting a request to create a second tunnel segment to a controller of an upstream domain along a path of the E2E tunnel. Optionally, in any of the preceding embodiments, the method further includes receiving an advertisement message indicating connections and accesses of a domain in the SDN.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 12 is an embodiment of an Inter-Domain Link Type Sub-TLV.

FIG. 13 is an embodiment of a Remote Autonomous System (AS) Number Sub-TLV.

FIG. 14 is an embodiment of a Remote Area-ID Sub-TLV.

FIG. 15 is an embodiment of a Remote OSPF Router-ID Sub-TLV.

FIG. 16 is an embodiment of a Remote ISIS Router-ID Sub-TLV.

FIG. 17 is an embodiment of an Internet Protocol version 4 (IPv4) Remote Autonomous System Boundary Router (ASBR) ID Sub-TLV.

FIG. 18 is an embodiment of a Local Interface IPv4 Address Sub-TLV.

FIG. 19 is an embodiment of a Remote Interface IPv4 Address Sub-TLV.

FIG. 20 is an embodiment of an Access IPv4 Prefix TLV.

FIG. 24 is an embodiment of a Tunnel-ID-Info TLV.

FIG. 25 is an embodiment of an Exception-List TLV.

FIG. 26 is an embodiment of a Bandwidth TLV.

FIG. 30 is an embodiment of an AS Number (ASN) Node Sub-TLV.

FIG. 31 is an embodiment of a Destination Node List TLV.

FIG. 32 is an embodiment of a Reply for Computing Path Segment (CPSRep) NLRI TLV.

FIG. 39 is an embodiment of a Request for Creating Tunnel Segment (CTSReq) NLRI TLV.

FIG. 40 is an embodiment of a Label TLV.

FIG. 41 is an embodiment of an Interface Index TLV.

FIG. 42 is an embodiment of an Interface IPv4 Address TLV.

FIG. 43 is an embodiment of a Reply for Creating Tunnel Segment (CTSRep) NLRI TLV.

FIG. 44 is an embodiment of a Request for Removing Tunnel Segment (RTSReq) NLRI TLV.

FIG. 45 is an embodiment of a Reply for Removing Tunnel Segment (RTSRep) NLRI TLV.

FIG. 48 is an embodiment of a SPT TLV.

FIG. 49 is an embodiment of an Explicit Route (ER) Sub-TLV.

FIG. 50 is an embodiment of a Secondary Explicit Route (SER) Sub-TLV.

FIG. 51 is an embodiment of a Cost2Node Sub-TLV.

FIG. 52 is an embodiment of an IPv4 Candidate-List TLV.

FIG. 53 is an embodiment of an IPv4 Candidate-Node Sub-TLV.

FIG. 57 is an embodiment of a From Controller Sub-TLV.

FIG. 58 is an embodiment of a Target Controller Sub-TLV.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments that provide for communication among software defined network (SDN) controllers communicating according to a border gateway protocol (BGP). The disclosed embodiments enable the SDN controllers to compute path segments through one or more domains each controlled by a respective SDN controller through various extensions to BGP communications protocols. The various extensions include communications capabilities messages that indicate to a receiving network element what communications capabilities a transmitting network element is capable of supporting. For example, in some embodiments the communications capabilities message includes and/or is implemented as a communications among SDN controllers (CSC) capability triplet, discussed in greater detail below. The various extensions include messages relating to path computation, path segment maintenance, tunnel segment creation, tunnel segment maintenance, capability advertisement, and various other messages related to communication in a SDN and creation of an end-to-end (E2E) path and/or tunnel through the SDN. In an embodiment, a first network element controls creation of the E2E tunnel by requesting each SDN controller controlling a domain that includes a portion of the E2E path to create tunnel segments through its respective domain. In another embodiment, the first network element requests a SDN controller that controls a domain that includes a destination of the E2E path to initiate creation of the E2E tunnel. In another embodiment, the SDN controller that controls a domain that includes a destination of the E2E path initiates creation of the E2E tunnel automatically once the E2E path is computed without receiving an additional request message from the first network element. The various embodiments of the present disclosure may be further described and understood according to the Internet Engineering Task Force (IETF) Internet-Draft document titled "BGP for Communications among Controllers draft-chen-idr-com-cntlrs-00," published Mar. 21, 2016, which is incorporated herein by reference in its entirety.

Figure 1:
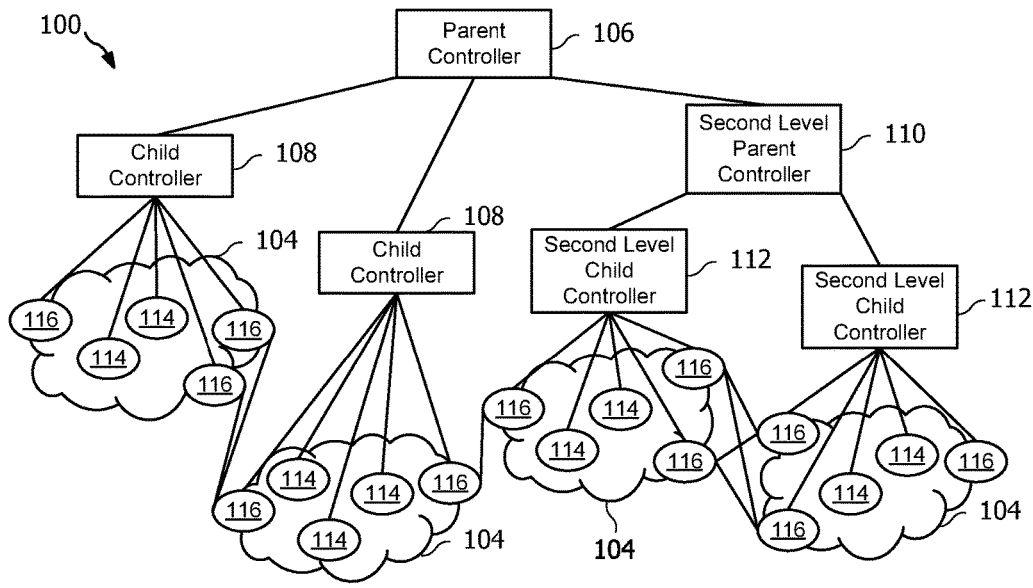
FIG. 1 is a schematic diagram of an embodiment of a hierarchical software defined network (SDN) control system (HSCS).

Referring to FIG. 1, a schematic diagram of an embodiment of a hierarchical SDN control system (HSCS) 100 is shown. As shown in FIG. 1, the HSCS 100 includes a parent controller 106, a plurality of child controllers 108, optionally a second level parent controller 110 and second level child controllers 112, a plurality of internal nodes 114 disposed throughout the domains 104 and a plurality of boundary nodes 116 disposed at boundaries (e.g., edges) of the domains 104. The parent controllers 106, child controllers 108, second level parent controller 110, and second level child controllers 112 may generally be referred to as network elements that are capable of communicating according to a desired and/or predefined standard, and or extensions to a defined and/or predefined standard, known to one or more of the network elements. In at least some embodiments, the desired and/or predefined standard is a BGP, for example, as described in IETF Request for Comments (RFC) 1771, which is hereby incorporated by reference in its entirety.

The parent controller 106 creates a parent-child relationship with the child controllers 108. When the HSCS 100 includes the second level parent controller 110, the second level parent controller 110 is a child controller of the parent controller 106 (e.g., equivalent to a child controller 108 as viewed from the parent controller 106) and is also a parent controller to the second level child controllers 112. For the following discussion of the parent controller 106 communicating with the child controller 108, the second level parent controller 110 may be considered as a child controller 108. Additionally, any communications transmitted or received by the parent controller 106 with respect to the child controller 108 and the second level parent controller 110 may also be applicable to the second level parent controller 110 communicating with the second level child controllers 112.

The parent controller 106 transmits one or more requests, and receives one or more replies from the child controllers 108 to establish the parent-child relationship. For example, the messages include an Open Message and/or a Discovery Message, as discussed in greater detail below. The parent controller 106 further requests, in some embodiments, the child controllers 108 to compute path segments for use in an E2E path, where the E2E path is computed by the parent controller 106. The parent controller 106 further requests, in some embodiments, the child controllers 108 to create tunnel segments corresponding to the computed path segments to create an E2E tunnel suitable for communicating across multiple domains 104.

Because the parent controller 106 is not a child of any other controller, (e.g., as the second level parent controller 110 is), the parent controller 106 may be referred to as having a level of "0." The second level parent controller 110, because it is also a child of the parent controller 106, may be referred to as having a level of "1," or more generally, a level of (N+1), where N is the level of the second level parent controller 110's parent.

Each child controller 108 maintains information about, and a topology of, the respective domain that the child controller 108 controls. However, in some embodiments, the parent controller 106 does not have the topology information for any of the domains controlled by the child controllers 108. In other embodiments, the parent controller 106 has at least some topology information (e.g., inter-connections between domains) for at least some of the domains respectively controlled by the child controllers 108.

The parent controller 106 receives (e.g., from a user or an application) a request to create an E2E tunnel from a source to a destination. For each request received, the parent controller 106 computes a path for the E2E tunnel and creates the E2E tunnel along the computed path. When the parent controller 106 does not have any information about the topology of the domains controlled by the child controllers 108, the parent controller 106 transmits one or more request messages to one or more of the child controllers 108 to request the child controllers 108 to compute path segments from an entry boundary node 116 to an exit boundary node 116 of each respective domain of the child controllers 108, as well as path segments from exit boundary nodes 116 of each respective domain of the child controllers 108 to entry boundary nodes 116 of adjacent domains using inter-domain links associated with the exit boundary nodes. The parent controller 106 then constructs a shortest path tree (SPT) using the path segments computed by the child controllers 108 to determine the path for the E2E tunnel and creates the E2E tunnel by transmitting requests to the child controllers 108 to create tunnel segments through their respective domains corresponding to the path computed for the E2E tunnel. When the parent controller 106 has information about the topology of the domains controlled by the child controllers 108, the parent controller 106 computes a path for the tunnel according to the information about the topology of the domains and creates the E2E tunnel by transmitting requests to the child controllers 108 to create tunnel segments through their respective domains corresponding to the path computed for the E2E tunnel.

It should be recognized that the HSCS 100 is merely an overview and the HSCS 100 may include other network elements, components, or levels of hierarchy and may have other suitable configurations in practical applications as would be appreciated by one skilled in the art upon reviewing this disclosure in its entirety.

Figure 2:
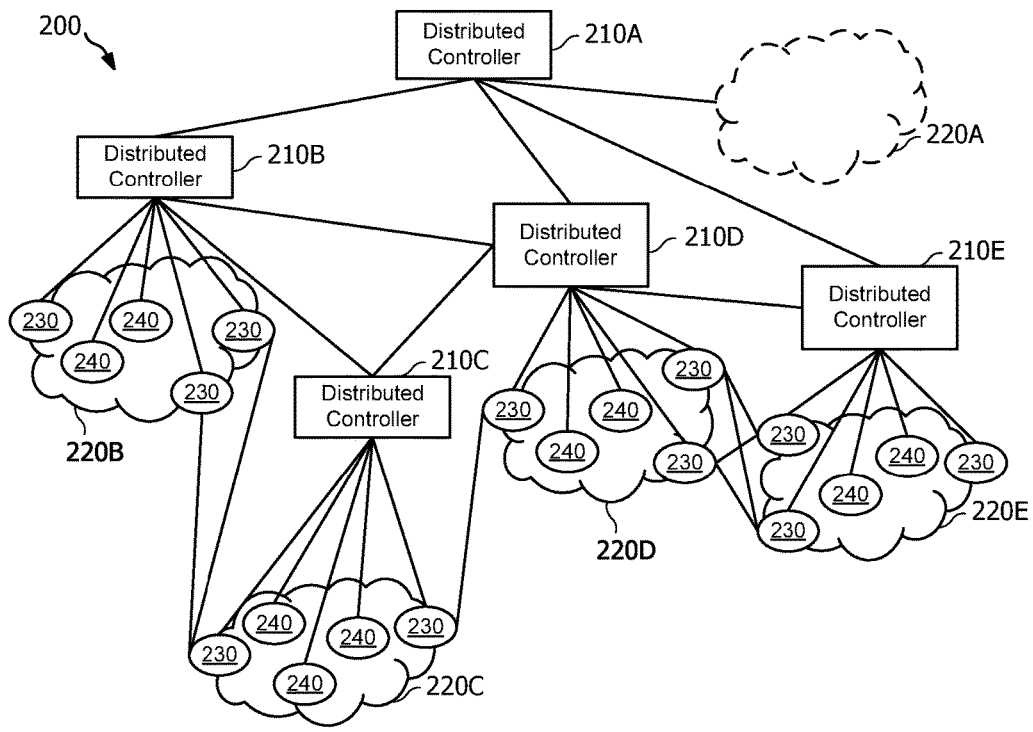
FIG. 2 is a schematic diagram of an embodiment of a distributed SDN control system (DSCS).

Referring now to FIG. 2, a schematic diagram of an embodiment of a distributed SDN control system (DSCS) 200 is shown. As shown in FIG. 2, the DSCS 200 includes a plurality of distributed controllers 210A-210E, each of which controls a corresponding domain 220A-220E. Each of the domains 220A-220E, in various embodiments, include any number of nodes such as boundary nodes 230 and/or internal nodes 240 that function to transmit data through their respective domains, for example, from one boundary node 230 to another boundary node 230 directly or via one or more internal nodes 240. In some embodiments, the distributed controller 210A may be referred to as a master controller in that it controls other distributed controllers 210B-210E without controlling a domain including nodes. In other embodiments, the distributed controller 210A may not be a master controller and may instead control a corresponding domain 220A which, although not shown, may include any number of boundary nodes 230 and/or internal nodes 240 in a manner substantially similar to the domains 220B-220E. Each domain 220A-220E includes one or more boundary nodes 230 and one or more internal nodes 240. Each of the distributed controllers 210A-210E communicates with other distributed controllers 210A-210E which are adjacent. For example, the distributed controller 210A communicates with the distributed controllers 210B, 210D, and 210E, the distributed controller 210B communicates with the distributed controllers 210A, 210C, and 210D, the distributed controller 210C communicates with the distributed controllers 210B and 210D, the distributed controller 210D communicates with the distributed controllers 210A, 210B, 210C, and 210E, and the distributed controller 210E communicates with the distributed controllers 210A and 210D.

When a first of the distributed controllers 210A-210E receives a request (e.g., from a user or an application) to create an E2E tunnel from a source to a destination, the first of the distributed controllers 210A-210E computes a portion of an E2E path (e.g., as one or more path segments, such as path segments added to a SPT as a listing of one or more nodes or network elements) for the E2E tunnel through the corresponding domain 220A-220E controlled by the first of the distributed controllers 210A-210E. After computing the portion of the E2E path through its respective domain 220A-220E, the first of the distributed controllers 210A-210E creates and transmits a request to a second of the distributed controllers 210A-210E to request for the second of the distributed controllers 210A-210E to compute another portion of the E2E path for the E2E tunnel through the corresponding domain 220A-220E controlled by the second of the distributed controllers 210A-210E. Alternatively, the request for creating the E2E tunnel may be received by a distributed controller 210A-210E functioning as a master controller (e.g., configured to control other distributed controllers 210A-210E) and the master controller may transmit a request to the first of the distributed controllers 210A-210E to request for the first of the distributed controllers 210A-210E to compute a portion of the E2E path for the E2E tunnel through the corresponding domain 220A-220E controlled by the first of the distributed controllers 210A-210E. After computing path segments, each of the distributed controller 210A-210E may transmit a request to a next adjacent one of the distributed controllers 210A-210E until both the source and the destination for the E2E tunnel are located in the SPT and thus a shortest path is found.

After the shortest path is found, tunnel segments corresponding to path segments on the shortest path of the E2E tunnel are created. In some embodiments, the tunnel segments are created by a single distributed controller 210A-210E (e.g., functioning as a master controller) requesting each distributed controller 210A-210E that controls a respective domain 220A-220E which contains a portion of the shortest path to create the tunnel segments in a reverse order from the destination to the source. In other embodiments, a first distributed controller 210A-210E transmits a request to a distributed controller 210A-210E which controls a respective domain 220A-220E that includes the destination (e.g., which may be referred to as a destination controller) to request the destination controller create tunnel segments in the domain controlled by the destination controller. After creating the tunnel segments, the destination controller may create and transmit a request message to a next upstream distributed controller 210A-210E along the shortest path to request the upstream distributed controller 210A-210E create tunnel segments in the respective domain 220A-220E controlled by the upstream distributed controller 210A-210E. Such requests to a next upstream distributed controller 210A-210E may be repeated by each distributed controller 210A-210E that creates tunnel segments until the E2E tunnel is fully created or until creation has failed. In yet other embodiments, after the shortest path is found, the destination controller may automatically initiate tunnel segment creating without receiving a separate request for tunnel segment creation from another distributed controller 210A-210E. After creating tunnel segments in the domain controller by the destination controller, the destination controller may create and transmit a request message to a next upstream distributed controller 210A-210E along the shortest path to request the upstream distributed controller 210A-210E create tunnel segments in the respective domain 220A-220E controlled by the upstream distributed controller 210A-210E. Such requests to a next upstream distributed controller 210A-210E may be repeated by each distributed controller 210A-210E that creates tunnel segments until the E2E tunnel is fully created or until creation has failed.

It should be recognized that the DSCS 200 is merely an overview and the DSCS 200 may include other network elements or components in any suitable configuration in practical applications as would be appreciated by one skilled in the art upon reviewing this disclosure in its entirety.

Figure 3:
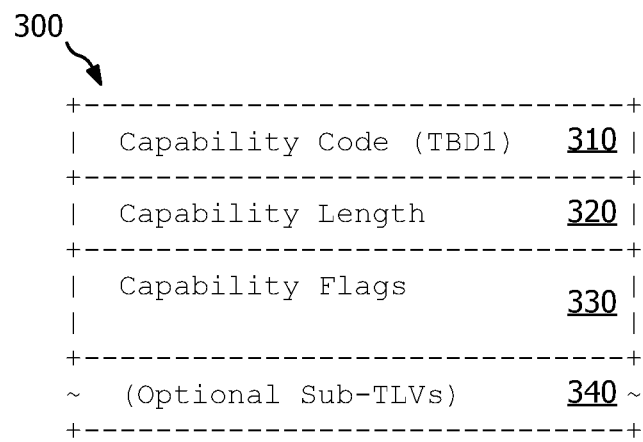
FIG. 3 is an embodiment of a communications among SDN controllers (CSC) capability triplet.

Referring now to FIG. 3, an embodiment of a CSC capability triple 300 is shown. The CSC capability triplet 300 is, for example, a communications capabilities message, implemented in a message transmitted between two BGP speakers acting as SDN Controllers (e.g., between parent controller 106 and any one of the child controllers 108 of FIG. 1 and/or between any two of the distributed controllers 210A-210E of FIG. 2) during, or after, establishment of a BGP session between the two BGP speakers when the two BGP speakers seek to advertise their capabilities for CSC. The CSC capability triplet 300 is, in some embodiments, included in an Open Message, for example, in a Capabilities Optional parameter of the Open Message.

As shown in FIG. 3, the CSC capability triplet 300 includes a Capability Code field 310, a Capability Length field 320, a Capability Flags field 330, and an Optional Sub-TLVs field 340. The Capability Code field 310 includes an identifier of the CSC capability triplet 300 and is, in some embodiments, about one octet in length. The identifier of the CSC capability triplet 300 may be a numeric value that is assigned to the CSC capability triplet 300 at a later time and a particular numeric value included in the Capability Code field 310 of the CSC capability triplet 300 is not limited herein. The Capability Length field 320 indicates a length of the Capability Flags field 330 and the Optional Sub-TLVs field 340. For example, the Capability Length field 320 may indicate a length of four octets (which may also be referred to as bytes, which each may contain eight bits) for the Capability Flags field 330, plus a length of the Optional Sub-TLVs field 340. The length of the Optional Sub-TLVs field 340 is dependent upon which, if any, Optional Sub-TLVs are included in the CSC capability triplet 300, and therefore a particular value of the Capability Length field 320 of the CSC capability triplet 300 is not limited herein.

The Capability Flags field 330, which in some embodiments may be referred to as a Capability Value field, comprises one or more capability flags (not shown) that indicate capabilities of a network element that sets a value of the capability flags and/or transmits the CSC capability triplet 300. In some embodiments, the Capability Flags field 330 is a 32-bit binary field. A most significant bit of the Capability Flags field 330 may be identified as a bit 0 and each bit to the right of bit 0 may be identified by incrementing an identity of the last preceding bit to the left such that the Capability Flags field 330 contains bits 0 to 31 as identified in a direction of most significant bit to least significant bit. Individual capabilities of the network element that sets a value of the capability flags and/or transmits the CSC capability triplet 300 are each represented by one or more bits of the 32 bits of the Capability Flags field 330.

In some embodiments, bit 0 is a Path Segments bit that indicates whether the network element that sets a value of the capability flags and/or transmits the CSC capability triplet 300 is capable of computing path segments for use in creating an E2E tunnel. For example, when the network element that sets a value of the capability flags and/or transmits the CSC capability triplet 300 is capable of computing path segments, bit 0 is set to "1" to indicate the path segment computation capabilities. Conversely, when the network element that sets a value of the capability flags and/or transmits the CSC capability triplet 300 is not capable of computing path segments, bit 0 is set to "0" to indicate no path segment computation capabilities.

In some embodiments, bit 1 is a Tunnel Segment bit that indicates whether the network element that sets a value of the capability flags and/or transmits the CSC capability triplet 300 is capable of creating tunnel segments for an E2E tunnel. For example, when the network element that sets a value of the capability flags and/or transmits the CSC capability triplet 300 is capable of creating tunnel segments, bit 1 is set to "1" to indicate tunnel segment creation capabilities. Conversely, when the network element that sets a value of the capability flags and/or transmits the CSC capability triplet 300 is not capable of creating tunnel segments, bit 1 is set to "0" to indicate no tunnel segment creation capabilities.

In some embodiments, bit 2 is an E2E Tunnel bit that indicates whether the network element that sets a value of the capability flags and/or transmits the CSC capability triplet 300 is capable of creating and maintaining E2E label switched path (LSP) tunnels. For example, when the network element that sets a value of the capability flags and/or transmits the CSC capability triplet 300 is capable of creating and maintaining E2E LSP tunnels, bit 2 is set to "1" to indicate the E2E LSP tunnel capabilities. Conversely, when the network element that sets a value of the capability flags and/or transmits the CSC capability triplet 300 is not capable of creating and maintaining E2E LSP tunnels, bit 2 is set to "0" to indicate no E2E LSP tunnel capabilities.

In some embodiments, bit 3 is a Parent Controller bit that indicates whether the network element that sets a value of the capability flags and/or transmits the CSC capability triplet 300 is a parent controller. For example, when the network element that sets a value of the capability flags and/or transmits the CSC capability triplet 300 is a parent controller, bit 3 is set to "1" to indicate parent controller capabilities. Conversely, when the network element that sets a value of the capability flags and/or transmits the CSC capability triplet 300 is not a parent controller, bit 3 is set to "0" to indicate no parent controller capabilities.

In some embodiments, bit 4 is a Child Controller bit that indicates whether the network element that sets a value of the capability flags and/or transmits the CSC capability triplet 300 is a child controller. For example, when the network element that sets a value of the capability flags and/or transmits the CSC capability triplet 300 is a child controller, bit 4 is set to "1" to indicate child controller capabilities. Conversely, when the network element that sets a value of the capability flags and/or transmits the CSC capability triplet 300 is not a child controller, bit 4 is set to "0" to indicate no child controller capabilities.

In some embodiments, bit 5 is a Distributed Controller bit that indicates whether the network element that sets a value of the capability flags and/or transmits the CSC capability triplet 300 is a distributed controller. For example, when the network element that sets a value of the capability flags and/or transmits the CSC capability triplet 300 is a distributed controller, bit 5 is set to "1" to indicate distributed controller capabilities. Conversely, when the network element that sets a value of the capability flags and/or transmits the CSC capability triplet 300 is not a distributed controller, bit 5 is set to "0" to indicate no distributed controller capabilities.

In some embodiments, bits 6 through 9 are Level bits that indicate a level of the network element that sets a value of the capability flags and/or transmits the CSC capability triplet 300. For example, when the network element that sets a value of the capability flags and/or transmits the CSC capability triplet 300 is implemented in a hierarchical system having multiple parent controllers (e.g., the parent controller 106 and/or the second level parent controller 110 of FIG. 1), the Level bits indicate a level of the respective parent controllers (e.g., a level of "0" for the parent controller 106 and a level of "1" for the second level parent controller 110).

Figure 4:
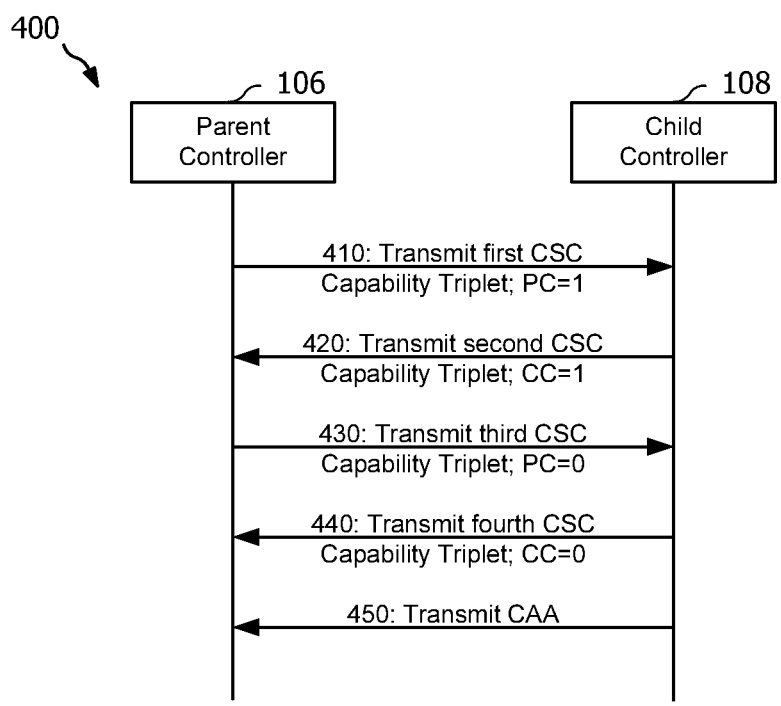
FIG. 4 is an embodiment of a protocol diagram of communication between network elements performing parent-child discovery according to the CSC capability triplet.

Referring now to FIG. 4, an embodiment of a protocol diagram 400 of communication between the parent controller 106 and any one of the child controllers 108, each of FIG. 1, performing parent-child discovery according to the CSC capability triplet 300 of FIG. 3 is shown. The parent controller 106 and the child controllers 108, in at least some embodiments, are connected by a BGP session and have a BGP adjacency. At step 410, the parent controller 106 transmits a first CSC capability triplet 300 to the child controller 108 when the parent controller 106 seeks to establish a parent-child relationship with the child controller 108. The first CSC capability triplet 300 is included, for example in an Open Message transmitted by the parent controller 106 to the child controller 108. The first CSC capability triplet 300 contains a Parent Controller bit set to "1," as discussed above. The first CSC capability triplet 300 indicates to the child controller 108 that the parent controller 106 is a parent controller. In some embodiments the parent controller 106 receives an instruction from a user (e.g., a network administrator) or an application executing on, or communicatively coupled to, the parent controller 106 instructing the parent controller 106 to configure the child controller 108 as a child controller for a parent-child relationship between the parent controller 106 and the child controller 108. In response, the parent controller 106 transmits the first CSC capability triplet 300 to the child controller 108 after the child controller 108 is configured as a child controller over a BGP communication session between the network elements P and C.

The child controller 108 receives the first CSC capability triplet 300 from the parent controller 106 and, based on the first CSC capability triplet, determines that the parent controller 106 is a parent controller seeking to establish a parent-child relationship with the child controller 108. In some embodiments, the child controller 108 receives an instruction from a user (e.g., a network administrator, which may be the same user as the user instructing the parent controller 106 or may be a different user) or an application (e.g., which may be the same application as the application instructing the parent controller 106 or may be a different application) executing on, or communicatively coupled to, the child controller 108, instructing the child controller 108 to configure the parent controller 106 as a parent controller for a child-parent relationship between the child controller 108 and the network element 402. In response to at least one of the instruction from the user or receiving the first CSC capability triplet, the child controller 108 determines that the parent controller 106 identified by the first CSC capability triplet 300 as a parent controller is consistent with an identification of a parent controller locally configured on the child controller 108 and forms a child-parent relationship with the network element 402. Subsequently, at step 420, the child controller 108 transmits a second CSC capability triplet 300 to the network element 402. The second CSC capability triplet 300 contains a Child Controller bit set to "1," as discussed above. The second CSC capability triplet 300 indicates to the parent controller 106 that the child controller 108 is a child controller after the parent controller 106 is configured as a parent controller over a BGP communication session between the network elements C and P. The parent controller 106 receives the second CSC capability triplet 300 from the child controller 108 and, based on the second CSC capability triplet, determines that the child controller 108 identified by the second CSC capability triplet 300 as a child controller is consistent with an identification of a child controller locally configured on the parent controller 106 and forms a parent-child relationship with the child controller 108.

When a configuration of the parent controller 106 is changed (e.g., in response to input from the user and/or from the application) such that the child controller 108 is no longer designated as a child controller for the network element 402, the parent controller 106 implements the change in configuration by transmitting, at step 430, a third CSC capability triplet 300 to the child controller 108. The third CSC capability triplet 300 contains a Parent Controller bit set to "0," as discussed above. When the child controller 108 receives the third CSC capability triplet, the child controller 108 determines that the parent controller 106 is no longer its parent controller and removes the child-parent relationship between the child controller 108 and the network element 402.

When a configuration of the child controller 108 is changed (e.g., in response to input from the user and/or from the application) such that the parent controller 106 is no longer designated as a parent controller for the child controller 108, the child controller 108 implements the change in configuration by transmitting, at step 440, a fourth CSC capability triplet 300 to the network element 402. The fourth CSC capability triplet 300 contains a Child Controller bit set to "0," as discussed above. When the parent controller 106 receives the fourth CSC capability triplet, the parent controller 106 determines that the child controller 108 is no longer its child controller and removes the parent-child relationship between the parent controller 106 and the child controller 108.

In some embodiments, after the child-parent relationship is formed, at step 450 the child controller 108 transmits an advertisement message such as a Message for Connections and Access Advertisement (CAA) as discussed in greater detail below with respect to FIG. 7. The CAA message, in some embodiments, includes information (e.g., inter-domain links) relating to connections between a domain controlled by the child controller and adjacent domains. The CAA message, in some embodiments, also includes accesses (e.g., addresses or prefixes for network elements (e.g., access points)) within the domain which may be accessible from outside the domain. The CAA message may be sent by the child controller to the parent controller one time or more than one time (e.g., periodically and/or following a change to the connections and/or accesses of the domain). The parent controller receives CAA messages from each of its child controllers and stores the connection and accesses information for later use in routing data through a domain controlled by one of the child controllers in, for example, a data structure accessible by the parent controller. When a child controller is non-functional, the parent controller optionally may remove the connection or access information corresponding to the respective child controller from the data structure.

The CAA message enables the parent controller to determine exterior information about the domains controlled by the child controllers and enables the parent controller to route data traffic through at least some of the domains. Furthermore, the exterior information about the domains enables the parent controller to know connections between the domains, where each of the connections comprises attributes for a link connecting domains and attributes for end points of the link. The attributes for the end points of the link comprise a type of the end point (e.g., an area border router (ABR) or autonomous system boundary router (ASBR)) and a domain of the end point (e.g., an autonomous system (AS) number or an area number).

Figure 5:
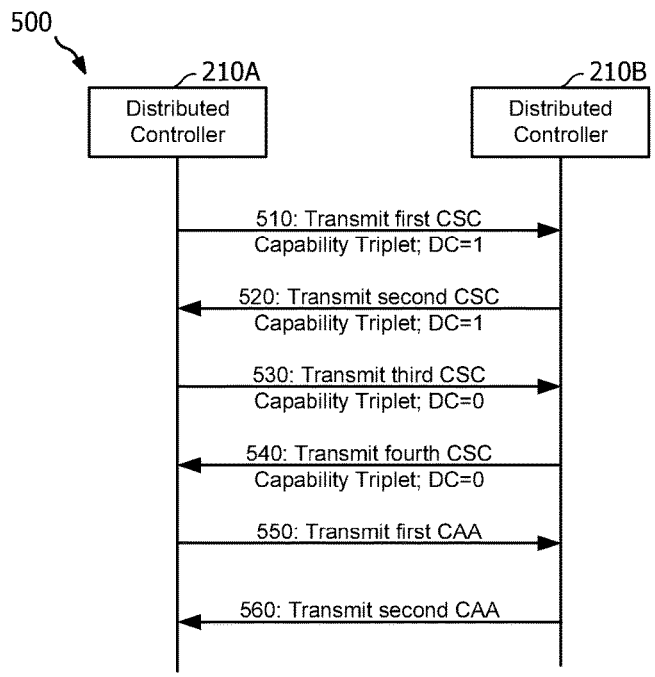
FIG. 5 is an embodiment of a protocol diagram of communication between distributed controllers performing distributed relation discovery according to the CSC capability triplet.

Referring now to FIG. 5, an embodiment of a protocol diagram 500 of communication between distributed controller 210A (which may be generally representative of any one of the distributed controllers 210A-210E of FIG. 2) and distributed controller 210B (e.g., which may be generally representative of any other of the distributed controllers 210A-210E of FIG. 2) performing distributed relation discovery according to the CSC capability triplet 300 of FIG. 3 is shown. The distributed controller 210A and the distributed controller 210B, in at least some embodiments, are connected by a BGP session and have a BGP adjacency. At step 510, the distributed controller 210A transmits a first CSC capability triplet 300 to the distributed controller 210B when the distributed controller 210A seeks to establish a distributed relation with the distributed controller 210B. The first CSC capability triplet 300 is included, for example in an Open Message transmitted by the distributed controller 210A to the distributed controller 210B. The first CSC capability triplet 300 contains a Distributed Controller bit set to "1," as discussed above. The first CSC capability triplet 300 indicates to the distributed controller 210B that the distributed controller 210A is a distributed controller after the distributed controller 210B is configured as a distributed controller over a BGP session between the distributed controller 210A and the distributed controller 210B. In some embodiments the distributed controller 210A receives an instruction from a user (e.g., a network administrator) or an application executing on, or communicatively coupled to, the distributed controller 210A, instructing the distributed controller 210A to configure the distributed controller 210B as a distributed controller for a distributed relation between the distributed controller 210A and the distributed controller 210B, and in response transmits the first CSC capability triplet 300 to the distributed controller 210B.

The distributed controller 210B receives the first CSC capability triplet 300 from the distributed controller 210A and, based on the first CSC capability triplet, determines that the distributed controller 210A is a distributed controller seeking to establish a distributed relation with the distributed controller 210B. The distributed controller 210B further determines that the distributed controller 210A identified by the first CSC capability triplet 300 as a distributed controller is consistent with an identification of a distributed controller locally configured on the distributed controller 210B and forms a distributed relation with the distributed controller 210A. After forming the distributed relation with the distributed controller 210A, the distributed controller 210B, at step 520, transmits a second CSC capability triplet 300 to the distributed controller 210A. The second CSC capability triplet 300 is included, for example in an Open Message transmitted by the distributed controller 210B to the distributed controller 210A. The second CSC capability triplet 300 contains a Distributed Controller bit set to "1," as discussed above. The second CSC capability triplet 300 indicates to the distributed controller 210A that the distributed controller 210B is a distributed controller after the distributed controller 210A is configured as a distributed controller over a BGP session between the distributed controller 210A and the distributed controller 210B. When the distributed controller 210A receives the second CSC capability triplet, the distributed controller 210A further determines that the distributed controller 210B identified by the second CSC capability triplet 300 as a distributed controller is consistent with an identification of a distributed controller locally configured on the distributed controller 210A and forms a distributed relation with the distributed controller 210B.

When a configuration of the distributed controller 210A is changed (e.g., in response to input from the user and/or from the application) such that the distributed controller 210B is no longer designated as a distributed controller for the distributed controller 210A, the distributed controller 210A implements the change in configuration by transmitting, at step 530, a third CSC capability triplet 300 to the distributed controller 210B. The third CSC capability triplet 300 contains a Distributed Controller bit set to "0," as discussed above. When the distributed controller 210B receives the third CSC capability triplet, the distributed controller 210B determines that the distributed controller 210A is no longer its adjacent distributed controller and removes the distributed relation between the distributed controller 210B and the distributed controller 210A.

When a configuration of the distributed controller 210B is changed (e.g., in response to input from the user and/or from the application) such that the distributed controller 210A is no longer designated as a distributed controller for the distributed controller 210B, the distributed controller 210B implements the change in configuration by transmitting, at step 540, a fourth CSC capability triplet 300 to the distributed controller 210A, the distributed controller 210A determines that the distributed controller 210B is no longer its adjacent distributed controller and removes the distributed relation between the distributed controller 210A and the distributed controller 210B.

After the distributed relation is formed between the distributed controller 210A and the distributed controller 210B, the distributed controller 210A may send a CAA (e.g., as discussed in greater detail below with respect to FIG. 7) message to the distributed controller 210B at step 550 and the distributed controller 210B may send a CAA message to the distributed controller 210A at step 560. After receiving the CAA message from the distributed controller 210B, the distributed controller 210A may send the CAA message to its adjacent distributed controllers other than the distributed controller 210B if the CAA message is not originated by the distributed controller 210A. After receiving the CAA message from the distributed controller 210A, the distributed controller 210B may send the message to its adjacent distributed controllers other than the distributed controller 210A if the message is not originated by the distributed controller 210B. Each CAA message, in some embodiments, includes the information about the originator (e.g., IPv4 address of the distributed controller 210A in the CAA message originated by the distributed controller 210A, etc.) and information (e.g., inter-domain links) relating to connections between a domain controlled by a sending distributed controller and adjacent domains. The CAA message, in some embodiments, also includes accesses (e.g., addresses or prefixes for network elements (e.g., access points)) within the domain which may be accessible from outside the domain. The CAA message enables a receiving distributed controller to determine exterior information about the domains controlled by a sending distributed controller and enables the receiving distributed controller to route data traffic through at least some of the domains. Furthermore, the exterior information about the domains enables the receiving distributed controller to know connections between the domains, where each of the connections comprises attributes for a link connecting domains and attributes for end points of the link. The attributes for the end points of the link comprise a type of the end point (e.g., an ABR or ASBR) and a domain of the end point (e.g., an AS number or an area number).

Figure 6:
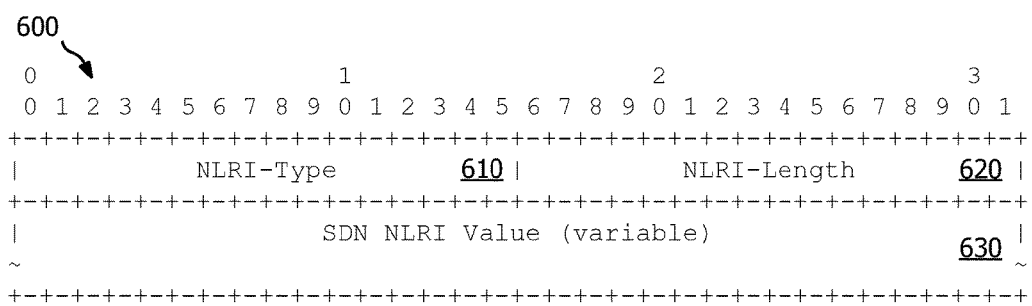
FIG. 6 is an embodiment of a SDN network layer reachability information (NLRI) type-length-value (TLV).

Referring now to FIG. 6, an embodiment of a SDN network layer reachability information (NLRI) type-length-value (TLV) 600 is shown. The SDN NLRI TLV 600 is implemented in a message transmitted between two network elements (e.g., between the parent controller 106 and any one or more of the child controllers 108, each of FIG. 1, and/or between any two distributed controllers 210A-210E of FIG. 2) when the network elements seek to perform an action or operation in a SDN, such as the HSCS 100 of FIG. 1 and/or the DSCS 200 of FIG. 2, based on BGP communications (e.g., when the network elements seek to compute path segments and/or create tunnel segments through the SDN from a source to a destination).

As shown in FIG. 6, the SDN NLRI TLV 600 includes a NLRI-Type field 610, a NLRI-Length field 620, and a SDN NLRI Value field 630. The NLRI-Type field 610 includes an identifier of the SDN NLRI TLV 600 that indicates an intended meaning of the SDN NLRI TLV 600 and content of the SDN NLRI Value field 630. For example, exemplary contents of the NLRI-Type field 610 are shown below in Table 1. The NLRI-Length field 620 indicates a length of the SDN NLRI Value field 630. The length of the SDN NLRI Value field 630 is dependent upon a particular message or content included in the SDN NLRI Value field 630, and therefore a particular value of the NLRI-Length field 620 of the SDN NLRI TLV 600 is not limited herein.

TABLE 1

| Value of NLRI-Type | Meaning |
|---|---|
| 1 | Request for Computing Path Segment (CPSReq) |
| 2 | Reply for Computing Path Segment (CPSRep) |

TABLE 1-continued

| Value of NLRI-Type | Meaning |
|---|---|
| 3 | Request for Removing Path Segment (RPSReq) |
| 4 | Reply for Removing Path Segment (RPSRep) |
| 5 | Request for Keeping Path Segment (KPSReq) |
| 6 | Reply for Keeping Path Segment (KPSRep) |
| 7 | Request for Creating Tunnel Segment (CTSReq) |
| 8 | Reply for Creating Tunnel Segment (CTSRep) |
| 9 | Request for Removing Tunnel Segment (RTSReq) |
| 10 | Reply for Removing Tunnel Segment (RTSRep) |
| 11 | Message for Connection and Access Advertisement (CAA) |
| 12 | Request for Growing SPT (GSReq) |
| 13 | Reply for Growing SPT (GSRep) |

Figure 7:
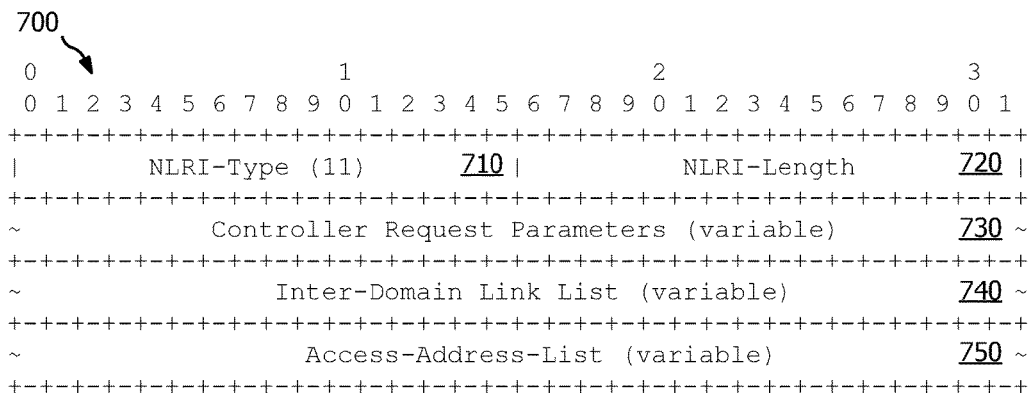
FIG. 7 is an embodiment of a Connection and Access Advertisement Message (CAA) NLRI TLV.

Referring now to FIG. 7, an embodiment of a CAA NLRI TLV 700 is shown. The CAA NLRI TLV 700 is implemented in a message transmitted between two network elements (e.g., between the parent controller 106 and any one or more of the child controllers 108, each of FIG. 1, and/or between any two distributed controllers 210A-210E of FIG. 2) to advertise connections of a domain associated with the network element transmitting the CAA NLRI TLV 700 with adjacent domains, for example, in an HSCS network such as the HSCS 100 of FIG. 1 and/or a DSCS such as the DSCS 200 of FIG. 2. The CAA NLRI TLV 700 is transmitted, in some embodiments, in the SDN NLRI TLV 600 of FIG. 6, for example, in the SDN NLRI Value field 630. In some embodiments, the CAA NLRI TLV 700 is referred to generally as an advertisement message.

As shown in FIG. 7, the CAA NLRI TLV 700 includes, in some embodiments, a NLRI-Type field 710, a NLRI-Length field 720, a Controller Request Parameters (CRP) field 730, an Inter-Domain Link List field 740, and an Access-Address-List field 750. The NLRI-Type field 710 includes an identifier of the CAA NLRI TLV 700 that describes an intended meaning of the CAA NLRI TLV 700 and content of the CAA NLRI TLV 700. For example, exemplary contents of the NLRI-Type field 710 are shown above in Table 1. The NLRI-Length field 720 indicates a length of the CAA NLRI TLV 700 which is dependent upon a particular content included in the CAA NLRI TLV 700, and therefore a particular value of the NLRI-Length field 720 of the CAA NLRI TLV 700 is not limited herein. The CRP field 730, in some embodiments, includes a CRP TLV (e.g., as discussed below with respect to FIG. 55) that specifies various parameters relating to a tunnel related operation request, as will be discussed in greater detail below. The Inter-Domain Link List field 740 includes one or more Inter-Domain Link TLVs. The Access-Address-List field 750 includes an identification of one or more addresses of network elements within the domain of the network element transmitting the CAA NLRI TLV 700 which are accessible by network elements located outside of the domain of the network element transmitting the CAA NLRI TLV 700.

Figure 8:
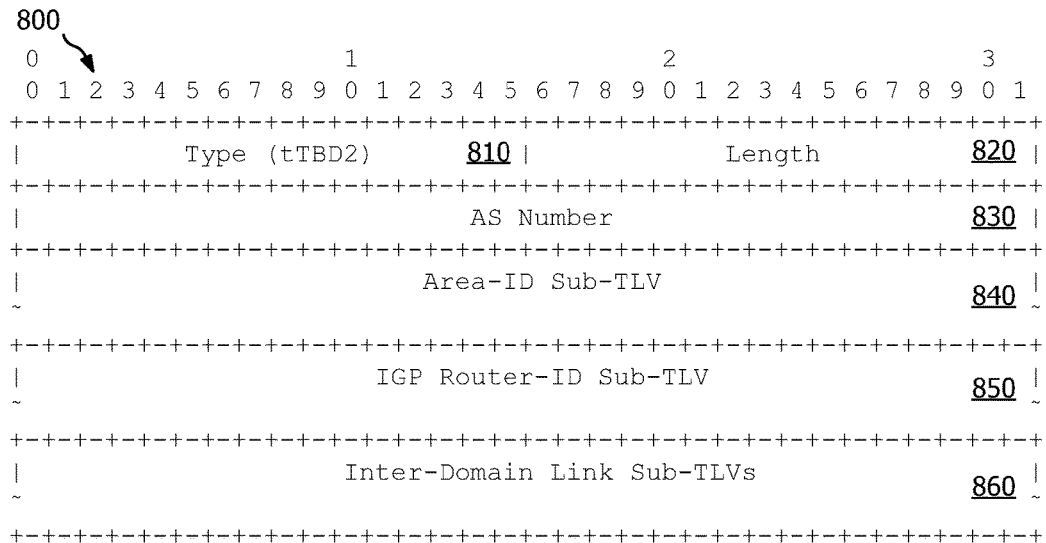
FIG. 8 is an embodiment of an Inter-Domain Link TLV.

Referring now to FIG. 8, an embodiment of an Inter-Domain Link TLV 800 is shown. The Inter-Domain Link TLV 800 is implemented in the CAA NLRI TLV 700 transmitted between two network elements (e.g., between the parent controller 106 and any one or more of the child controllers 108, each of FIG. 1, and/or between any two distributed controllers 210A-210E of FIG. 2) to advertise connections of a domain associated with the network element transmitting the CAA NLRI TLV 700 with adjacent domains, for example, in an HSCS network such as the HSCS 100 of FIG. 1 and/or a DSCS such as the DSCS 200 of FIG. 2. The Inter-Domain Link TLV 800 is transmitted, in some embodiments, in the Inter-Domain Link List field 740 of the CAA NLRI TLV 700.

As shown in FIG. 8, the Inter-Domain Link TLV 800 includes, in some embodiments, a Type field 810, a Length field 820, an AS Number field 830, an Area-Identification (ID) Sub-TLV field 840, an interior gateway protocol (IGP) Router-ID Sub-TLV field 850, and an Inter-Domain Link Sub-TLVs field 860 that may contain any number of Inter-Domain Link Sub-TLVs. The Type field 810 includes an identifier of a type of the Inter-Domain Link TLV 800. The type of the Inter-Domain Link TLV 800 may be a numeric value that is assigned to the Inter-Domain Link TLV 800 at a later time and a particular value of the Type field 810 of the Inter-Domain Link TLV 800 is not limited herein. The Length field 820 indicates a length of the Inter-Domain Link TLV 800, which is dependent upon a particular content included in the Inter-Domain Link TLV 800, and therefore a particular value of the Length field 820 of the Inter-Domain Link TLV 800 is not limited herein. The AS Number field 830, in some embodiments, indicates an identity of a domain in which an end point of a connection associated with the CAA NLRI TLV 700 is located. The Area-ID Sub-TLV field 840, the IGP Router-ID Sub-TLV field 850, and the Inter-Domain Link Sub-TLVs 860 fields each include one or more Sub-TLVs which are discussed in greater detail below.

Figure 9:
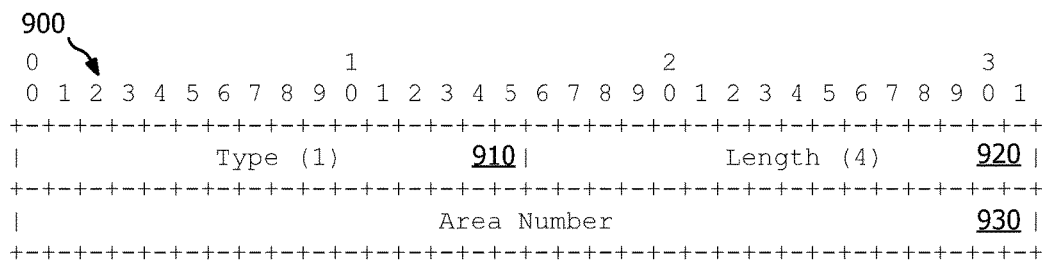
FIG. 9 is an embodiment of an Area-Identification (ID) Sub-TLV.

Referring now to FIG. 9, an embodiment of an Area-ID Sub-TLV 900 900 suitable for implementation in the Area-ID Sub-TLV field 840 of the Inter-Domain Link TLV 800 of FIG. 8 is shown. The Area-ID Sub-TLV 900 is implemented in the Inter-Domain Link TLV 800 transmitted between two network elements (e.g., between the parent controller 106 and any one or more of the child controllers 108, each of FIG. 1, and/or between any two distributed controllers 210A-210E of FIG. 2) to advertise connections of a domain associated with the network element transmitting the CAA NLRI TLV 700 with adjacent domains, for example, in an HSCS network such as the HSCS 100 of FIG. 1 and/or a DSCS such as the DSCS 200 of FIG. 2.

As shown in FIG. 9, the Area-ID Sub-TLV 900 includes, in some embodiments, a Type field 910, a Length field 920, and an Area Number field 930. The Type field 910 includes an identifier of a type of the Area-ID Sub-TLV 900. The type of the Area-ID Sub-TLV 900 may be a numeric value that is assigned to the Area-ID Sub-TLV 900 at a later time and a particular value of the Type field 910 of the Area-ID Sub-TLV 900 is not limited herein. The Length field 920 indicates a length of the Area-ID Sub-TLV 900, which is dependent upon a particular content included in the Area-ID Sub-TLV 900, and therefore a particular value of the Length field 920 of the Area-ID Sub-TLV 900 is not limited herein. The Area Number field 930, in some embodiments, includes an identification of an area or domain in which an end point of a connection associated with the CAA NLRI TLV 700 is located.

Figure 10:
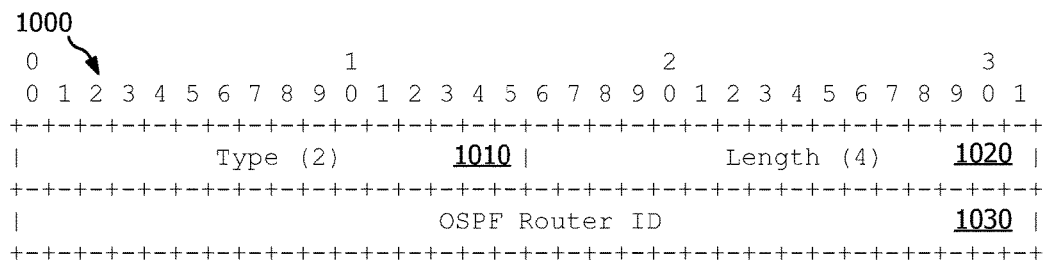
FIG. 10 is an embodiment of an open shortest path first (OSPF) Router-ID Sub-TLV.

Referring now to FIG. 10, an embodiment of an Open Shortest Path First (OSPF) Router-ID Sub-TLV 1000 suitable for implementation in the IGP Router-ID Sub-TLV field 850 of the Inter-Domain Link TLV 800 of FIG. 8 is shown. The OSPF Router-ID Sub-TLV 1000 includes, in some embodiments, a Type field 1010, a Length field 1020, and an OSPF Router ID field 1030. The Type field 1010 includes an identifier of the OSPF Router-ID Sub-TLV 1000. The type of the OSPF Router-ID Sub-TLV 1000 may be a numeric value that is assigned to the OSPF Router-ID Sub-TLV 1000 at a later time and a particular value of the Type field 1010 of the OSPF Router-ID Sub-TLV 1000 is not limited herein. The Length field 1020 indicates a length of the OSPF Router-ID Sub-TLV 1000, which is dependent upon a particular content included in the OSPF Router-ID Sub-TLV 1000, and therefore a particular value of the Length field 1020 of the OSPF Router-ID Sub-TLV 1000 is not limited herein. The OSPF Router ID field 1030 includes an identification of a router capable of performing OSPF routing and which is associated with an end point of a connection associated with the CAA NLRI TLV 700.

Figure 11:
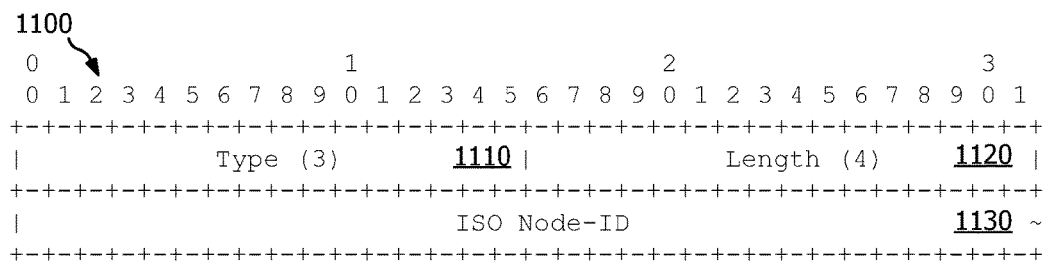
FIG. 11 is an embodiment of an intermediate system to intermediate system (ISIS) Router-ID Sub-TLV.

Referring now to FIG. 11, an embodiment of an intermediate system to intermediate system (ISIS) Router-ID Sub-TLV 1100 suitable for implementation in the IGP Router-ID Sub-TLV field 850 of the Inter-Domain Link TLV 800 of FIG. 8 is shown. It should be noted that only one of the OSPF Router-ID Sub-TLV 1000 of FIG. 10 or the ISIS Router-ID Sub-TLV 1100 of FIG. 11 is included in the IGP Router-ID Sub-TLV field 850 of the Inter-Domain Link TLV 800 of FIG. 8 at any one time. The ISIS Router-ID Sub-TLV 1100 includes, in some embodiments, a Type field 1110, a Length field 1120, and an International Organization for Standardization (ISO) Node-ID field 1130. The Type field 1110 includes an identifier of the ISIS Router-ID Sub-TLV 1100. The type of the ISIS Router-ID Sub-TLV 1100 may be a numeric value that is assigned to the ISIS Router-ID Sub-TLV 1100 at a later time and a particular value of the Type field 1110 of the ISIS Router-ID Sub-TLV 1100 is not limited herein. The Length field 1120 indicates a length of the ISIS Router-ID Sub-TLV 1100, which is dependent upon a particular content included in the ISIS Router-ID Sub-TLV 1100, and therefore a particular value of the Length field 1120 of the ISIS Router-ID Sub-TLV 1100 is not limited herein. The ISO Node-ID field 1030 includes an identification of a node conforming to ISO standards which is capable of performing ISIS routing and which is associated with an end point of a connection associated with the CAA NLRI TLV 700.

Referring now to FIG. 12, an embodiment of an Inter-Domain Link Type Sub-TLV 1200 1200 suitable for implementation in the Inter-Domain Link Sub-TLV 800s 860 field of the Inter-Domain Link TLV 800 of FIG. 8 is shown. The Inter-Domain Link Type Sub-TLV 1200 includes, in some embodiments, a Type field 1210, a Length field 1220, and an Inter-Domain Link Type field 1230. The Type field 1210 includes an identifier of the Inter-Domain Link Type Sub-TLV 1200. The type of the Inter-Domain Link Type Sub-TLV 1200 may be a numeric value that is assigned to the Inter-Domain Link Type Sub-TLV 1200 at a later time and a particular value of the Type field 1210 of the Inter-Domain Link Type Sub-TLV 1200 is not limited herein. The Length field 1220 indicates a length of the Inter-Domain Link Type Sub-TLV 1200, which is dependent upon a particular content included in the Inter-Domain Link Type Sub-TLV 1200, and therefore a particular value of the Length field 1220 of the Inter-Domain Link Type Sub-TLV 1200 is not limited herein. The Inter-Domain Link Type field 1230 includes an identification of a type of Inter-Domain link associated with the CAA NLRI TLV 700. In some embodiments, the type of Inter-Domain link identified in the Inter-Domain Link Type field 1230 is a point-to-point type (e.g., indicated as a type "1") or a multi-access type (e.g., indicated as a type "2").

Referring now to FIG. 13, an embodiment of a Remote AS Number Sub-TLV 1300 suitable for implementation in the Inter-Domain Link Sub-TLVs 860 field of the Inter-Domain Link TLV 800 of FIG. 8 is shown. The Remote AS Number Sub-TLV 1300 includes, in some embodiments, a Type field 1310, a Length field 1320, and a Remote AS Number field 1330. The Type field 1310 includes an identifier of the Remote AS Number Sub-TLV 1300. The type of the Remote AS Number Sub-TLV 1300 may be a numeric value that is assigned to the Remote AS Number Sub-TLV 1300 at a later time and a particular value of the Type field 1310 of the Remote AS Number Sub-TLV 1300 is not limited herein. The Length field 1320 indicates a length of the Remote AS Number Sub-TLV 1300, which is dependent upon a particular content included in the Remote AS Number Sub-TLV 1300, and therefore a particular value of the Length field 1320 of the Remote AS Number Sub-TLV 1300 is not limited herein. The Remote AS Number field 1330 includes an identification of an AS Number of a remote domain associated with an end point of a connection associated with the CAA NLRI TLV 700. In embodiments of the Remote AS Number Sub-TLV 1300 in which the Remote AS Number field 1330 is four octets in length and only two octets are used to identify the Remote AS Number, two of the four octets (e.g., the leftmost or high-order two octets) are set to zero.

Referring now to FIG. 14, an embodiment of a Remote Area-ID Sub-TLV 1400 suitable for implementation in the Inter-Domain Link Sub-TLVs field 860 of the Inter-Domain Link TLV 800 of FIG. 8 is shown. The Remote Area-ID Sub-TLV 1400 includes, in some embodiments, a Type field 1410, a Length field 1420, and an Area Number field 1430. The Type field 1410 includes an identifier the Remote Area-ID Sub-TLV 1400 that indicates a type of the Remote Area-ID Sub-TLV 1400. The type of the Remote Area-ID Sub-TLV 1400 may be a numeric value that is assigned to the Remote Area-ID Sub-TLV 1400 at a later time and a particular value of the Type field 1410 of the Remote Area-ID Sub-TLV 1400 is not limited herein. The Length field 1420 indicates a length of the Remote Area-ID Sub-TLV 1400, which is dependent upon a particular content included in the Remote Area-ID Sub-TLV 1400, and therefore a particular value of the Length field 1420 of the Remote Area-ID Sub-TLV 1400 is not limited herein. The Area Number field 1430 includes an identification of an area or domain in which a remote node of a connection associated with the CAA NLRI TLV 700 is located.

Referring now to FIG. 15, an embodiment of a Remote OSPF Router-ID Sub-TLV 1500 suitable for implementation in the Inter-Domain Link Sub-TLVs 860 field of the Inter-Domain Link TLV 800 of FIG. 8 is shown. The Remote OSPF Router-ID Sub-TLV 1500 includes, in some embodiments, a Type field 1510, a Length field 1520, and an OSPF Router ID field 1530. The Type field 1510 includes an identifier of the Remote OSPF Router-ID Sub-TLV 1500 that indicates a type of the Remote OSPF Router-ID Sub-TLV 1500. The type of the Remote OSPF Router-ID Sub-TLV 1500 may be a numeric value that is assigned to the Remote OSPF Router-ID Sub-TLV 1500 at a later time and a particular value of the Type field 1510 of the Remote OSPF Router-ID Sub-TLV 1500 is not limited herein. The Length field 1520 indicates a length of the Remote OSPF Router-ID Sub-TLV 1500, which is dependent upon a particular content included in the Remote OSPF Router-ID Sub-TLV 1500, and therefore a particular value of the Length field 1520 of the Remote OSPF Router-ID Sub-TLV 1500 is not limited herein. The OSPF Router ID field 1530 includes an identification of a router capable of performing OSPF routing and which is associated with a remote node of a connection associated with the CAA NLRI TLV 700.

Referring now to FIG. 16, an embodiment of a Remote ISIS Router-ID Sub-TLV 1600 suitable for implementation in the Inter-Domain Link Sub-TLVs field 860 of the Inter- Domain Link TLV 800 of FIG. 8 is shown. The Remote ISIS Router-ID Sub-TLV 1600 includes, in some embodiments, a Type field 1610, a Length field 1620, and an ISO Node-ID field 1630. The Type field 1610 includes an identifier of the Remote ISIS Router-ID Sub-TLV 1600 that indicates a type of the Remote ISIS Router-ID Sub-TLV 1600. The type of the ISIS Router-ID Sub-TLV may be a numeric value that is assigned to the Remote ISIS Router-ID Sub-TLV 1600 at a later time and a particular value of the Type field 1610 of the Remote ISIS Router-ID Sub-TLV 1600 is not limited herein. The Length field 1620 indicates a length of the Remote ISIS Router-ID Sub-TLV 1600, which is dependent upon a particular content included in the Remote ISIS Router-ID Sub-TLV 1600, and therefore a particular value of the Length field 1620 of the Remote ISIS Router-ID Sub-TLV 1600 is not limited herein. The ISO Node-ID field 1630 includes an identification of a node conforming to ISO standards which is capable of performing ISIS routing and which is associated with a remote node of a connection associated with the CAA NLRI TLV 700.

Referring now to FIG. 17, an embodiment of an Internet Protocol version 4 (IPv4) Remote ASBR ID Sub-TLV 1700 suitable for implementation in the Inter-Domain Link Sub-TLVs field 860 of the Inter-Domain Link TLV 800 of FIG. 8 is shown. The IPv4 Remote ASBR ID Sub-TLV 1700 includes, in some embodiments, a Type field 1710, a Length field 1720, and an IPv4 Remote ASBR ID field 1730. The Type field 1710 includes an identifier of the IPv4 Remote ASBR ID Sub-TLV 1700 that indicates a type of the IPv4 Remote ASBR ID Sub-TLV 1700. The type of the IPv4 Remote ASBR ID Sub-TLV 1700 may be a numeric value that is assigned to the IPv4 Remote ASBR ID Sub-TLV 1700 at a later time and a particular value of the Type field 1710 of the IPv4 Remote ASBR ID Sub-TLV 1700 is not limited herein. The Length field 1720 indicates a length of the IPv4 Remote ASBR ID Sub-TLV 1700, which is dependent upon a particular content included in the IPv4 Remote ASBR ID Sub-TLV 1700, and therefore a particular value of the Length field 1720 of the IPv4 Remote ASBR ID Sub-TLV 1700 is not limited herein. The IPv4 Remote ASBR ID field 1730 includes an identification of an ASBR associated with a remote node of a connection associated with the CAA NLRI TLV 700. In some embodiments, when an ASBR neighboring a remote node has an IPv4 address, the IPv4 Remote ASBR ID Sub-TLV 1700 is included within the Inter-Domain Link TLV 800. It should be noted that the IPv4 Remote ASBR ID Sub-TLV 1700 is equally applicable to an Internet Protocol version 6 (IPv6) network or node, in which case any use of "IPv4" in the IPv4 Remote ASBR ID Sub-TLV 1700 may be substituted with "IPv6" without departing from the scope of the present disclosure.

Referring now to FIG. 18, an embodiment of a Local Interface IPv4 Address Sub-TLV 1800 suitable for implementation in the Inter-Domain Link Sub-TLVs field 860 of the Inter-Domain Link TLV 800 of FIG. 8 is shown. The Local Interface IPv4 Address Sub-TLV 1800 includes, in some embodiments, a Type field 1810, a Length field 1820, and a Local Interface IPv4 Address(es) field 1830. The Type field 1810 includes an identifier of the Local Interface IPv4 Address Sub-TLV 1800 that indicates a type of the Local Interface IPv4 Address Sub-TLV 1800. The type of the Local Interface IPv4 Address Sub-TLV 1800 may be a numeric value that is assigned to the Local Interface IPv4 Address Sub-TLV 1800 at a later time and a particular value of the Type field 1810 of the Local Interface IPv4 Address Sub-TLV 1800 is not limited herein. The Length field 1820 indicates a length of the Local Interface IPv4 Address Sub-TLV 1800, which is dependent upon a particular content included in the Local Interface IPv4 Address Sub-TLV 1800, and therefore a particular value of the Length field 1820 of the Local Interface IPv4 Address Sub-TLV 1800 is not limited herein. The Local Interface IPv4 Address(es) field 1830 includes one or more IPv4 addresses of one or more interfaces corresponding to the inter-domain link, wherein the interfaces are associated with a local node of a connection associated with the CAA NLRI TLV 700. It should be noted that the Local Interface IPv4 Address Sub-TLV 1800 is equally applicable to an IPv6 network or node, in which case any use of "IPv4" in the Local Interface IPv4 Address Sub-TLV 1800 may be substituted with "IPv6" without departing from the scope of the present disclosure.

Referring now to FIG. 19, an embodiment of a Remote Interface IPv4 Address Sub-TLV 1900 suitable for implementation in the Inter-Domain Link Sub-TLVs field 860 of the Inter-Domain Link TLV 800 of FIG. 8 is shown. The Remote Interface IPv4 Address Sub-TLV 1900 includes, in some embodiments, a Type field 1910, a Length field 1920, and a Neighbor Interface IPv4 Address(es) field 1930. The Type field 1910 includes an identifier of the Remote Interface IPv4 Address Sub-TLV 1900 that indicates a type of the Remote Interface IPv4 Address Sub-TLV 1900. The type of the Remote Interface IPv4 Address Sub-TLV 1900 may be a numeric value that is assigned to the Remote Interface IPv4 Address Sub-TLV 1900 at a later time and a particular value of the Type field 1910 of the Remote Interface IPv4 Address Sub-TLV 1900 is not limited herein. The Length field 1920 indicates a length of the Remote Interface IPv4 Address Sub-TLV 1900, which is dependent upon a particular content included in the Remote Interface IPv4 Address Sub-TLV 1900, and therefore a particular value of the Length field 1920 of the Remote Interface IPv4 Address Sub-TLV 1900 is not limited herein. The Neighbor Interface IPv4 Address(es) field 1930 includes one or more neighbor IPv4 addresses of one or more neighbor interfaces corresponding to the inter-domain link, wherein the neighbor interfaces are associated with a remote node of a connection associated with the CAA NLRI TLV 700. The neighbor IPv4 addresses, in some embodiments, are used with the IPv4 addresses of the Local Interface IPv4 Address Sub-TLV 1800 of FIG. 18 to determine multiple parallel links between domains and/or network elements. It should be noted that the Remote Interface IPv4 Address Sub-TLV 1900 is equally applicable to an IPv6 network or node, in which case any use of "IPv4" in the Remote Interface IPv4 Address Sub-TLV 1900 may be substituted with "IPv6" without departing from the scope of the present disclosure.

Referring now to FIG. 20, an embodiment of an Access IPv4 Prefix TLV 2000 suitable for implementation in the Access-Address-List field 750 of the CAA NLRI TLV 700 of FIG. 7 is shown. The Access IPv4 Prefix TLV 2000 includes, in some embodiments, a Type field 2010, a Length field 2020, an AS Number field 2030, an Area-ID Sub-TLV field 2040, and an Access IPv4 Prefix Sub-TLVs field 2050. The Type field 2010 includes an identifier of the Access IPv4 Prefix TLV 2000. The type of the Access IPv4 Prefix TLV 2000 may be a numeric value that is assigned to the Access IPv4 Prefix TLV 2000 at a later time and a particular value of the Type field 2010 of the Access IPv4 Prefix TLV 2000 is not limited herein. The Length field 2020 indicates a length of the Access IPv4 Prefix TLV 2000, which is dependent upon a particular content included in the Access IPv4 Prefix TLV 2000, and therefore a particular value of the Length field 2020 of the Access IPv4 Prefix TLV 2000 is not limited herein. The AS Number field 2030, in some embodiments, indicates an identity of a domain in which an end point of a service and/or node associated with the CAA NLRI TLV 700 that carries the Access IPv4 Prefix TLV 2000 is associated. The Area-ID Sub-TLV field 2040, in some embodiments, contains an Area-ID Sub-TLV such as the Area-ID Sub-TLV 900 described above with respect to FIG. 9. The Access IPv4 Prefix Sub-TLVs field 2050 includes one or more Sub-TLVs which are discussed in greater detail below. It should be noted that the Access IPv4 Prefix TLV 2000 is equally applicable to an IPv6 network or node, in which case any use of "IPv4" in the Access IPv4 Prefix TLV 2000 may be substituted with "IPv6" without departing from the scope of the present disclosure.

Figure 21:
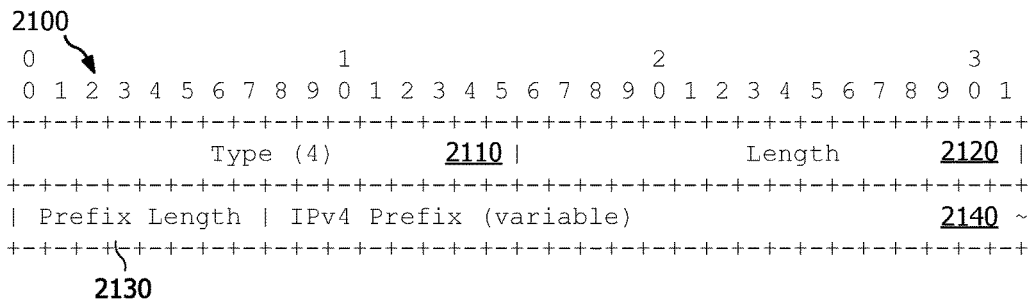
FIG. 21 is an embodiment of an Access IPv4 Prefix Sub-TLV.

Referring now to FIG. 21, an embodiment of an Access IPv4 Prefix Sub-TLV 2100 suitable for implementation in the Access IPv4 Prefix Sub-TLVs field 2050 of the Access IPv4 Prefix TLV 2000 of FIG. 20 is shown. The Access IPv4 Prefix Sub-TLV 2100 includes, in some embodiments, a Type field 2110, a Length field 2120, a Prefix Length field 2130, and an IPv4 Prefix field 2140. The Type field 2110 includes an identifier of the Access IPv4 Prefix Sub-TLV 2100. The type of the Access IPv4 Prefix Sub-TLV 2100 may be a numeric value that is assigned to the Access IPv4 Prefix Sub-TLV 2100 at a later time and a particular value of the Type field 2110 of the Access IPv4 Prefix Sub-TLV 2100 is not limited herein. The Length field 2120 indicates a length of the Access IPv4 Prefix Sub-TLV 2100 (e.g., such as the Prefix Length Field 2130 combined with the IPv4 Prefix field 2140). For example, the Length field 2120 may indicate a length of four octets for the Prefix Length Field 2130 combined with the IPv4 Prefix field 2140. The Prefix Length field 2130 indicates a length of the subsequent IPv4 Prefix in the IPv4 Prefix field 2140. The IPv4 Prefix, in some embodiments, has a variable length, and as such, a particular value of the Prefix Length field 2130 is not limited herein. The IPv4 Prefix field 2140 includes an identification of an access of a domain associated with a service and/or node associated with the CAA NLRI TLV 700 (e.g., an access point or other network element within a domain controlled by a network element transmitting the CAA NLRI TLV 700 which is accessible outside of the domain). It should be noted that the Access IPv4 Prefix Sub-TLV 2100 is equally applicable to an IPv6 network or node, in which case any use of "IPv4" in the Access IPv4 Prefix Sub-TLV 2100 may be substituted with "IPv6" without departing from the scope of the present disclosure.

Figure 22:
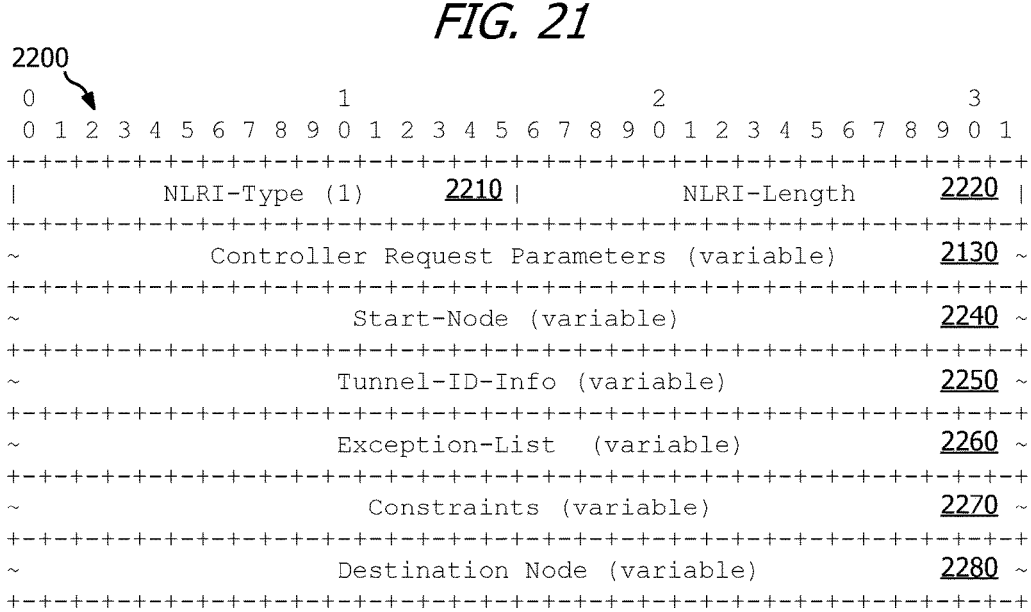
FIG. 22 is an embodiment of a Request for Computing Path Segment (CPSReq) NLRI TLV.

Referring now to FIG. 22, an embodiment of a CPSReq NLRI TLV 2200 is shown. The CPSReq NLRI TLV 2200 is implemented in a message transmitted between two network elements (e.g., between the parent controller 106 and any one or more of the child controllers 108) to request computation of path segments, for example, in an HSCS network such as the HSCS 100 of FIG. 1. The CPSReq NLRI TLV 2200 is transmitted, in some embodiments, in the SDN NLRI TLV 600 of FIG. 6, for example, in the SDN NLRI Value field 630.

As shown in FIG. 22, the CPSReq NLRI TLV 2200 includes a NLRI-Type field 2210, a NLRI-Length field 2220, a CRP field 2230, a Start-Node field 2240, a Tunnel-ID-Info field 2250, an Exception-List field 2260, a Constraints field 2270, and a Destination Node field 2280. The NLRI-Type field 2210 includes an identifier of the CPSReq NLRI TLV 2200 that indicates an intended meaning of the CPSReq NLRI and content of the CPSReq NLRI TLV 2200. For example, exemplary contents of the NLRI-Type field 2210 are shown above in Table 1. The NLRI-Length field 2220 indicates a length of the CPSReq NLRI TLV 2200 which is dependent upon a particular content included in the CPSReq NLRI TLV 2200, and therefore a particular value of the NLRI-Length field 2220 of the CPSReq NLRI TLV 2200 is not limited herein. The CRP field 2230, in some embodiments, contains a CRP TLV that specifies various parameters relating to a tunnel related operation request, as will be discussed in greater detail below. The Start-Node field 2240 describes a start node (e.g., as an address or identifier of the start node) in a domain controlled by a child controller that receives the CPSReq NLRI TLV 2200. The start node is, for example, the node from which the child controller computes one or more path segments in response to the CPSReq NLRI TLV 2200. The Tunnel-ID-Info field 2250 indicates a global tunnel identifier (GTID) and a path identifier (PID) associated with a tunnel corresponding to the CPSReq NLRI TLV 2200 (e.g., a tunnel which may have one or more tunnel segments constructed along one or more paths computed by the child controller in response to the CPSReq NLRI TLV 2200). The Exception-List field 2260 indicates nodes (e.g., network elements) in the domain of the child controller and in domains adjacent to the domain of the child controller which exist in the SPT of the parent controller sending the CPSReq NLRI TLV 2200 (e.g., as a result of previous CPSReq NLRI TLV 2200s). The Constraints field 2270 indicates constraints (e.g., bandwidth, quality of service (QoS), etc.) specified by the parent controller sending the CPSReq NLRI TLV 2200 which path segments computed by the child controller in response to the CPSReq NLRI TLV 2200 should satisfy. The Destination Node field 2280 indicates an address or identifier of a destination node to which the parent controller wishes to build the SPT. In some embodiments, the destination node is in the domain controlled by the child controller that receives the CPSReq NLRI TLV 2200, while in other embodiments the destination node is in a domain not controlled by the child controller that receives the CPSReq NLRI TLV 2200.

Figure 23:
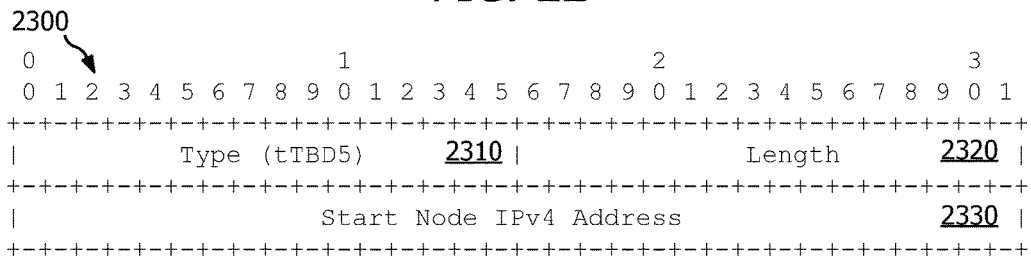
FIG. 23 is an embodiment of a Start-Node TLV.

Referring now to FIG. 23, an embodiment of a Start-Node TLV 2300 is shown. The Start-Node TLV 2300 may be implemented in any of the messages according to various embodiments of the present disclosure to indicate an identification of a start node for an E2E tunnel and or a path segment or tunnel segment (e.g., for creation of path segments and/or tunnel segments beginning with the start node). For example, the Start-Node TLV 2300 is suitable for implementation, in some embodiments, in the various messages transmitted between the parent controller 106 and any one or more of the child controllers 108, each of FIG. 1, and/or between any two distributed controllers 210A-210E of FIG. 2, for example, in a Start-Node field (e.g., such as at least the Start-Node field 1140 of the CPSReq 2200 of FIG. 22). The Start-Node TLV 2300 includes, in some embodiments, a Type field 2310, a Length field 2320, and a Start Node IPv4 Address field 2340. The Type field 2310 includes an identifier of the Start-Node TLV 2300 that indicates a type of the Start-Node TLV 2300. The type of the Start-Node TLV 2300 may be a numeric value that is assigned to the Start-Node TLV 2300 at a later time and a particular value of the Type field 2310 of the Start-Node TLV 2300 is not limited herein. The Length field 2320 indicates a length of the Start-Node TLV 2300, which is dependent upon a particular content included in the Start-Node TLV 2300, and therefore a particular value of the Length field 2320 of the Start-Node TLV 2300 is not limited herein. The Start Node IPv4 Address field 2330 includes, in some embodiments, an Internet Protocol (IP) address (e.g., an IPv4 address or an IPv6 address) of the start node from which the path segments and/or the tunnel segments should be computed and/or created (or have previously been created when the Start-Node TLV 2300 is included in a message for keeping or removing path segments).

Referring now to FIG. 24, an embodiment of a Tunnel-ID-Info TLV 2400 is shown. The Tunnel-ID-Info TLV 2400 may be implemented in any of the messages according to various embodiments of the present disclosure to uniquely identify an E2E tunnel and/or a path of the E2E tunnel. For example, the Tunnel-ID-Info TLV 2400 is suitable for implementation, in some embodiments, in the various messages transmitted between the parent controller 106 and any one or more of the child controllers 108, each of FIG. 1, and/or between any two distributed controllers 210A-210E of FIG. 2, for example, in a Tunnel-ID-Info field (e.g., such as at least the Tunnel-ID-Info field 2250 of the CPSReq 2200 of FIG. 22). The Tunnel-ID-Info TLV 2400 includes, in some embodiments, a Type field 2410, a Length field 2420, a Tunnel ID field 2430, a Path ID field 2440, a Reserved field 2450, and an Optional Sub-TLVs field 2460. The Type field 2410 includes an identifier of the Tunnel-ID-Info TLV 2400 that indicates a type of the Tunnel-ID-Info TLV 2400. The type of the Tunnel-ID-Info TLV 2400 may be a numeric value that is assigned to the Tunnel-ID-Info TLV 2400 at a later time and a particular value of the Type field 2410 of the Tunnel-ID-Info TLV 2400 is not limited herein. The Length field 2420 indicates a length of the Tunnel-ID-Info TLV 2400, which is dependent upon a particular content included in the Tunnel-ID-Info TLV 2400, and therefore a particular value of the Length field 2420 of the Tunnel-ID-Info TLV 2400 is not limited herein. The Tunnel ID field 2430, in some embodiments, includes a global identification associated with an E2E tunnel associated with the Tunnel-ID-Info TLV 2400. For example, in at least some embodiments the Tunnel ID field 2430 includes the GTID. In some embodiments, the Tunnel ID field 2430 (and correspondingly, the GTID) includes 32 bits, while in other embodiments the Tunnel ID field 2430 includes any number of bits suitable for conveying a global identification of an E2E tunnel. The Path ID field 2440, in some embodiments, includes an identification of a path within the E2E tunnel identified in the Tunnel ID field 2430. For example, in at least some embodiments the Path ID field 2440 includes the PID. In some embodiments, the Path ID field 2440 (and correspondingly, the PID) includes 16 bits, while in other embodiments the Path ID field 2440 includes any number of bits suitable for conveying an identification of a path within the E2E tunnel. The Reserved field 2450 has a length 32 bits minus a length of the Path ID 2440 in bits and each bit of the Reserved field 2450, in at least some embodiments, is set to zero. The Optional Sub-TLVs field 2460, in some embodiments, contains Sub-TLVs that may be optional to operation of a network element that receives the Optional Sub-TLVs but which, when present, provide additional information related to path segment computation and/or tunnel creation in a network in which the network element operates.

Referring now to FIG. 25, an embodiment of an Exception-List TLV 2500 is shown. The Exception-List TLV 2500 may be implemented in any of the messages according to various embodiments of the present disclosure to identify nodes which should not be considered in computing path segments and/or creating tunnel segments. For example, the Exception-List TLV 2500 is suitable for implementation, in some embodiments, in the various messages transmitted between the parent controller 106 and any one or more of the child controllers 108, each of FIG. 1, and/or between any two distributed controllers 210A-210E of FIG. 2, for example, in an Exception-List field (e.g., such as at least the Exception-List field 2260 of the CPSReq 2200 of FIG. 22). The Exception-List TLV 2500 includes, in some embodiments, a Type field 2510, a Length field 2520, and one or more Exception Node IPv4 Address fields 2530. The Type field 2510 includes an identifier of the Exception-List TLV 2500 that indicates a type of the Exception-List TLV 2500. The type of the Exception-List TLV 2500 may be a numeric value that is assigned to the Exception-List TLV 2500 at a later time and a particular value of the Type field 2510 of the Exception-List TLV 2500 is not limited herein. The Length field 2520 indicates a length of the Exception-List TLV 2500, which is dependent upon a particular content included in the Exception-List TLV 2500, and therefore a particular value of the Length field 2520 of the Exception-List TLV 2500 is not limited herein. Each of the one or more Exception Node IPv4 Address fields 2530 includes an IPv4 address of a node or network element which, in some embodiments, should not be considered in computing path segments and/or creating tunnel segments (e.g., because a path to the node included in the Exception-List TLV 2500 is already know). It should be noted that the Exception-List TLV 2500 is equally applicable to an IPv6 network or node, in which case any use of "IPv4" in the Exception-List TLV 2500 may be substituted with "IPv6" without departing from the scope of the present disclosure.

Referring now to FIG. 26, an embodiment of a Bandwidth TLV 2600 is shown. The Bandwidth TLV 2600 may be implemented in any of the messages according to various embodiments of the present disclosure to identify a minimum bandwidth that must be supported by a path segment and/or a tunnel segment. For example, the Bandwidth TLV 2600 is suitable for implementation, in some embodiments, in the various messages transmitted between the parent controller 106 and any one or more of the child controllers 108, each of FIG. 1, and/or between any two distributed controllers 210A-210E of FIG. 2, for example, in a Constraints field, such as at least the constraints field 2270 of the CPSReq 2200 of FIG. 22. The Bandwidth TLV 2600 includes, in some embodiments, a Type field 2610, a Length field 2620, and a Bandwidth field 2630. The Type field 2610 includes an identifier of the Bandwidth TLV 2600 that indicates a type of the Bandwidth TLV 2600. The type of the Bandwidth TLV 2600 may be a numeric value that is assigned to the Bandwidth TLV 2600 at a later time and a particular value of the Type field 2610 of the Bandwidth TLV 2600 is not limited herein. The Length field 2620 indicates a length of the Bandwidth TLV 2600, which is dependent upon a particular content included in the Bandwidth TLV 2600, and therefore a particular value of the Length field 2620 of the Bandwidth TLV 2600 is not limited herein. The Bandwidth field 2630 indicates a desired bandwidth (e.g., as expressed as a number of bytes per second) that path segments and/or tunnel segments should be capable of supporting. For example, in some embodiments, the desired bandwidth is represented in a 32-bit Institute of Electrical and Electronics Engineers (IEEE) floating point format as contained in Section 3.1.2 of IETF RFC 3471, published January 2003, the contents of which are hereby incorporated by reference in their entirety.

Figure 27:
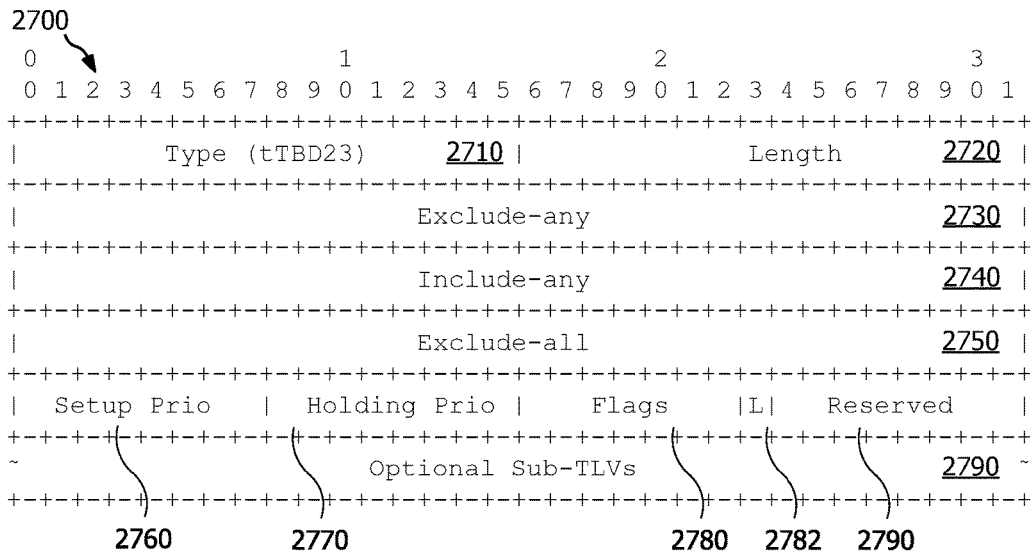
FIG. 27 is an embodiment of a Label Switched Path (LSP) Attributes (LSPA) TLV.

Referring now to FIG. 27, an embodiment of a LSP Attributes (LSPA) TLV 2700 is shown. The LSPA TLV 2700 may be implemented in any of the messages according to various embodiments of the present disclosure to identify attributes that must be supported by a path segment and/or a tunnel segment. For example, the LSPA TLV 2700 is suitable for implementation, in some embodiments, in the various messages transmitted between the parent controller 106 and any one or more of the child controllers 108, each of FIG. 1, and/or between any two distributed controllers 210A-210E of FIG. 2, for example, in a Constraints field, such as at least the constraints field 2270 of the CPSReq 2200 of FIG. 22. The LSPA TLV 2700 includes, in some embodiments, a Type field 2710, a Length field 2720, an Exclude-any field 2730, an Include-any field 2740, an Exclude-all field 2750, a Setup Priority (Setup Prio) field 2760, a Holding Priority (Holding Prio) field 2770, a Flags field 2780 including a 1-bit Local Protection desired (L) bit 2782, (e.g., as defined in IETF RFC 3209, published December 2001, which is hereby incorporated by reference in its entirety), a Reserved field 2784, and an Optional Sub-TLVs field 2790. The Type field 2710 includes an identifier of the LSPA TLV 2700 that indicates a type of the LSPA TLV 2700. The type of the LSPA TLV 2700 may be a numeric value that is assigned to the LSPA TLV 2700 at a later time and a particular value of the Type field 2710 of the LSPA TLV 2700 is not limited herein. The Length field 2720 indicates a length of the LSPA TLV 2700, which is dependent upon a particular content included in the LSPA TLV 2700, and therefore a particular value of the Length field 2720 of the LSPA TLV 2700 is not limited herein. The Exclude-any field 2730 includes a 32-bit vector representing a set of attribute filters associated with a tunnel, any of which renders a link unacceptable. The Include-any field 2740 includes a 32-bit vector representing a set of attribute filters associated with a tunnel, any of which renders a link acceptable (e.g., with respect to the LSPA TLV 2700 being tested as a constraint in computing a path segment and/or creating a tunnel segment). For example, a null set (such as with all bits set to zero) automatically passes. The Include-all field 2750 includes a 32-bit vector representing a set of attribute filters associated with a tunnel all of which must be present for a link to be acceptable (e.g., with respect to the LSPA TLV 2700 being tested as a constraint in computing a path segment and/or creating a tunnel segment). For example, a null set (such as with all bits set to zero) automatically passes. The Setup Priority field 2760 indicates a priority of a TE LSP session associated with the LSPA TLV 2700 with respect to taking resources, for example, to determine whether the TE LSP session may preempt another session. In some embodiments, the Setup Priority field 2760 includes a value ranging from 0 (e.g., highest priority) to 7 (e.g., lowest priority). The Holding Priority field 2770 indicates a priority of a TE LSP session associated with the LSPA TLV 2700 with respect to holding resources (e.g., previously taken or reserved resources), for example, to determine whether another session may preempt the TE LSP session. In some embodiments, the Holding Priority field 2770 includes a value ranging from 0 (e.g., highest priority) to 7 (e.g., lowest priority). The Flags field 2780 includes a 1-bit L flag bit 2782 that indicates any path segments that are computed must include links protected with Fast Reroute protection, as described in IETF RFC 4090, published May 2005, which is hereby incorporated by reference in its entirety. A remainder of the bits in the Flags field 2780 (e.g., unassigned bits), as well as the Reserved field 2784, are set to zero by a transmitting network element and ignored by a receiving network element. The Optional Sub-TLVs field 2790, in some embodiments, contains Sub-TLVs that may be optional to operation of a network element that receives the Optional Sub-TLVs but which, when present, provide additional information related to path segment computation and/or tunnel creation in a network in which the network element operates.

Figure 28:
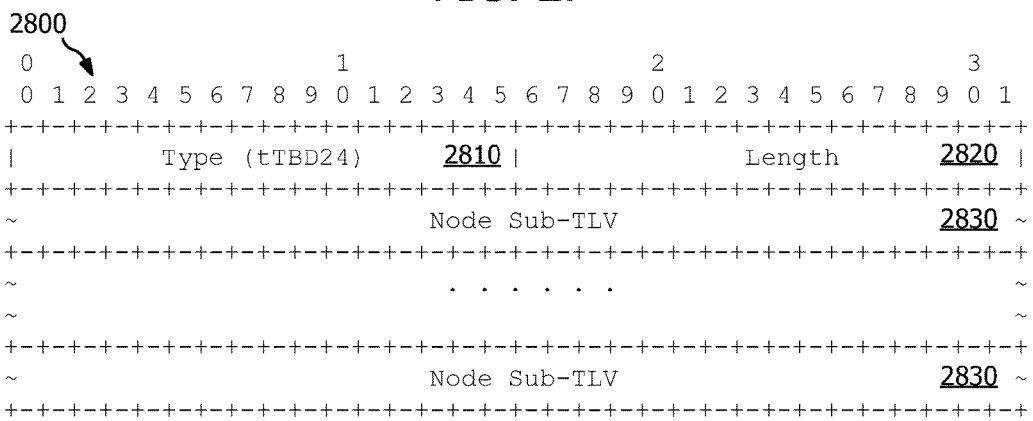
FIG. 28 is an embodiment of an Explicit Route (ER) TLV.

Referring now to FIG. 28, an embodiment of an Explicit Route (ER) TLV 2800 is shown. The ER TLV 2800 may be implemented in any of the messages according to various embodiments of the present disclosure to explicitly identify nodes through which a path segment and/or a tunnel segment should traverse. For example, the ER TLV 2800 is suitable for implementation, in some embodiments, in the various messages transmitted between the parent controller 106 and any one or more of the child controllers 108, each of FIG. 1, and/or between any two distributed controllers 210A-210E of FIG. 2, for example, in a Constraints field, such as at least the constraints field 2270 of the CPSReq 2200 of FIG. 22. The ER TLV 2800 includes, in some embodiments, a Type field 2810, a Length field 2820, and one or more Node Sub-TLV fields 2830. The Type field 2810 includes an identifier of the ER TLV 2800 that indicates a type of the ER TLV 2800. The type of the ER TLV 2800 may be a numeric value that is assigned to the ER TLV 2800 at a later time and a particular value of the Type field 2810 of the ER TLV 2800 is not limited herein. The Length field 2820 indicates a length of the ER TLV 2800, which is dependent upon a particular content included in the ER TLV 2800, and therefore a particular value of the Length field 2820 of the ER TLV 2800 is not limited herein. The Node Sub-TLV fields 2830 each include one or more Sub-TLVs which are discussed in greater detail below.

Figure 29:
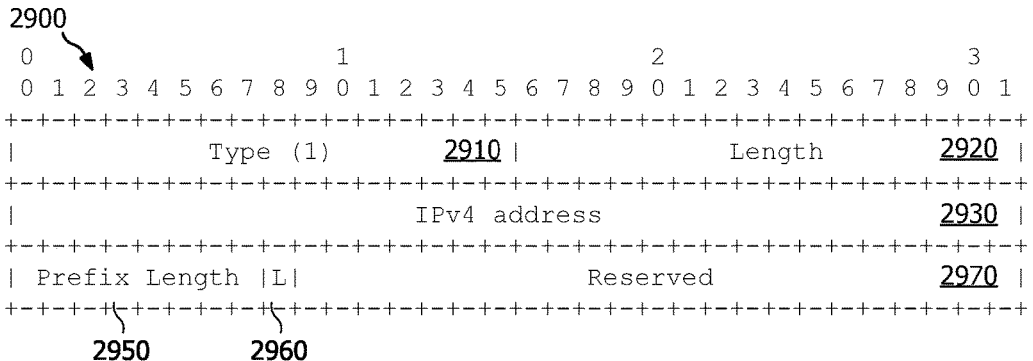
FIG. 29 is an embodiment of an IPv4 prefix Node Sub-TLV.

Referring now to FIG. 29, an embodiment of an IPv4 prefix Node Sub-TLV 2900 is shown. The IPv4 prefix Node Sub-TLV 2900 may be implemented in any of the messages according to various embodiments of the present disclosure to identify a node within a network such as the HSCS 100 of FIG. 1 and/or the DSCS 200 of FIG. 2. For example, the IPv4 prefix Node Sub-TLV 2900 is suitable for implementation, in some embodiments, in the various messages transmitted between the parent controller 106 and any one or more of the child controllers 108, each of FIG. 1, and/or between any two distributed controllers 210A-210E of FIG. 2, for example, in a Node Sub-TLV field, such as at least the Node Sub-TLV field 2830 of the ER TLV 2800 of FIG. 28. The IPv4 prefix Node Sub-TLV 2900 includes, in some embodiments, a Type field 2910, a Length field 2920, an IPv4 Address field 2940, a Prefix Length field 2950, a L flag bit 2960, and a Reserved field 2970. The Type field 2910 includes an identifier of the IPv4 prefix Node Sub-TLV 2900. The type of the IPv4 prefix Node Sub-TLV 2900 may be a numeric value that is assigned to the IPv4 prefix Node Sub-TLV 2900 at a later time and a particular value of the Type field 2910 of the IPv4 prefix Node Sub-TLV 2900 is not limited herein. The Length field 2920 indicates a length of the IPv4 prefix Node Sub-TLV 2900, which is dependent upon a particular content included in the IPv4 prefix Node Sub-TLV 2900, and therefore a particular value of the Length field 2920 of the IPv4 prefix Node Sub-TLV 2900 is not limited herein. The IPv4 Address field 2930 includes an address of a node in the network. The Prefix Length field 2940 indicates a length of the IPv4 Address in the IPv4 Address field 2930. The L flag bit 2950 indicates whether the IPv4 prefix Node Sub-TLV 2900 represents a loose hop (e.g., the node identified in the IPv4 Address field 2930 is not required to be directly coupled to an immediately preceding node in an LSP when the L flag bit 2950 is set to "1"), or whether the IPv4 prefix Node Sub-TLV 2900 represents a strict hop (e.g., the node identified in the IPv4 Address field 2930 must be directly coupled to an immediately preceding node in an LSP when the L flag bit 2950 is set to "0"). Each bit of the Reserved field 2960 is set to zero and ignored on receipt. It should be noted that the IPv4 prefix Node Sub- TLV 2900 is equally applicable to an IPv6 network or node, in which case any use of "IPv4" in the IPv4 prefix Node Sub-TLV 2900 may be substituted with "IPv6" without departing from the scope of the present disclosure.

Referring now to FIG. 30, an embodiment of an AS Number (ASN) Node Sub-TLV 3000 is shown. The ASN Node Sub-TLV 3000 may be implemented in any of the messages according to various embodiments of the present disclosure to identify a node within a network such as the HSCS 100 of FIG. 1 and/or the DSCS 200 of FIG. 2. For example, the ASN Node Sub-TLV 3000 is suitable for implementation, in some embodiments, in the various messages transmitted between the parent controller 106 and any one or more of the child controllers 108, each of FIG. 1, and/or between any two distributed controllers 210A-210E of FIG. 2, for example, in a Node Sub-TLV field, such as at least the Node Sub-TLV field 2830 if the ER TLV 2800 of FIG. 28. The ASN Node Sub-TLV 3000 includes, in some embodiments, a Type field 3010, a Length field 3020, and an ASN field 3030. The Type field 3010 includes an identifier of the ASN Node Sub-TLV 3000 that indicates a type of the ASN Node Sub-TLV 3000. The type of the ASN Node Sub-TLV 3000 may be a numeric value that is assigned to the ASN Node Sub-TLV 3000 at a later time and a particular value of the Type field 3010 of the ASN Node Sub-TLV 3000 is not limited herein. The Length field 3020 indicates a length of the ASN Node Sub-TLV 3000, which is dependent upon a particular content included in the ASN Node Sub-TLV 3000, and therefore a particular value of the Length field 3020 of the ASN Node Sub-TLV 3000 is not limited herein. The ASN field 3030 includes an ASN of a node in the network.

Referring now to FIG. 31, an embodiment of a Destination Node List TLV 3100 is shown. The Destination Node List TLV 3100 may be implemented in any of the messages according to various embodiments of the present disclosure to identify a destination node for computing path segments and/or creating tunnel segments within a network such as the HSCS 100 of FIG. 1 and/or the DSCS 200 of FIG. 2. For example, the Destination Node List TLV 3100 is suitable for implementation, in some embodiments, in the various messages transmitted between the parent controller 106 and any one or more of the child controllers 108, each of FIG. 1, and/or between any two distributed controllers 210A-210E of FIG. 2, for example, in a Destination Node field, such as at least the Destination Node field 2280 of the CPSReq NLRI TLV 2200 of FIG. 22. The Destination Node List TLV 3100 includes, in some embodiments, a Type field 3110, a Length field 3120, and one or more Destination Node IPv4 Address fields 3130. The Type field 3110 includes an identifier of the Destination Node List TLV 3100 that indicates a type of the Destination Node List TLV 3100. The type of the Destination Node List TLV 3100 may be a numeric value that is assigned to the Destination Node List TLV 3100 at a later time and a particular value of the Type field 3110 of the Destination Node List TLV 3100 is not limited herein. The Length field 3120 indicates a length of the Destination Node List TLV 3100, which is dependent upon a particular content included in the Destination Node List TLV 3100, and therefore a particular value of the Length field 3120 of the Destination Node List TLV 3100 is not limited herein. Each of the one or more Destination Node IPv4 Address fields 3130 includes an IPv4 address of a node or network element that is a destination node in the network, for example, for computation of path segments, growing a SPT, and/or creating tunnel segments. It should be noted that the Destination Node List TLV 3100 is equally applicable to an IPv6 network or node, in which case any use of "IPv4" in the Destination Node List TLV 3100 may be substituted with "IPv6" without departing from the scope of the present disclosure.

Referring now to FIG. 32, an embodiment of a CPSRep NLRI TLV 3200 is shown. The CPSRep NLRI TLV 3200 is implemented in a message transmitted between two network elements (e.g., between any one or more of the child controllers 108 and the parent controller 106, each of FIG. 1) in response to a request for computation of path segments (e.g., the CPSReq NLRI TLV 2200 2200, as discussed above with respect to FIG. 22), for example, in an HSCS network such as the HSCS 100 of FIG. 1. The CPSRep NLRI TLV 3200 is transmitted, in some embodiments, in the SDN NLRI TLV 600 of FIG. 6, for example, in the SDN NLRI Value field 630.

As shown in FIG. 32, the CPSRep NLRI TLV 3200 includes a NLRI-Type field 3210, a NLRI-Length field 3220, a CRP field 3230, a Start-Node field 3240, a Tunnel-ID-Info field 3250, a Segment End List field 3260, a Metric List field 3270, and a No Path field 3280. The NLRI-Type field 3210 includes an identifier of the CPSRep NLRI TLV 3200 that indicates an intended meaning of the CPSRep NLRI and content of the CPSRep NLRI TLV 3200. For example, exemplary contents of the NLRI-Type field 3210 are shown above in Table 1. The NLRI-Length field 3220 indicates a length of the CPSRep NLRI TLV 3200 which is dependent upon a particular content included in the CPSRep NLRI TLV 3200, and therefore a particular value of the NLRI-Length field 3220 of the CPSRep NLRI TLV 3200 is not limited herein. The CRP field 3230, in some embodiments, contains a CRP TLV that specifies various parameters relating to a tunnel related operation request, as will be discussed in greater detail below. The Start-Node field 3240 indicates an address or identifier of a start node from which the child controller computed the path segments being reported in the CPSRep NLRI TLV 3200. For example, the start node indicated in the CPSRep NLRI TLV 3200 may be the start node identified to the child controller by the parent controller in the CPSReq NLRI TLV 2200, as discussed above with respect to FIG. 22. In some embodiments, the Start-Node field 3240 includes a Start-Node TLV, such as the Start-Node TLV 2300 of FIG. 23, to indicate the address of the start node. The Tunnel-ID-Info field 3250 indicates the GTID and the PID associated with a tunnel corresponding to the CPSRep NLRI TLV 3200. In some embodiments, the Tunnel-ID-Info field 3250 indicates the GTID and the PID in a Tunnel-ID-Info TLV, such as the Tunnel-ID-Info TLV 2400 of FIG. 24. For example, the GTID and the PID indicated in the Tunnel-ID-Info field 3250 of the CPSRep NLRI TLV 3200 may be the GTID and the PID identified to the child controller by the parent controller in the CPSReq NLRI TLV 2200, as discussed above with respect to FIG. 22. The Segment End List field 3260 indicates, for each path computed by the child controller in response to receiving the CPSReq NLRI TLV 2200, an end node of the computed path segment and a cost associated with reaching that end node from the start node identified in the Start-Node field 3240. The Metric List field 3270 indicates one or more Segment End Node IGP metric values and/or one or more Segment End Node Traffic Engineering (TE) metric values associated with the end nodes identified in the Segment End List field 3260. Particular values included in the Segment End Node IGP metric values and/or the Segment End Node TE metric values may be determined according to an implementation of the Metric List field and are not limited herein. The No Path field 3280 indicates to the parent controller receiving the CPSRep NLRI TLV 3200 that the child controller was unable to compute any path segments in response to the CPSReq NLRI TLV 2200 received by the child controller from the parent controller.

Figure 33:
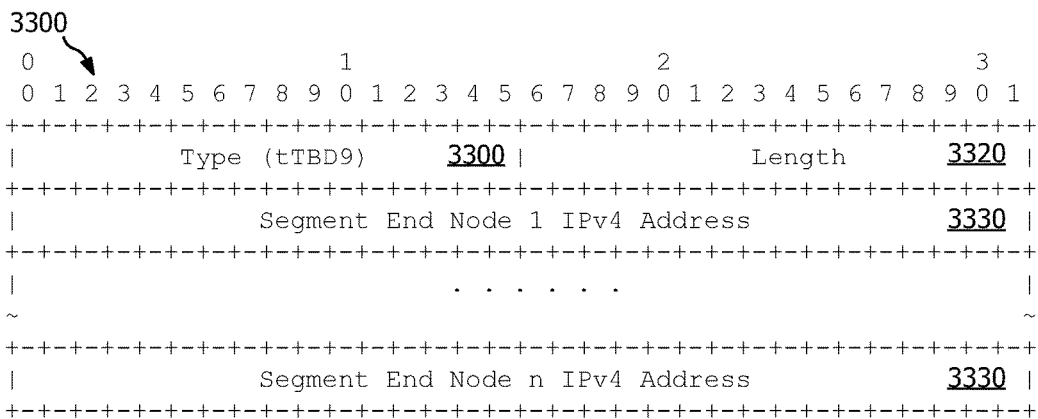
FIG. 33 is an embodiment of a Segment End Node List TLV.

Referring now to FIG. 33, an embodiment of a Segment End Node List TLV 3300 is shown. The Segment End Node List TLV 3300 may be implemented in any of the messages according to various embodiments of the present disclosure to identify end nodes for path segments computed in a network such as the HSCS 100 of FIG. 1, as discussed above. For example, the Segment End Node List TLV 3300 is suitable for implementation, in some embodiments, in the various messages transmitted between the parent controller 106 and any one or more of the child controllers 108, each of FIG. 1, and/or between any two distributed controllers 210A-210E of FIG. 2, for example, in a Segment End List field, such as at least the Segment End List field 3260 of the CPSRep NLRI TLV 3200 of FIG. 32. The Segment End Node List TLV 3300 includes, in some embodiments, a Type field 3310, a Length field 3320, and one or more Segment End Node IPv4 Address fields 3330. The Type field 3310 includes an identifier of the Segment End Node List TLV 3300 that indicates a type of the Segment End Node List TLV 3300. The type of the Segment End Node List TLV 3300 may be a numeric value that is assigned to the Segment End Node List TLV 3300 at a later time and a particular value of the Type field 3310 of the Segment End Node List TLV 3300 is not limited herein. The Length field 3320 indicates a length of the Segment End Node List TLV 3300, which is dependent upon a particular content included in the Segment End Node List TLV 3300, and therefore a particular value of the Length field 3320 of the Segment End Node List TLV 3300 is not limited herein. Each of the one or more Segment End Node IPv4 Address fields 3330 includes an IPv4 address of a node or network element that is an end node of a path segment computed in the network. It should be noted that the Segment End Node List TLV 3300 is equally applicable to an IPv6 network or node, in which case any use of "IPv4" in the Segment End Node List TLV 3300 may be substituted with "IPv6" without departing from the scope of the present disclosure.

Figure 34:
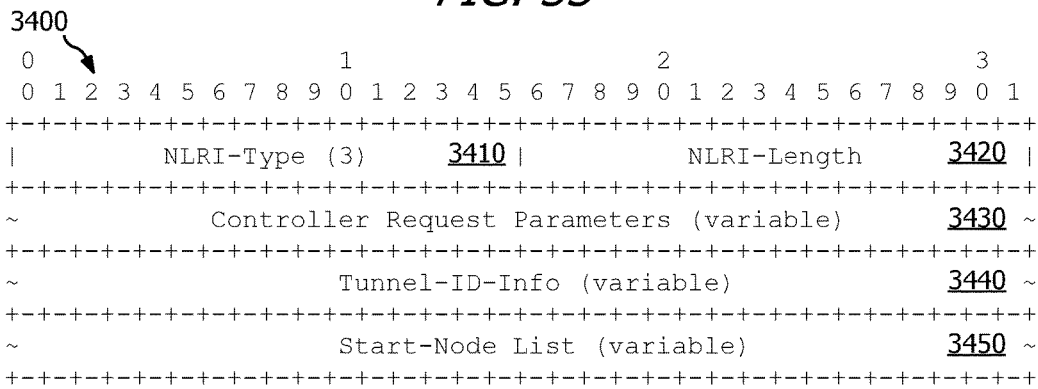
FIG. 34 is an embodiment of a Request for Removing Path Segment (RPSReq) NLRI TLV.

Referring now to FIG. 34, an embodiment of a RPSReq NLRI TLV 3400 is shown. The RPSReq NLRI TLV 3400 is implemented in a message transmitted between two network elements (e.g., between the parent controller 106 and any one or more of the child controllers 108, each of FIG. 1, and/or between any two distributed controllers 210A-210E of FIG. 2) to request removal or deletion of path segments, for example, in an HSCS network such as the HSCS 100 of FIG. 1 and/or a DSCS such as the DSCS 200 of FIG. 2. The RPSReq NLRI TLV 3400 is transmitted, in some embodiments, in the SDN NLRI TLV 600 of FIG. 6, for example, in the SDN NLRI Value field 630.

As shown in FIG. 34, the RPSReq NLRI TLV 3400 includes a NLRI-Type field 3410, a NLRI-Length field 3420, a CRP field 3430, a Tunnel-ID-Info field 3440, and a Start-Node List field 3450. The NLRI-Type field 3410 includes an identifier of the RPSReq NLRI TLV 3400 that indicates an intended meaning of the RPSReq NLRI and content of the RPSReq NLRI TLV 3400. For example, exemplary contents of the NLRI-Type field 3410 are shown above in Table 1. The NLRI-Length field 3420 indicates a length of the RPSReq NLRI TLV 3400 which is dependent upon a particular content included in the RPSReq NLRI TLV 3400, and therefore a particular value of the NLRI-Length field 3420 of the RPSReq NLRI TLV 3400 is not limited herein. The CRP field 3430, in some embodiments, contains a CRP TLV that specifies various parameters relating to a tunnel related operation request, as will be discussed in greater detail below. The Tunnel-ID-Info field 3440 indicates a GTID and a PID associated with a tunnel (e.g., a tunnel which may have one or more tunnel segments constructed along one or more paths previously computed according to one or more request messages). In some embodiments, the Tunnel-ID-Info field 3440 indicates the GTID and the PID in a Tunnel-ID-Info TLV, such as the Tunnel-ID-Info TLV 2400 of FIG. 24. The Start-Node List field 3450 indicates a start-node for each path segment requested for deletion pursuant to the RPSReq NLRI TLV 3400. In some embodiments, the Start-Node List field 3450 includes a Start Node TLV 2300, as discussed above with respect to FIG. 23. In other embodiments, the Start-Node List field 3450 includes a plurality of Start Node TLVs 2300, as discussed above with respect to FIG. 23.

Figure 35:
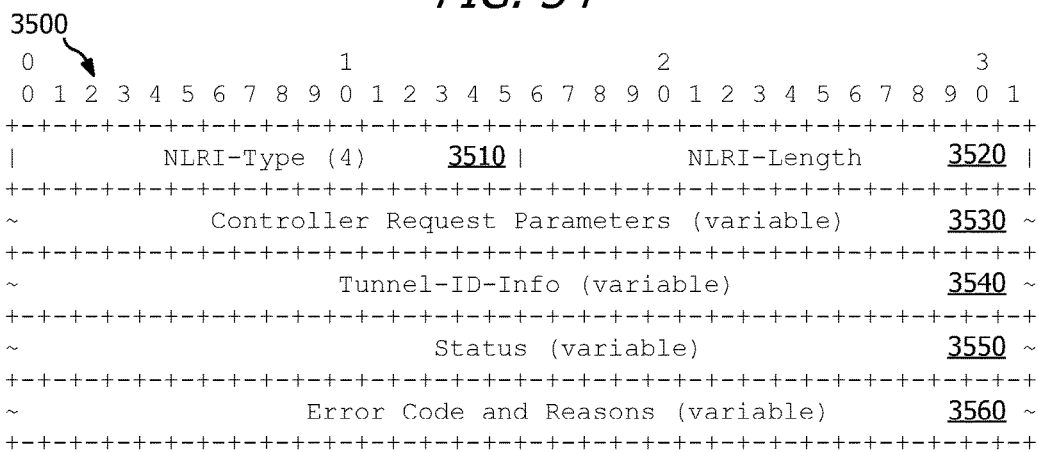
FIG. 35 is an embodiment of a Reply for Removing Path Segment (RPSRep) NLRI TLV.

Referring now to FIG. 35, an embodiment of a RPSRep NLRI TLV 3500 is shown. The RPSRep NLRI TLV 3500 is implemented in a message transmitted between two network elements (e.g., between any one or more of the child controllers 108 and the parent controller 106, each of FIG. 1, and/or between any two distributed controllers 210A-210E of FIG. 2) in response to a request for removal of path segments (e.g., the RPSReq NLRI TLV 3400, as discussed above with respect to FIG. 34), for example, in an HSCS network such as the HSCS 100 of FIG. 1 and/or a DSCS such as the DSCS 200 of FIG. 2. The RPSRep NLRI TLV 3500 is transmitted, in some embodiments, in the SDN NLRI TLV 600 of FIG. 6, for example, in the SDN NLRI Value field 630.

As shown in FIG. 35, the RPSRep NLRI TLV 3500 includes a NLRI-Type field 3510, a NLRI-Length field 3520, a CRP field 3530, a Tunnel-ID-Info field 3540, a Status field 3550, and an Error Code and Reasons field 3560. The NLRI-Type field 3510 includes an identifier of the RPSRep NLRI TLV 3500 that indicates an intended meaning of the RPSRep NLRI and content of the RPSRep NLRI TLV 3500. For example, exemplary contents of the NLRI-Type field 3510 are shown above in Table 1. The NLRI-Length field 3520 indicates a length of the RPSRep NLRI TLV 3500 which is dependent upon a particular content included in the RPSRep NLRI TLV 3500, and therefore a particular value of the NLRI-Length field 3520 of the RPSRep NLRI TLV 3500 is not limited herein. The CRP field 3530, in some embodiments, contains a CRP TLV that specifies various parameters relating to a tunnel related operation request, as will be discussed in greater detail below. The Tunnel-ID-Info field 3540 indicates a GTID and a PID associated with a tunnel (e.g., a tunnel which may have one or more tunnel segments constructed along one or more paths previously computed according to one or more request messages). In some embodiments, the Tunnel-ID-Info field 3540 indicates the GTID and the PID in a Tunnel-ID-Info TLV, such as the Tunnel-ID-Info TLV 2400 of FIG. 24. The Status field 3550 indicates a status of path removal for each path segment requested for removal (e.g., by the RPSReq NLRI TLV 3400, as discussed above with respect to FIG. 34). For example, for each path segment requested for removal, the Status field 3550 may indicate a status of "success" indicating that the path segments requested for removal have been successfully removed, or a status of "fail" indicating that the path segments requested for removal cannot be removed. When the Status field 3550 includes a status of "fail" for one or more path segments requested for removal, the Error Code and Reasons field 3560 includes explanatory information (e.g., an error code or other information) related to a reason or cause of the failure to remove the path segments.

Figure 36:
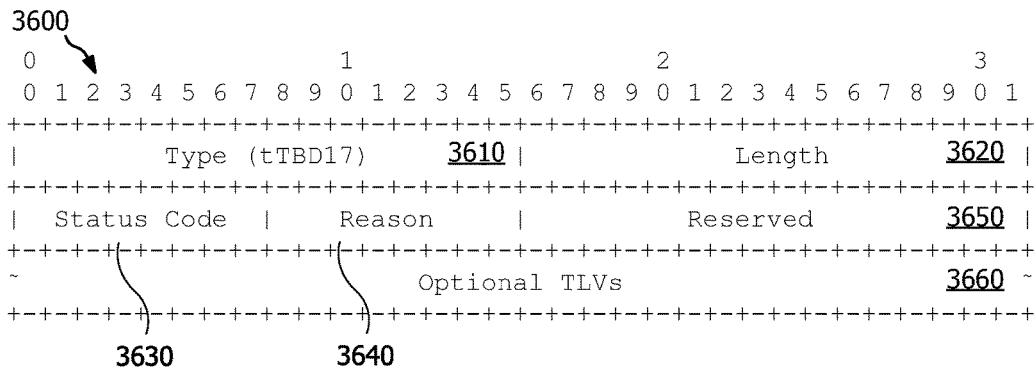
FIG. 36 is an embodiment of a Status TLV.

Referring now to FIG. 36, an embodiment of a Status TLV 3600 is shown. The Status TLV 3600 may be implemented in any of the messages according to various embodiments of the present disclosure to indicate a status of operations performed pursuant to any of the request messages of the present disclosure. For example, the Status TLV 3600 is suitable for implementation, in some embodiments, in the various messages transmitted between the parent controller 106 and any one or more of the child controllers 108, each of FIG. 1, and/or between any two distributed controllers 210A-210E of FIG. 2, for example, in a Status field, such as at least the Status field 3550 of the RPSRep NLRI TLV 3500 of FIG. 35. The Status TLV 3600 includes, in some embodiments, a Type field 3610, a Length field 3620, a Status Code field 3630, a Reason field 3640, a Reserved field 3650, and an Optional TLVs field 3660. The Type field 3610 includes an identifier of the Status TLV 3600 that indicates a type of the Status TLV 3600. The type of the Status TLV 3600 may be a numeric value that is assigned to the Status TLV 3600 at a later time and a particular value of the Type field 3610 of the Status TLV 3600 is not limited herein. The Length field 3620 indicates a length of the Status TLV 3600, which is dependent upon a particular content included in the Status TLV 3600, and therefore a particular value of the Length field 3620 of the Status TLV 3600 is not limited herein. The Status Code field 3630 indicates a status of performance of an operation in response to a request message. For example, the Status Code field 3630 includes a "1" to indicate a status of "success" of performance of the operation in response to the request message or a "0" to indicate a status of "fail" of performance of the operation in response to the request message. The Reason field 3640, when the Status Code field 3630 indicates "fail," in some embodiments includes information related to a reason or cause for the failure to perform the operation in response to the request message. For example, in some embodiments the Reason field 3640 includes an error code that corresponds to a predefined error or failure cause. Each bit of the Reserved field 3650 is set to zero and ignored on receipt. Optionally, when the Status Code field 3630 indicates "fail," the Optional TLVs field 3660 includes additional information or details relating to the failure and particular information that may be included in the Optional TLVs field is not limited herein.

Figure 37:
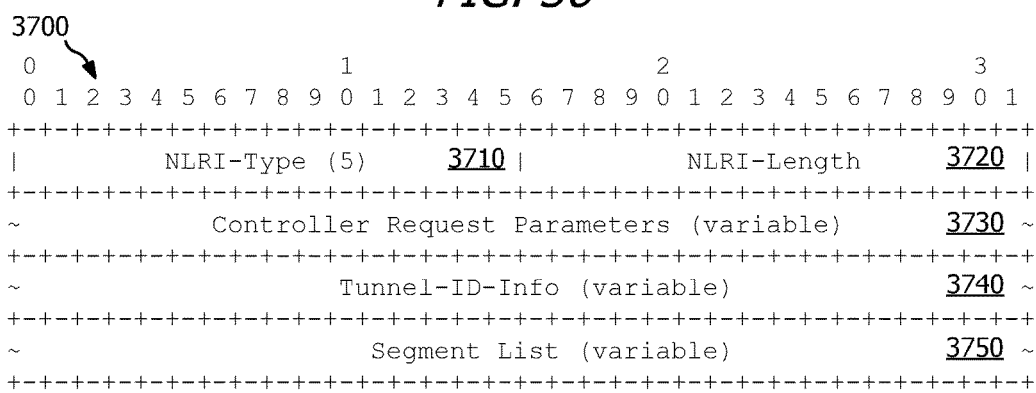
FIG. 37 is an embodiment of a Request for Keeping Path Segment (KPSReq) NLRI TLV.

Referring now to FIG. 37, an embodiment of a KPSReq NLRI TLV 3700 is shown. The KPSReq NLRI TLV 3700 is implemented in a message transmitted between two network elements (e.g., between the parent controller 106 and any one or more of the child controllers 108, each of FIG. 1, and/or between any two distributed controllers 210A-210E of FIG. 2) to request keeping of path segments, for example, in an HSCS network such as the HSCS 100 of FIG. 1 and/or a DSCS such as the DSCS 200 of FIG. 2. The KPSReq NLRI TLV 3700 is transmitted, in some embodiments, in the SDN NLRI TLV 600 of FIG. 6, for example, in the SDN NLRI Value field 630.

As shown in FIG. 37, the KPSReq NLRI TLV 3700 includes a NLRI-Type field 3710, a NLRI-Length field 3720, a CRP field 3730, a Tunnel-ID-Info field 3740, and a Segment List field 3750. The NLRI-Type field 3710 includes an identifier of the KPSReq NLRI TLV 3700 that indicates an intended meaning of the KPSReq NLRI and content of the KPSReq NLRI TLV 3700. For example, exemplary contents of the NLRI-Type field 3710 are shown above in Table 1. The NLRI-Length field 3720 indicates a length of the RPSReq NLRI TLV which is dependent upon a particular content included in the KPSReq NLRI TLV 3700, and therefore a particular value of the NLRI-Length field 3720 of the KPSReq NLRI TLV 3700 is not limited herein. The CRP field 3730, in some embodiments, contains a CRP TLV that specifies various parameters relating to a tunnel related operation request, as will be discussed in greater detail below. The Tunnel-ID-Info field 3740 indicates a GTID and a PID associated with a tunnel (e.g., a tunnel which may have one or more tunnel segments constructed along one or more path segments previously computed according to one or more request messages, as discussed above with respect to FIG. 22). In some embodiments, the Tunnel-ID-Info field 3740 indicates the GTID and the PID in a Tunnel-ID-Info TLV, such as the Tunnel-ID-Info TLV 2400 of FIG. 24. The Segment List field 3750 indicates one or more node pairs (e.g., a start-node and an end-node) each corresponding to a segment requested for keeping pursuant to the KPSReq NLRI TLV 3700. In an embodiment, a node pair is represented by a Start-Node TLV 2300 of FIG. 23 and a Segment End Node List TLV 3300 of FIG. 33 containing a single segment end node. Alternatively, the Segment List field 3750 may include one or more start-nodes or one or more end-nodes such that all path segments that include one of the identified nodes are kept pursuant to the KPSReq NLRI TLV 3700.

Figure 38:
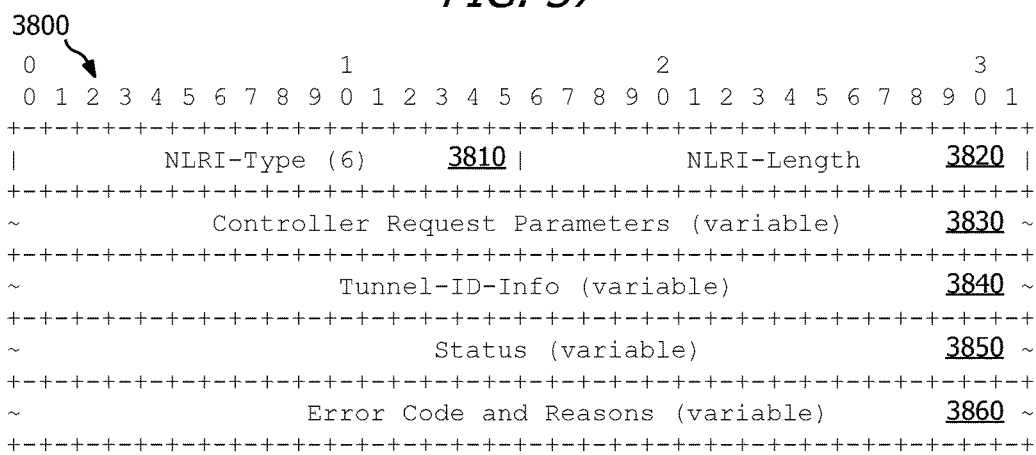
FIG. 38 is an embodiment of a Reply for Keeping Path Segment (KPSRep) NLRI TLV.

Referring now to FIG. 38, an embodiment of a KPSRep NLRI TLV 3800 is shown. The KPSRep NLRI TLV 3800 is implemented in a message transmitted between two network elements (e.g., between any one or more of the child controllers 108 and the parent controller 106 and/or between any two distributed controllers 210A-210E) in response to a request for keeping of path segments (e.g., the KPSReq NLRI TLV 3700, as discussed above with respect to FIG. 37), for example, in an HSCS network such as the HSCS 100 of FIG. 1 and/or a DSCS such as the DSCS 200 of FIG. 2. The KPSRep NLRI TLV 3800 is transmitted, in some embodiments, in the SDN NLRI TLV 600 of FIG. 6, for example, in the SDN NLRI Value field 630.

As shown in FIG. 38, the KPSRep NLRI TLV 3800 includes a NLRI-Type field 3810, a NLRI-Length field 3820, a CRP field 3830, a Tunnel-ID-Info field 3840, a Status field 3850, and an Error Code and Reasons field 3860. The NLRI-Type field 3810 includes an identifier of the KPSRep NLRI TLV 3800 that indicates an intended meaning of the KPSRep NLRI TLV 3800 and content of the KPSRep NLRI TLV 3800. For example, exemplary contents of the NLRI-Type field 3810 are shown above in Table 1. The NLRI-Length field 3820 indicates a length of the KPSRep NLRI TLV 3800 which is dependent upon a particular content included in the KPSRep NLRI TLV 3800, and therefore a particular value of the NLRI-Length field 3820 of the KPSRep NLRI TLV 3800 is not limited herein. The CRP field 3830, in some embodiments, contains a CRP TLV that specifies various parameters relating to a tunnel related operation request, as will be discussed in greater detail below. The Tunnel-ID-Info field 3840 indicates a GTID and a PID associated with a tunnel (e.g., a tunnel which may have one or more tunnel segments constructed along one or more path segments previously computed according to one or more request messages). In some embodiments, the Tunnel-ID-Info field 3840 indicates the GTID and the PID in a Tunnel-ID-Info TLV, such as the Tunnel-ID-Info TLV 2400 of FIG. 24. The Status field 3850 indicates a status of path keeping for each path segment requested for keeping (e.g., by the KPSReq NLRI TLV 3700, as discussed above with respect to FIG. 37). In some embodiments, the Status field 3850 indicates the status in a Status TLV, such as the Status TLV 3600 of FIG. 36. For example, for each path segment requested for keeping, the Status field 3850 may indicate a status of "success" indicating that the path segments requested for keeping have been successfully kept or retained, or a status of "fail" indicating that the path segments requested for keeping cannot be kept or retained. When the Status field 3850 includes a status of "fail" for one or more path segments requested for keeping, the Error Code and Reasons field 3860 includes explanatory information (e.g., an error code or other information) related to a reason or cause of the failure to keep or retain the path segments.

Referring now to FIG. 39, an embodiment of a CTSReq NLRI TLV 3900 is shown. The CTSReq NLRI TLV 3900 is implemented in a message transmitted between two network elements (e.g., between the parent controller 106 and any one or more of the child controllers 108, each of FIG. 1, and/or between any two distributed controllers 210A-210E of FIG. 2) to request creation of tunnel segments associated with computed path segments, for example, in an HSCS network such as the HSCS 100 of FIG. 1 and/or a DSCS such as the DSCS 200 of FIG. 2. The CTSReq NLRI TLV 3900 is transmitted, in some embodiments, in the SDN NLRI TLV 600 of FIG. 6, for example, in the SDN NLRI Value field 630.

As shown in FIG. 39, the CTSReq NLRI TLV 3900 includes a NLRI-Type field 3910, a NLRI-Length field 3920, a CRP field 3930, a Tunnel-ID-Info field 3940, a Start-Node field 3950, an End-Node field 3960, a Label field 3970, and an Interface field 3980. The NLRI-Type field 3910 includes an identifier of the CTSReq NLRI TLV 3900 that indicates an intended meaning of the CTSReq NLRI TLV 3900 and content of the CTSReq NLRI TLV 3900. For example, exemplary contents of the NLRI-Type field 3910 are shown above in Table 1. The NLRI-Length field 3920 indicates a length of the CTSReq NLRI TLV 3900 which is dependent upon a particular content included in the CTSReq NLRI TLV 3900, and therefore a particular value of the NLRI-Length field 3920 of the CTSReq NLRI TLV 3900 is not limited herein. The CRP field 3930, in some embodiments, contains a CRP TLV that specifies various parameters relating to a tunnel related operation request, as will be discussed in greater detail below. The Tunnel-ID-Info field 3940 indicates a GTID and a PID associated with the to-be-created tunnel (e.g., such that the GTID and the PID of the Tunnel-ID-Info field uniquely identify the tunnel segments created according to the CTSReq NLRI TLV 3900 and the path segments computed for use in creating the tunnel segments). In some embodiments, the Tunnel-ID-Info field 3940 indicates the GTID and the PID in a Tunnel-ID-Info TLV, such as the Tunnel-ID-Info TLV 2400 of FIG. 24. The Start-Node field indicates a start-node for the tunnel segment requested for creation pursuant to the CTSReq NLRI TLV 3900. In some embodiments, the Start-Node field 3950 includes a Start Node TLV 2300, as discussed above with respect to FIG. 23. The End-Node field 3960 indicates an end-node for the tunnel segment requested for creation pursuant to the CTSReq NLRI TLV 3900 such that the start-node and the end-node enable a network element receiving the CTSReq NLRI TLV 3900 to create the tunnel segment request for creation along a path beginning at the start-node and ending at the end-node. In an embodiment, the End-Node field 3960 includes a Segment End Node List TLV 3300 of FIG. 33 containing only one segment end node. The Label field 3970 and the Interface field 3980 indicate, respectfully, a label and an interface for a network element of a next domain with which the tunnel should be created. For example, when the tunnel crosses multiple domains, when a network element that controls a domain that does not include a destination of the tunnel receives the CTSReq NLRI TLV 3900, the Label field 3970 and the Interface field 3980 indicate a Label and an Interface of a network element in another domain controlled by another network element for use in creating the tunnel such that the network element that receives the CTSReq NLRI TLV 3900 uses the Label and the Interface to create a tunnel segment linking the domain of the network element that receives the CTSReq NLRI TLV 3900 and the network element of the next domain with which the tunnel should be created.

Referring now to FIG. 40, an embodiment of a Label TLV 4000 is shown. The Label TLV 4000 may be implemented in any of the messages according to various embodiments of the present disclosure to indicate a label associated with a path segment in an E2E tunnel in a network such as the HSCS 100 of FIG. 1 and/or the DSCS 200. For example, the Label TLV 4000 is suitable for implementation, in some embodiments, in the various messages transmitted between the parent controller 106 and any one or more of the child controllers 108, each of FIG. 1, and/or between any two distributed controllers 210A-210E of FIG. 2, for example, in a Label field, such as at least the Label field 3970 of the CTSReq NLRI TLV 3900 of FIG. 39. The Label TLV 4000 includes, in some embodiments, a Type field 4010, a Length field 4020, and a Top Label field 4030. The Type field 4010 includes an identifier of the Label TLV 4000 that indicates a type of the Label TLV 4000. The type of the Label TLV 4000 may be a numeric value that is assigned to the Label TLV 4000 at a later time and a particular value of the Type field 4010 of the Label TLV 4000 is not limited herein. The Length field 4020 indicates a length of the Label TLV 4000, which is dependent upon a particular content included in the Label TLV 4000, and therefore a particular value of the Length field 4020 of the Label TLV 4000 is not limited herein. The Top Label field 4030 includes a LSP label associated with a path segment in an E2E tunnel in the network.

Referring now to FIG. 41, an embodiment of an Interface Index TLV 4100 is shown. The Interface Index TLV 4100 may be implemented in any of the messages according to various embodiments of the present disclosure to indicate an interface associated with a path segment in an E2E tunnel in a network such as the HSCS 100 of FIG. 1 and/or the DSCS 200. For example, the Interface Index TLV 4100 is suitable for implementation, in some embodiments, in the various messages transmitted between the parent controller 106 and any one or more of the child controllers 108, each of FIG. 1, and/or between any two distributed controllers 210A-210E of FIG. 2, for example, in an Interface field, such as at least the Interface field 3980 of the CTSReq NLRI TLV 3900 of FIG. 39. The Interface Index TLV 4100 includes, in some embodiments, a Type field 4110, a Length field 4120, and an Interface Index field 4130. The Type field 4110 includes an identifier of the Interface Index TLV 4100 that indicates a type of the Interface Index TLV 4100. The type of the Interface Index TLV 4100 may be a numeric value that is assigned to the Interface Index TLV 4100 at a later time and a particular value of the Type field 4110 of the Interface Index TLV 4100 is not limited herein. The Length field 4120 indicates a length of the Interface Index TLV 4100, which is dependent upon a particular content included in the Interface Index TLV 4100, and therefore a particular value of the Length field 4120 of the Interface Index TLV 4100 is not limited herein. The Interface Index field 4130 includes an index of an interface associated with a path segment in an E2E tunnel in the network.

Referring now to FIG. 42, an embodiment of an Interface IPv4 Address TLV 4200 is shown. The Interface IPv4 Address TLV 4200 may be implemented in any of the messages according to various embodiments of the present disclosure to indicate an address of a node associated with an interface associated with a path segment in an E2E tunnel in a network such as the HSCS 100 of FIG. 1 and/or the DSCS 200. For example, the Interface IPv4 Address TLV 4200 is suitable for implementation, in some embodiments, in the various messages transmitted between the parent controller 106 and any one or more of the child controllers 108, each of FIG. 1, and/or between any two distributed controllers 210A-210E of FIG. 2, for example, in an Interface field, such as at least the Interface field 3980 of the CTSReq NLRI TLV 3900 of FIG. 39. The Interface IPv4 Address TLV 4200 includes, in some embodiments, a Type field 4210, a Length field 4220, and an Interface IPv4 Address field 4230. The Type field 4210 includes an identifier of the Interface IPv4 Address TLV 4200 that indicates a type of the Interface IPv4 Address TLV 4200. The type of the Interface IPv4 Address TLV 4200 may be a numeric value that is assigned to the Interface IPv4 Address TLV 4200 at a later time and a particular value of the Type field 4210 of the Interface IPv4 Address TLV 4200 is not limited herein. The Length field 4220 indicates a length of the Interface IPv4 Address TLV 4200, which is dependent upon a particular content included in the Interface IPv4 Address TLV 4200, and therefore a particular value of the Length field 4220 of the Interface IPv4 Address TLV 4200 is not limited herein. The Interface IPv4 Address field 4230 includes an address of a node in the network that is associated with an interface associated with a path segment in the network. It should be noted that the Interface IPv4 Address TLV 4200 is equally applicable to an IPv6 network or node, in which case any use of "IPv4" in the Interface IPv4 Address TLV 4200 may be substituted with "IPv6" without departing from the scope of the present disclosure.

Referring now to FIG. 43, an embodiment of a CTSRep NLRI TLV 4300 is shown. The CTSRep NLRI TLV 4300 is implemented in a message transmitted between two network elements (e.g., between the parent controller 106 and any one or more of the child controllers 108, each of FIG. 1, and/or between any two distributed controllers 210A-210E of FIG. 2) in response to a request for creation of tunnel segments associated with computed path segments, for example, in an HSCS network such as the HSCS 100 of FIG. 1 and/or a DSCS such as the DSCS 200 of FIG. 2. The CTSRep NLRI TLV 4300 is transmitted, in some embodiments, in the SDN NLRI TLV 600 of FIG. 6, for example, in the SDN NLRI Value field 630.

As shown in FIG. 43, the CTSRep NLRI TLV 4300 includes a NLRI-Type field 4310, a NLRI-Length field 4320, a CRP field 4330, a Tunnel-ID-Info field 4340, a Status field 4350, a Label field 4360, an Interface field 4370, and an Error Code and Reasons field 4380. The NLRI-Type field 4310 includes an identifier of the CTSRep NLRI TLV 4300 that indicates an intended meaning of the CTSRep NLRI TLV 4300 and content of the CTSRep NLRI TLV 4300. For example, exemplary contents of the NLRI-Type field 4310 are shown above in Table 1. The NLRI-Length field 4320 indicates a length of the CTSRep NLRI TLV 4300 which is dependent upon a particular content included in the CTSRep NLRI TLV 4300, and therefore a particular value of the NLRI-Length field 4320 of the CTSRep NLRI TLV 4300 is not limited herein. The CRP field 4330, in some embodiments, contains a CRP TLV that specifies various parameters relating to a tunnel related operation request, as will be discussed in greater detail below. The Tunnel-ID-Info field 4340 indicates a GTID and a PID associated with the tunnel (e.g., such that the GTID and the PID of the Tunnel-ID-Info field uniquely identify the tunnel segments created according to the CTSReq NLRI TLV and/or the path segments computed for use in creating the tunnel segments). In some embodiments, the Tunnel-ID-Info field 4340 indicates the GTID and the PID in a Tunnel-ID-Info TLV, such as the Tunnel-ID-Info TLV 2400 of FIG. 24. The Status field indicates a status of tunnel creation (e.g., according to the CTSReq NLRI TLV 3900, as discussed above with respect to FIG. 39). In some embodiments, the Status field 4350 indicates the status in a Status TLV, such as the Status TLV 3600 of FIG. 36. For example, for each tunnel segment requested for creation, the Status field 4350 may indicate a status of "success" indicating that the tunnel segments requested for creation have been successfully created, or a status of "fail" indicating that the tunnel segments requested for creation cannot be created. The Label field 4360 and the Interface field 4370 indicate, respectfully, a label and an interface for a network element of a next domain with which the tunnel should be created. For example, in the CTSRep NLRI TLV 4300, the Label field 4360 and the Interface field 4370 indicate a Label and an Interface of a network element in next upstream domain controlled by another network element for use in creating the tunnel such that the network element that receives the CTSReq NLRI TLV uses the Label and the Interface to create a tunnel segment linking the domain of the network element that transmits the CTSRep NLRI TLV 4300 and the network element of the next upstream domain with which the tunnel should be created. In some embodiments, the Label field 3860 indicates the Label in a Label TLV, such as the Label TLV 4000 of FIG. 40 and the Interface field 3870 indicates the Interface in an Interface Index TLV, such as the Interface Index TLV 4100 of FIG. 41, or an Interface IPv4 Address TLV, such as the Interface IPv4 Address TLV 4200 of FIG. 42. When the Status field 4350 includes a status of "fail" for one or more tunnel segments requested for creation, the Error Code and Reasons field 4380 includes explanatory information (e.g., an error code or other information) related to a reason or cause of the failure to create the tunnel segments.

Referring now to FIG. 44, an embodiment of a RTSReq NLRI TLV 4400 is shown. The RTSReq NLRI TLV 4400 is implemented in a message transmitted between two network elements (e.g., between the parent controller 106 and any one or more of the child controllers 108, each of FIG. 1, and/or between any two distributed controllers 210A-210E of FIG. 2) to request removal or deletion of tunnel segments, for example, in an HSCS network such as the HSCS 100 of FIG. 1 and/or a DSCS such as the DSCS 200 of FIG. 2. The RTSReq NLRI TLV 4400 is transmitted, in some embodiments, in the SDN NLRI TLV 600 of FIG. 6, for example, in the SDN NLRI Value field 630.

As shown in FIG. 44, the RTSReq NLRI TLV 4400 includes a NLRI-Type field 4410, a NLRI-Length field 4420, a CRP field 4430, and a Tunnel-ID-Info field 4440. The NLRI-Type field 4410 includes an identifier of the RTSReq NLRI TLV 4400 that indicates an intended meaning of the RTSReq NLRI and content of the RTSReq NLRI TLV 4400. For example, exemplary contents of the NLRI-Type field 4410 are shown above in Table 1. The NLRI-Length field 4420 indicates a length of the RTSReq NLRI TLV 4400 which is dependent upon a particular content included in the RTSReq NLRI TLV 4400, and therefore a particular value of the NLRI-Length field 4420 of the RTSReq NLRI TLV 4400 is not limited herein. The CRP field 4430, in some embodiments, contains a CRP TLV that specifies various parameters relating to a tunnel related operation request, as will be discussed in greater detail below. The Tunnel-ID-Info field 4440 indicates a GTID and a PID associated with a tunnel (e.g., a tunnel which may have one or more tunnel segments constructed along one or more paths previously computed according to one or more request messages) requested for deletion pursuant to the RTSReq NLRI TLV 4400. In some embodiments, the Tunnel-ID-Info field 4440 indicates the GTID and the PID in a Tunnel-ID-Info TLV, such as the Tunnel-ID-Info TLV 2400 of FIG. 24.

Referring now to FIG. 45, an embodiment of a RTSRep NLRI TLV 4500 is shown. The RTSRep NLRI TLV 4500 is implemented in a message transmitted between two network elements (e.g., between any one or more of the child controllers 108 and the parent controller 106 of FIG. 1 and/or between any two distributed controllers 210A-210E of FIG. 2) in response to a request for removal of tunnel segments (e.g., the RTSReq NLRI TLV 4400, as discussed above with respect to FIG. 44), for example, in an HSCS network such as the HSCS 100 of FIG. 1 and/or a DSCS such as the DSCS 200 of FIG. 2. The RTSRep NLRI TLV 4500 is transmitted, in some embodiments, in the SDN NLRI TLV 600 of FIG. 6, for example, in the SDN NLRI Value field 630.

As shown in FIG. 45, the RTSRep NLRI TLV 4500 includes a NLRI-Type field 4510, a NLRI-Length field 4520, a CRP field 4530, a Tunnel-ID-Info field 4540, a Status field 4550, and an Error Code and Reasons field 4560. The NLRI-Type field 4510 includes an identifier of the RTSRep NLRI TLV 4500 that indicates an intended meaning of the RTSRep NLRI TLV 4500 and content of the RTSRep NLRI TLV 4500. For example, exemplary contents of the NLRI-Type field 4510 are shown above in Table 1. The NLRI-Length field 4520 indicates a length of the RTSRep NLRI TLV 4500 which is dependent upon a particular content included in the RTSRep NLRI TLV 4500, and therefore a particular value of the NLRI-Length field 4520 of the RTSRep NLRI TLV 4500 is not limited herein. The CRP field 4530, in some embodiments, contains a CRP TLV that specifies various parameters relating to a tunnel related operation request, as will be discussed in greater detail below. The Tunnel-ID-Info field 4540 indicates a GTID and a PID associated with a tunnel (e.g., a tunnel which may have one or more tunnel segments constructed along one or more path segments previously computed according to one or more request messages). In some embodiments, the Tunnel-ID-Info field 4540 indicates the GTID and the PID in a Tunnel-ID-Info TLV, such as the Tunnel-ID-Info TLV 2400 of FIG. 24. The Status field 4560 indicates a status of removal for each tunnel segment requested for removal (e.g., by the RTSReq NLRI TLV 4400, as discussed above with respect to FIG. 44). In some embodiments, the Status field 4560 indicates the status in a Status TLV, such as the Status TLV 3600 of FIG. 36. For example, for each tunnel segment requested for removal, the Status field 4560 may indicate a status of "success" indicating that the tunnel segments requested for removal have been successfully removed, or a status of "fail" indicating that the tunnel segments requested for removal cannot be removed. When the Status field 4560 includes a status of "fail" for one or more tunnel segments requested for removal, the Error Code and Reasons field 4570 includes explanatory information (e.g., an error code or other information) related to a reason or cause of the failure to remove the tunnel segments.

Figure 46:
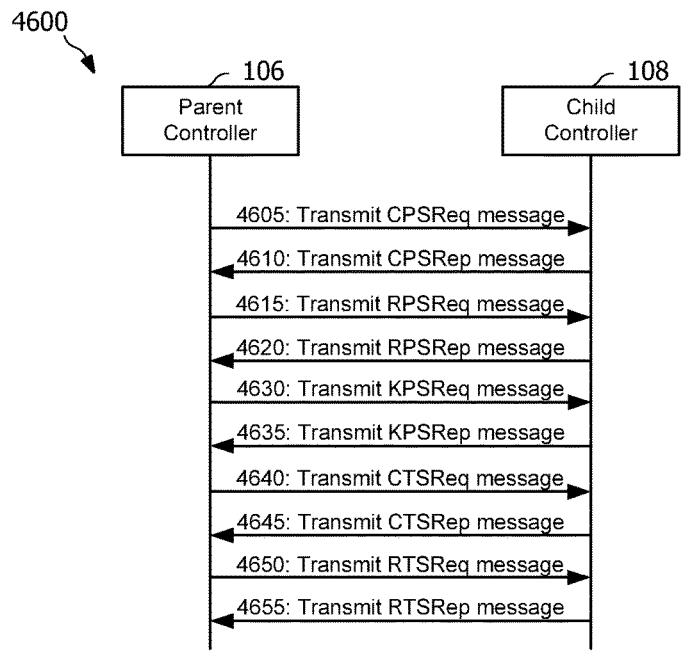
FIG. 46 is an embodiment of a protocol diagram of exchanging control traffic between network elements according to HSCS.

Referring now to FIG. 46, an embodiment of a protocol diagram 4600 of exchanging control traffic between network elements, such as the parent controller 106 and any one of the child controllers 108 and/or second level child controllers 112, according to HSCS, such as the HSCS 100 of FIG. 1, is shown. As described above, a parent controller 106 is configured to control a plurality of child controllers 108 (e.g., which may sometimes be referred to as first level child controllers), any one or more of which may be configured to control second level child controllers 112, also of FIG. 1. Each of the child controllers 108 controls a corresponding domain 104 104 that has connections to domains 104 of the other child controllers 108. Additionally, in embodiments of the architecture that include child controllers 108, each of the child controllers 108 may control corresponding domains 104. A protocol of the child controller 108 controlling the second level child controllers 112 may be substantially similar to a process of the parent controller 106 controlling the child controller 108, for example as described above with respect to FIG. 1, and a description of which is not repeated herein.

In some embodiments, the parent controller 106 may have no, or limited, detailed information and knowledge of the domains 104 controlled by the child controllers 108. In such embodiments, when the parent controller 106 receives a request to route data traffic from a source node to a destination node (e.g., source and destination network elements), the parent controller 106 transmits one or more requests to the child controllers 108 to compute, remove, and/or keep path segments, and/or create tunnel segments along the path segments computed for an E2E tunnel from the source to the destination through the domains 104 controlled by the child controllers 108 for routing the data traffic from the source to the destination. Additionally, the parent controller 106 may transmit one or more requests to the child controllers 108 to create and/or remove tunnel segments corresponding to the path segments through the domains 104 controlled by the child controllers 108. In some embodiments, the child controllers 108 transmit a reply to the parent controller 106 after receiving a request to perform an action, or after performing the action. It should be noted that while a plurality of steps may be illustrated in the protocol diagram 4600, any one or more of the steps may be omitted, performed substantially simultaneously with another step, or performed in an order with respect to the other steps of the protocol diagram 4600, or steps not shown, that varies from an exemplary order shown in FIG. 46, unless otherwise stated.

When a parent controller 106 receives a request to create an E2E tunnel (e.g., to route data or communications) from a source to a destination, the parent controller 106 allocates a GTID for the E2E tunnel (e.g., so that an E2E tunnel that crosses multiple domains 104 may be globally identified) and a PID for an E2E path to be computed for the E2E tunnel. Subsequently, at step 4605, the parent controller 106 transmits a CPSReq NLRI TLV 2200 (e.g., having a format and content as discussed above with respect to FIG. 22) to each of its child controllers 108 for computing a set of path segments in the respective domains 104 controlled by each of the child controllers 108. The path segments are computed, for example, between a pair of boundary nodes 116 of the respective domain 104 controlled by the child controller 108 that receives the CPSReq NLRI TLV 2200. When the parent controller 106 receives the path segments from the child controllers 108, the parent controller 106 builds a shortest path tree (SPT) according to the path segments to determine a shortest path from the source to the destination that satisfies any constraints that the routing must adhere to (e.g., constraints received with the routing request, for example, in a CRP field, such as bandwidth, etc.). It should be noted that in this embodiment, particular details of each path segment may be hidden from the parent controller 106 such that each path segment is visible to the parent controller 106 only as a link between two boundary nodes of a domain 104 controlled by a respective child controller 108 and a cost (e.g., in time, distance, number of nodes traversed, etc.) associated with the link between the two boundary nodes. As such, an E2E path determined by the parent controller 106 may not have details pertaining to all, or any, nodes that will be traversed via the E2E path and may be referred to as a domain 104 path.

As discussed above, in some embodiments, a CPSReq NLRI TLV 2200 suitable for transmission from a parent controller 106 to a child controller 108 includes an address or identifier of a starting node in the domain 104 controlled by the respective child controller 108 (e.g., a source node if the source is within the child controller 108's domain 104 or a boundary node that is connected to a boundary node of another child controller 108's domain 104). The starting node is the node from which a number of path segments are to be computed. The CPSReq NLRI TLV 2200 also includes the GTID and PID allocated by the parent controller 106, an exception list containing a list of nodes (e.g., network elements) that are already located on the SPT of the parent controller 106 (e.g., as a result of one or more previous CPSReq NLRI TLV 2200), any constraints that the path segments should adhere to, and a destination node.

When the destination node specified by the CPSReq NLRI TLV 2200 is in the domain 104 of the child controller 108, the child controller 108 computes a shortest path between the starting node and the destination node within the child controller 108's domain 104. When the destination node is not in the domain 104 of the child controller 108, the child controller 108 computes a shortest path between the starting node and each boundary node of the child controller 108's domain 104.

After receiving the CPSReq NLRI TLV 2200, the child controller 108 computes the path segments according to, and as requested by, the CPSReq NLRI TLV 2200. For example, the child controller 108 computes shortest path segments that satisfy any constraints provided from the starting node to the destination node, if present, or when the destination node is not present, to each edge node of the child controller 108's domain 104. In some embodiments, the child controller 108 may exclude edge nodes located in an exception list (e.g., in an exception list such as that included in the CPSReq NLRI TLV 2200) from path segment computations when a flag or indicator (e.g., such as the "E" flag located in the CRP TLV, discussed below) indicates to exclude the edge nodes located in the exception list. Additionally, in some embodiments the child controller 108 computes a shortest path segment that satisfies any constraints provided from the starting node to each edge node of domains 104 adjacent to the domain 104 of the child controller 108 using inter-domain 104 links attached to the starting node (e.g., as advertised in the CAA NLRI TLV 700, as discussed above with respect to FIG. 7) if the starting node is an edge node of the child controller 108's domain 104 and an end point of an inter-domain 104 link. Subsequently, at step 4610, the child controller 108 transmits a CPSRep NLRI TLV 3200 (e.g., having a format and content as discussed above with respect to FIG. 32) to the parent controller, where the CPSRep NLRI TLV 3200 contains the computed path segments. The details of the computed path segments, for example, particular nodes within the child controller 108's domain 104 which are included in the computed path segments are not included in the CPSRep NLRI TLV 3200 and visible to the parent controller, but rather each computed path segment is represented as a link between two edge nodes of the child controller 108's domain 104 and a cost (e.g., in time, number of network hops, computational capacity, etc.) to traverse that link.

As discussed above, in some embodiments, a CPSRep NLRI TLV 3200 suitable for transmission from a child controller 108 to a parent controller 106 includes the GTID and PID allocated by the parent controller 106 and received by the child controller 108 in the CPSReq NLRI TLV 2200, the address or identifier of the starting node in the domain 104 controlled by the child controller 108, and, for each path segment computed through the child controller 108's domain 104, an address or identifier of a destination or edge node and a cost of the computed path segment from the starting node to the destination or edge node. The child controller 108, in some embodiments, stores the details (e.g., each node within the child controller 108's domain 104 which is traversed along to a computed path segment) of each computed path segment, along with an association to the GTID and the PID, in a data structure accessible to the child controller 108 when the child controller 108 transmits the CPSRep NLRI TLV 3200 to the parent controller 106. In some embodiments, the child controller 108 deletes the path segments computed for a given GTID and PID if the child controller 108 does not receive any request from the parent controller 106 for keeping the computed path segments for a given period of time, a length of which is not limited herein.

After a shortest path satisfying a set of constraints, if any are provided, between a source and a destination is computed by the parent controller 106 (e.g., based at least in part on contents of one or more CPSRep NLRI TLV 3200 received by the parent controller 106), at step 4615 the parent controller 106 transmits a RPSReq NLRI TLV 3400 (e.g., having a format and content as discussed above with respect to FIG. 34) to delete path segments computed and stored by one or more child controller 108 when the path segments are not a part of the shortest path. The RSPReq NLRI TLV 3400, in some embodiments comprises the GTID associated with the computed path segments. In such embodiments, when a child controller 108 receives the RPSReq NLRI TLV 3400, the child controller 108 removes all computed path segments stored with an association to the GTID. In other embodiments the RSPReq NLRI TLV 3400 comprises the GTID and the PID. In such embodiments, when a child controller 108 receives the RPSReq NLRI TLV 3400, the child controller 108 removes all computed path segments stored with an association to the GTID and the PID. In other embodiments, the RPSReq NLRI TLV 3400 comprises the GTID, the PID, and a list of starting node addresses or identifiers. In such embodiments, when a child controller 108 receives the RPSReq NLRI TLV 3400, the child controller 108 removes all computed path segments stored with an association to the GTID and the PID and having a starting node in the list of starting node addresses or having a starting node with an address included in the list of starting node addresses. In other embodiments, the RPSReq NLRI TLV 3400 comprises the GTID, the PID, a list of starting node addresses or identifiers, and a list of node pairs (e.g., starting node address with a corresponding ending node address for a respective path segment). In such embodiments, when a child controller 108 receives the RPSReq NLRI TLV 3400, the child controller 108 removes all, or some, computed path segments stored with an association to the GTID and the PID and having a starting node and ending node included in the list of node pairs.

After receiving the RPSReq NLRI TLV 3400, the child controller 108 removes one or more computed path segments stored by the child controller 108 according to the RPSReq NLRI TLV 3400. Subsequently, at step 4620, the child controller 108 transmits a RPSRep NLRI TLV 3500 (e.g., having a format and content as discussed above with respect to FIG. 35) to the parent controller 106. The RPSRep NLRI TLV 3500, in some embodiments, includes the GTID and the PID, a status of the path segment removal according to the RPSReq NLRI TLV 3400 (e.g., a status of "success" indicating that the path segments requested for removal have been successfully removed or a status of "fail" indicating that the path segments requested for removal cannot be removed), and, when the status is "fail," an error code and reasons for the failure to remove the requested path segments.

After a shortest path satisfying a set of constraints, if any are provided, between a source and a destination is computed by the parent controller 106 (e.g., based at least in part on contents of one or more CPSRep NLRI TLV 3200 received by the parent controller 106), at step 4630 the parent controller 106 transmits a KPSReq NLRI TLV 3700 (e.g., having a format and content as discussed above with respect to FIG. 37) to request that one or more child controller 108 keep path segments computed and stored by the child controller 108 (e.g., path segments which are a part of the shortest path determined by the parent controller 106). The KPSReq NLRI TLV 3700, in some embodiments comprises the GTID and the PID, as well as a list of node pairs (e.g., starting node address with a corresponding ending node address for a respective path segment).

After receiving the KPSReq NLRI TLV 3700, the child controller 108 keeps one or more computed path segments stored by the child controller 108 pursuant to the KPSReq NLRI TLV 3700. In some embodiments, the path segments are associated with and/or included in the shortest path computed by the parent controller 106. In some embodiments, the child controller 108 removes one or more path segments that were previously stored by the child controller 108 but are not included in the KPSReq NLRI TLV 3700. Subsequently, at step 4635, the child controller 108 transmits a KPSRep NLRI TLV 3800 (e.g., having a format and content as discussed above with respect to FIG. 38) to the parent controller 106. The KPSRep NLRI TLV 3800, in some embodiments, includes the GTID and the PID, a status of path segment retention according to the KPSReq NLRI TLV 3700 (e.g., a status of "success" indicating that the path segments requested for retention have been successfully kept by the child controller 108 or a status of "fail" indicating that the path segments requested for retention cannot be kept by the child controller 108), and, when the status is "fail," an error code and reasons for the failure to keep the requested path segments.

In addition to the above embodiments in which the parent controller 106 may not have detailed information and knowledge of the domains 104 controlled by the child controller 108, in other embodiments, the parent controller 106 has detailed information and knowledge of the domains 104 controlled by the child controller 108 of the parent controller 106. The parent controller 106 may have the information, for example, as a result of one or more CAA NLRI TLV 700 (e.g., having a format and content as discussed above with respect to FIG. 7) transmitted by the child controller 108 to the parent controller 106. In such embodiments, when the parent controller 106 receives a request to route data traffic from a source to a destination through at least a portion of the domains 104, the parent controller 106 computes path segments that cross the domains 104.

In either embodiment, when the parent controller 106 does not have detailed information and knowledge of the domains 104 or when the parent controller 106 has detailed information and knowledge of the domains 104, at step 4640, the parent controller 106 transmits one or more CTSReq NLRI TLV 3900 (e.g., having a format and content as discussed above with respect to FIG. 39) to the child controller 108 to create tunnel segments (e.g., by assigning labels to the tunnel segments and determining or writing cross connects, etc.) corresponding to the computed path segments. In some embodiments, the tunnels cross multiple domains 104. The parent controller 106 transmits the CTSReq NLRI TLVs 3900, in some embodiments, in a reverse order of the shortest path such that a child controller 108 that controls a domain 104 in which the destination node is located receives a first CTSReq NLRI TLV 3900 transmitted by the parent controller 106 and a child controller 108 that controls a domain 104 in which the source node is located receives a last CTSReq NLRI TLV 3900 transmitted by the parent controller 106.

As discussed above, in some embodiments, a CTSReq NLRI TLV 3900 suitable for transmission from the parent controller 106 to the child controller 108 includes the GTID and PID allocated by the parent controller 106, either a path segment from a start point to an end point (e.g., for a parent controller 106 that does not have detailed information and knowledge of the domains 104) or a path segment details and an Explicit Route Object (ERO) (e.g., for a parent controller 106 that has detailed information and knowledge of the domains 104), and a label and an interface if the domain 104 controlled by the child controller 108 receiving the CTSReq NLRI TLV 3900 does not contain the destination node.

After receiving the CTSReq NLRI TLV 3900, when the parent controller 106 does not have detailed information and knowledge of the domain 104, the child controller 108 allocates and reserves link bandwidth along the path segment identified by the start point and the end point, and details for which the child controller 108 has previously stored along with an association to the GTID and the PID, assigns labels along the path segment, and writes cross connects on each of the nodes along the path segment. When the parent controller 106 has detailed information and knowledge of the domain 104, the child controller 108 assigns labels along the path segment indicated by the ERO and writes cross connects on each of the nodes along the path segment. When the parent controller 106 has detailed information and knowledge of the domain 104, link bandwidth along the path segment is allocated and reserved by the parent controller 106 instead of by the child controller 108. For a child controller 108 controlling a domain 104 that does not include the destination node, the child controller 108 writes the cross connect on an edge or boundary node to a downstream domain 104 using a label and interface of the downstream domain 104 that was received by the child controller 108 in the CTSReq NLRI TLV 3900 from the parent controller 106. For a child controller 108 controlling a domain 104 which does not include the source node, the child controller 108 includes a label and an interface in a reply message to the parent controller 106. The interface connects an edge node of an upstream domain 104 along the E2E path and the label is allocated for the interface on a node that is a next hop of the edge node.

After creating the tunnel segments according to the CTSReq NLRI TLV 3900, at step 4645, the child controller 108 transmits a CTSRep NLRI TLV 4300 (e.g., having a format and content as discussed above with respect to FIG. 43) to the parent controller 106. The CTSRep NLRI TLV 4300, in some embodiments, includes the GTID and the PID, a status of tunnel segment creation according to the CTSReq NLRI TLV 3900 (e.g., a status of "success" indicating that the requested tunnel segments have been successfully created by the child controller 108 or a status of "fail" indicating that the requested tunnel segments cannot be created by the child controller 108), when the status is "fail," an error code and reasons for the failure to create the requested tunnel segments, and when the domain 104 controlled by the respective child controller 108 transmitting the CTSRep NLRI TLV 4300 is not a source domain and the status is "success," a label and an interface, as discussed above.

After creating tunnel segments, in some embodiments the parent controller 106 receives a request to delete each segment of the E2E tunnel or at least one of the tunnel segments. The request is received from, for example, a user or an application. When the parent controller 106 is requested to remove a tunnel segment, or the parent controller 106 receives a CTSRep NLRI TLV 4300 from a child controller 108 that includes a status of "fail," at step 4650 the parent controller 106 transmits a RTSReq NLRI TLV 4400 (e.g., having a format and content as discussed above with respect to FIG. 44) to a child controller 108 to delete the tunnel segment. As discussed above, in some embodiments, a RTSReq NLRI TLV 4400 suitable for transmission from the parent controller 106 to the child controller 108 includes the GTID and PID allocated by the parent controller 106.

After receiving the RTSReq NLRI TLV 4400, the child controller 108 releases labels assigned along the path segments within the child controller 108's domain 104 and removes the cross connects on each node along the path segments. When the child controller 108 also reserved the link bandwidth associated with the GTID and PID (e.g., such as when the parent controller 106 does not have detailed knowledge or information of the domain 104) the child controller 108 releases the reserved link bandwidth. After removing the tunnel segment as requested by the parent controller 106 in the RTSReq NLRI TLV 4400, at step 4655 the child controller 108 transmits a RTSRep NLRI TLV 4500 (e.g., having a format and content as discussed above with respect to FIG. 45) to the parent controller 106. The RTSRep NLRI TLV 4500, in some embodiments, includes the GTID and PID, a status of tunnel removal according to the RTSReq NLRI TLV 4400 (e.g., a status of "success" indicating that the requested tunnel segments have been successfully removed by the child controller 108 or a status of "fail" indicating that the requested tunnel segments cannot be removed by the child controller 108), and when the status is "fail," an error code and reasons for the failure to remove the requested tunnel segments.

Figure 47:
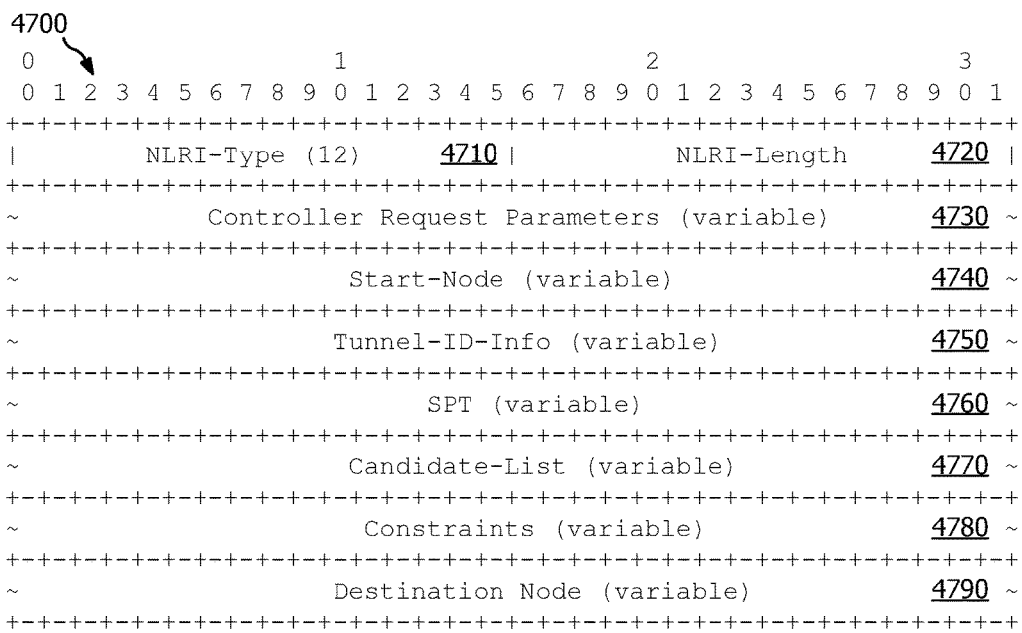
FIG. 47 is an embodiment of a Request for Growing Shortest Path Tree (SPT) (GSReq) NLRI TLV.

Referring now to FIG. 47, an embodiment of a GSReq NLRI TLV 4700 is shown. The GSReq NLRI TLV 4700 is implemented in a message transmitted between two network elements (e.g., between any two of the distributed controllers 210A-210E) to request growing a SPT for use in creating an E2E tunnel, for example, in a DSCS such as the DSCS 200 of FIG. 2. The GSReq NLRI TLV 4700 is transmitted, in some embodiments, in the SDN NLRI TLV 600 of FIG. 6, for example, in the SDN NLRI Value field 630.

As shown in FIG. 47, the GSReq NLRI TLV 4700 includes a NLRI-Type field 4710, a NLRI-Length field 4720, a CRP field 4730, a Start-Node field 4740, a Tunnel-ID-Info field 4750, a SPT field 4760, a Candidate-List field 4770, a Constraints field 4780, and a Destination Node field 4790. The NLRI-Type field 4710 includes an identifier of the GSReq NLRI TLV 4700 that indicates an intended meaning of the GSReq NLRI and content of the GSReq NLRI TLV 4700. For example, exemplary contents of the NLRI-Type field 4710 are shown above in Table 1. The NLRI-Length field 4720 indicates a length of the GSReq NLRI TLV 4700 which is dependent upon a particular content included in the GSReq NLRI TLV 4700, and therefore a particular value of the NLRI-Length field 4720 of the GSReq NLRI TLV 4700 is not limited herein. The CRP field 4730, in some embodiments, contains a CRP TLV that specifies various parameters relating to a tunnel related operation request, as will be discussed in greater detail below. The Start-Node field 4740 describes a start-node (e.g., as an address or identifier of the start-node) in a domain controlled by a distributed controller that receives the GSReq NLRI TLV 4700. In some embodiments, the Start-Node field 4740 includes a Start Node TLV 2300, as discussed above with respect to FIG. 23. The start-node is, for example, the node from which the distributed controller that receives the GSReq NLRI TLV 4700 computes one or more path segments in response to the GSReq NLRI TLV 4700. The Tunnel-ID-Info field 4750 indicates a GTID and a PID associated with a tunnel (e.g., a tunnel which may have one or more tunnel segments constructed along one or more path segments at least in part according to a SPT constructed at least partially based on the GSReq NLRI TLV 4700). In some embodiments, the Tunnel-ID-Info field 4750 indicates the GTID and the PID in a Tunnel-ID-Info TLV, such as the Tunnel-ID-Info TLV 2400 of FIG. 24. The SPT field 4760 describes a SPT that has been built thus far in the DSCS prior to transmission of the GSReq NLRI TLV 4700 (e.g., based, at least in part, on previous GSReq NLRI TLV 4700 transmitted to one or more other distributed controllers). The Candidate-List field 4770 describes nodes which are candidates for inclusion in the SPT included in the SPT field 4760, for example, as identified and added to the candidate list in response to previous GSReq NLRI TLV 4700 transmitted to one or more other distributed controllers. The Constraints field 4780 indicates constraints (e.g., bandwidth, quality of service (QoS), etc.) specified by the distributed controller sending the GSReq NLRI TLV 4700 which path segments computed by the distributed controller receiving the GSReq NLRI TLV 4700 should satisfy. In some embodiments, the GSReq NLRI TLV 4700 indicates the constraints in a Bandwidth TLV, such as the Bandwidth TLV 2600 of FIG. 26, a LSPA TLV, such as the LSPA TLV 2700 of FIG. 27, or an ER TLV, such as the ER TLV 2800 of FIG. 28. The Destination-Node field 4790 indicates an address or identifier of a destination node to which the distributed controller sending the GSReq NLRI TLV 4700 wishes to build the SPT. In some embodiments, the destination node is in the domain controlled by the distributed controller that receives the GSReq NLRI TLV 4700, while in other embodiments the destination node is in a domain not controlled by the distributed controller that receives the GSReq NLRI TLV 4700.

Referring now to FIG. 48, an embodiment of a SPT TLV 4800 is shown. The SPT TLV 4800 may be implemented in any of the messages according to various embodiments of the present disclosure to indicate a SPT calculated by one or more network elements (e.g., any one or more of the distributed controllers 210A-210E of FIG. 2) in a network such as the DSCS 200 of FIG. 2. For example, the SPT TLV 4800 is suitable for implementation, in some embodiments, in the various messages transmitted between any two distributed controllers 210A-210E, for example, in an SPT field, such as at least the SPT field 4760 of the GSReq NLRI TLV 4700 of FIG. 47. The SPT TLV 4800 includes, in some embodiments, a Type field 4810, a Length field 4820, an ER Sub-TLV field 4830, and one or more secondary explicit route (SER) Sub-TLV fields 4840. The Type field 4810 includes an identifier of the SPT TLV 4800 that indicates a type of the SPT TLV 4800. The type of the SPT TLV 4800 may be a numeric value that is assigned to the SPT TLV 4800 at a later time and a particular value of the Type field 4810 of the SPT TLV 4800 is not limited herein. The Length field 4820 indicates a length of the SPT TLV 4800, which is dependent upon a particular content included in the SPT TLV 4800, and therefore a particular value of the Length field 4820 of the SPT TLV 4800 is not limited herein. The ER Sub-TLV field 4830 and the one or more SER Sub-TLV fields 4840 each include one or more Sub-TLVs that are discussed in greater detail below.

Referring now to FIG. 49, an embodiment of an ER Sub-TLV 4900 is shown. The ER Sub-TLV 4900 may be implemented in any of the messages according to various embodiments of the present disclosure to explicitly identify nodes through which a path segment and/or a tunnel segment should traverse. For example, the ER Sub-TLV 4900 is suitable for implementation, in some embodiments, in the various messages transmitted between the parent controller 106 and any one or more of the child controllers 108, each of FIG. 1, and/or between any two distributed controllers 210A-210E of FIG. 2, for example, in a ER Sub-TLV field such as the ER Sub-TLV field 4830 of the SPT TLV 4800 of FIG. 28. The ER Sub-TLV 4900 includes, in some embodiments, a Type field 4910, a Length field 4920, one or more Node Sub-TLV fields 4930, and a Cost2Node Sub-TLV field 4940. The Type field 4910 includes an identifier of the ER Sub-TLV 4900 that indicates a type of the ER Sub-TLV 4900. The type of the ER Sub-TLV 4900 may be a numeric value that is assigned to the ER Sub-TLV 4900 at a later time and a particular value of the Type field 4910 of the ER Sub-TLV 4900 is not limited herein. The Length field 4920 indicates a length of the ER Sub-TLV 4900, which is dependent upon a particular content included in the ER Sub-TLV 4900, and therefore a particular value of the Length field 4920 of the ER Sub-TLV 4900 is not limited herein. The Node Sub-TLV fields 4930 each include one or more Node Sub-TLVs, such as the IPv4 prefix Node Sub-TLV 2900 discussed above with respect to FIG. 29 or the ASN Node Sub-TLV 3000 discussed above with respect to FIG. 30. Each of the Node Sub-TLV fields 4930, in some embodiments, includes a representation of a node for a branch in a SPT where the branch represents a portion of the SPT from a root to a leaf of the SPT. The Node Sub-TLV fields 4930 are located in the ER Sub-TLV 4900 in a same order as an order of the corresponding node in the branch of the SPT (e.g., such that a first node is represented in a first Node Sub-TLV field 4930, a second node is represented in a second Node Sub-TLV field 4930 and so forth until all nodes in the branch have a corresponding Node Sub-TLV field 4930 in the ER Sub-TLV 4900). The Cost2Node Sub-TLV field 4940 includes a cost to reach the node represented by the last Node Sub-TLV field 4930 of the one or more Node Sub-TLV fields 4930 and is discussed in greater detail below.

Referring now to FIG. 50, an embodiment of a SER Sub-TLV 5000 is shown. The SER Sub-TLV 5000 may be implemented in any of the messages according to various embodiments of the present disclosure to explicitly identify nodes through which a path segment and/or a tunnel segment should traverse. For example, the SER Sub-TLV 5000 is suitable for implementation, in some embodiments, in the various messages transmitted between the parent controller 106 and any one or more of the child controllers 108, each of FIG. 1, and/or between any two distributed controllers 210A-210E of FIG. 2, for example, in a SER Sub-TLV field, such as at least the SER Sub-TLV fields 4840 of the SPT TLV 4800 of FIG. 48. The SER Sub-TLV 5000 includes, in some embodiments, a Type field 5010, a Length field 5020, one or more Node Sub-TLV fields 5030, and a Cost2Node Sub-TLV field 5040. The Type field 5010 includes an identifier of the SER Sub-TLV 5000 that indicates a type of the SER Sub-TLV 5000. The type of the SER Sub-TLV 5000 may be a numeric value that is assigned to the SER Sub-TLV 5000 at a later time and a particular value of the Type field 5010 of the SER Sub-TLV 5000 is not limited herein. The Length field 5020 indicates a length of the SER Sub-TLV 5000, which is dependent upon a particular content included in the SER Sub-TLV 5000, and therefore a particular value of the Length field 5020 of the SER Sub-TLV 5000 is not limited herein. The Node Sub-TLV fields 2030 each include one or more Node Sub-TLVs, such as the IPv4 prefix Node Sub-TLV 2900 discussed above with respect to FIG. 29 or the ASN Node Sub-TLV 3000 discussed above with respect to FIG. 30. Each of the Node Sub-TLV fields 5030, in some embodiments, includes a representation of a node for a branch in a SPT where the branch represents a portion of the SPT from a root to a leaf of the SPT. The Node Sub-TLV fields 5030 are located in the SER Sub-TLV 5000 in a same order as an order of the corresponding node in the branch of the SPT (e.g., such that a first node is represented in a first Node Sub-TLV field 5030, a second node is represented in a second Node Sub-TLV field 5030 and so forth until all nodes in the branch have a corresponding Node Sub-TLV field 5030 in the SER Sub-TLV 5000). The Cost2Node Sub-TLV field 5040 includes a cost to reach the node represented by the last Node Sub-TLV field 5030 of the one or more Node Sub-TLV fields 5030 and is discussed in greater detail below.

Referring now to FIG. 51, an embodiment of a Cost2Node Sub-TLV 5100 is shown. The Cost2Node Sub-TLV 5100 may be implemented in any of the messages according to various embodiments of the present disclosure to indicate a cost of reaching a particular node associated with the Cost2Node Sub-TLV 5100 (e.g., a node represented by a Node Sub-TLV field of the ER Sub-TLV of FIG. 49 and/or a node represented by a Node Sub-TLV field of the SER Sub-TLV of FIG. 50) in a network such as the HSCS 100 of FIG. 1 and/or the DSCS 200 of FIG. 2. For example, the Cost2Node Sub-TLV 5100 is suitable for implementation, in some embodiments, in the various messages transmitted between the parent controller 106 and any one or more of the child controllers 108, each of FIG. 1, and/or between any two distributed controllers 210A-210E of FIG. 2, for example, in a Cost2Node Sub-TLV field, such as at least the Cost2Node Sub-TLV field 4940 of the ER Sub-TLV 4900 of FIG. 49 and/or the Cost2Node Sub-TLV field 5040 of the SER Sub-TLV 5000 of FIG. 50. The Cost2Node Sub-TLV 5100 includes, in some embodiments, a Type field 5110, a Length field 5120, and a Cost field 5130. The Type field 5110 includes an identifier of the Cost2Node Sub-TLV 5100 that indicates a type of the Cost2Node Sub-TLV 5100. The type of the Cost2Node Sub-TLV 5100 may be a numeric value that is assigned to the Cost2Node Sub-TLV 5100 at a later time and a particular value of the Type field 5110 of the Cost2Node Sub-TLV 5100 is not limited herein. The Length field 5120 indicates a length of the Cost2Node Sub-TLV 5100, which is dependent upon a particular content included in the Cost2Node Sub-TLV 5100, and therefore a particular value of the Length field 5120 of the Cost2Node Sub-TLV 5100 is not limited herein. The Cost field 5130 indicates a cost of reaching a particular node in the network. In some embodiments, the cost is represented as a number of network hops (e.g., nodes that must be traversed) to reach the particular node in the network. In other embodiments, the cost is represented as a function of an IGP metric or a TE metric, for example, as specified in a CRP TLV, discussed below.

Referring now to FIG. 52, an embodiment of an IPv4 Candidate-List TLV 5200 is shown. The IPv4 Candidate-List TLV 5200 may be implemented in any of the messages according to various embodiments of the present disclosure to indicate one or more nodes which may be candidates for inclusion in an SPT, such as the SPT indicated by the SPT TLV of FIG. 48, in a network such as the DSCS 200 of FIG. 2. For example, the IPv4 Candidate-List TLV 5200 is suitable for implementation, in some embodiments, in the various messages transmitted between any two distributed controllers 210A-210E of FIG. 2, for example, in a Candidate-List TLV field, such as at least the Candidate-List TLV field 4770 of the GSReq NLRI TLV 4700 of FIG. 47. The IPv4 Candidate-List TLV 5200 includes, in some embodiments, a Type field 5210, a Length field 5220, and one or more IPv4 Candidate-Node Sub-TLV fields 5230. The Type field 5210 includes an identifier of the IPv4 Candidate-List TLV 5200 that indicates a type of the IPv4 Candidate-List TLV 5200. The type of the IPv4 Candidate-List TLV 5200 may be a numeric value that is assigned to the IPv4 Candidate-List TLV 5200 at a later time and a particular value of the Type field 5210 of the IPv4 Candidate-List TLV 5200 is not limited herein. The Length field 5220 indicates a length of the IPv4 Candidate-List TLV 5200, which is dependent upon a particular content included in the IPv4 Candidate-List TLV 5200, and therefore a particular value of the Length field 5220 of the IPv4 Candidate-List TLV 5200 is not limited herein. Each of the one or more IPv4 Candidate-Node Sub-TLV fields 5230 includes one or more Sub-TLVs, such as IPv4 Candidate-Node Sub-TLVs, which are discussed in greater detail below. It should be noted that the IPv4 Candidate-List TLV 5200 is equally applicable to an IPv6 network or node, in which case any use of "IPv4" in the IPv4 Candidate-List TLV 5200 may be substituted with "IPv6" without departing from the scope of the present disclosure.

Referring now to FIG. 53, an embodiment of an IPv4 Candidate-Node Sub-TLV 5300 is shown. The IPv4 Candidate-Node Sub-TLV 5300 may be implemented in any of the messages according to various embodiments of the present disclosure to indicate an address of a node that may be a candidate for inclusion in an SPT, such as the SPT indicated by the SPT TLV of FIG. 48, in a network such as the DSCS 200 of FIG. 2. For example, the IPv4 Candidate-Node Sub-TLV 5300 is suitable for implementation, in some embodiments, in the various messages transmitted between any two distributed controllers 210A-210E of FIG. 2, for example, in an IPv4 Candidate-Node Sub-TLV field 5230 of the IPv4 Candidate-List TLV 5200 of FIG. 52. The IPv4 Candidate-Node Sub-TLV 5300 includes, in some embodiments, a Type field 5310, a Length field 5320, a Candidate-Node IPv4 Address field 5330, a Previous-Hop Node IPv4 Address field 5340, and a Candidate-Node Cost field 5350. The Type field 5310 includes an identifier of the IPv4 Candidate-Node Sub-TLV 5300 that indicates a type of the IPv4 Candidate-Node Sub-TLV 5300. The type of the IPv4 Candidate-Node Sub-TLV 5300 may be a numeric value that is assigned to the IPv4 Candidate-Node Sub-TLV 5300 at a later time and a particular value of the Type field 5310 of the IPv4 Candidate-Node Sub-TLV 5300 is not limited herein. The Length field 5320 indicates a length of the IPv4 Candidate-Node Sub-TLV 5300, which is dependent upon a particular content included in the IPv4 Candidate-Node Sub-TLV 5300, and therefore a particular value of the Length field 5320 of the IPv4 Candidate-Node Sub-TLV 5300 is not limited herein. The Candidate-Node IPv4 Address field 5330 includes an address of a node in the network which is a candidate for inclusion in the SPT. The Previous-Hop Node IPv4 Address field 5340 includes an address of a node in the network that immediately precedes the node identified by the address included in the Candidate-Node IPv4 Address field 5330 along a path segment from the root of the SPT to the node identified by the address included in the Candidate-Node IPv4 Address field 5330. The Candidate-Node Cost field 5350 includes an indication of a cost of a path segment from the toot of the SPT to the node identified by the address included in the Candidate-Node IPv4 Address field 5330. For example, the cost indicated in the Candidate-Node Cost field 5350 may be represented as a cost in terms of an IGP metric, in terms of a TE metric, or in terms of a number of hops required to reach the node identified by the address included in the Candidate-Node IPv4 Address field 5330. In some embodiments, the particular representation chosen to indicate the cost may be determined according to a content of a CRP TLV, as discussed below. It should be noted that the IPv4 Candidate-Node Sub-TLV 5300 is equally applicable to an IPv6 network or node, in which case any use of "IPv4" in the IPv4 Candidate-Node Sub-TLV 5300 may be substituted with "IPv6" without departing from the scope of the present disclosure.

Figure 54:
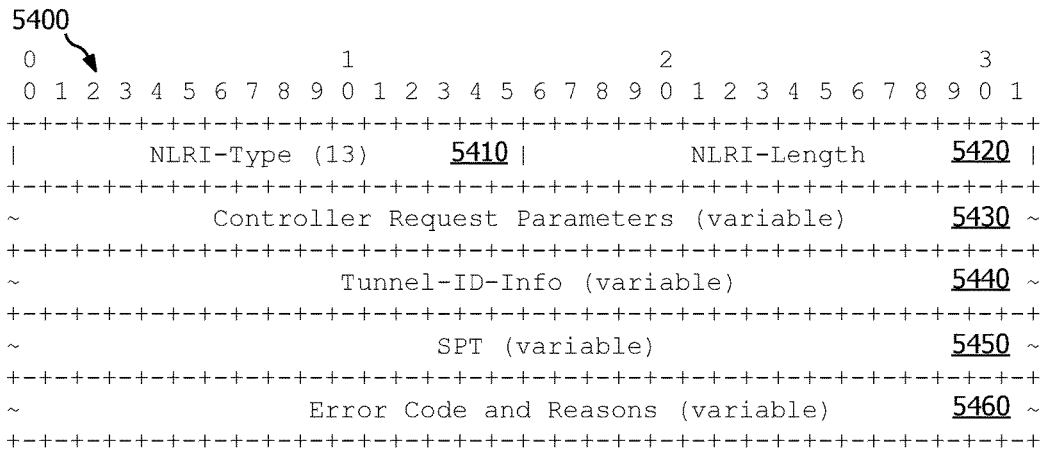
FIG. 54 is an embodiment of a Reply for Growing SPT (GSRep) NLRI TLV.

Referring now to FIG. 54, an embodiment of a GSRep NLRI TLV 5400 is shown. The GSRep NLRI TLV 5400 is implemented in a message transmitted, in some embodiments, between two network elements (e.g., between any two of the distributed controllers 210A-210E) in response to a request for growing a SPT for use in creating an E2E tunnel (e.g., the GSReq NLRI TLV 4700, as discussed above with respect to FIG. 47), for example, in a DSCS such as the DSCS 200 of FIG. 2. The GSRep NLRI TLV 5400 is transmitted, in some embodiments, in the SDN NLRI TLV 600 of FIG. 6, for example, in the SDN NLRI Value field 630.

As shown in FIG. 54, the GSRep NLRI TLV 5400 includes a NLRI-Type field 5410, a NLRI-Length field 5420, a CRP field 5430, a Tunnel-ID-Info field 5440, a SPT field 5450, and an Error Code and Reasons field 5460. The NLRI-Type field 5410 includes an identifier of the GSRep NLRI TLV 5400 that indicates an intended meaning of the GSRep NLRI TLV 5400 and content of the GSRep NLRI TLV 5400. For example, exemplary contents of the NLRI-Type field 5410 are shown above in Table 1. The NLRI-Length field 5420 indicates a length of the GSRep NLRI TLV 5400 which is dependent upon a particular content included in the GSRep NLRI TLV 5400, and therefore a particular value of the NLRI-Length field 5420 of the GSRep NLRI TLV 5400 is not limited herein. The CRP field 5430, in some embodiments, contains a CRP TLV that specifies various parameters relating to a tunnel related operation request, as will be discussed in greater detail below. The Tunnel-ID-Info field 5440 indicates a GTID and a PID associated with a tunnel (e.g., a tunnel which may have one or more tunnel segments constructed along one or more path segments computed by the child controller in response to the GSReq NLRI TLV 4700, as discussed above with respect to FIG. 47). In some embodiments, the Tunnel-ID-Info field 5440 indicates the GTID and the PID in a Tunnel-ID-Info TLV, such as the Tunnel-ID-Info TLV 2400 of FIG. 24. The SPT field 5450 includes the SPT that has been built thus far in the DSCS (e.g., the SPT received in the GSReq NLRI TLV 4700 with the additional node added to the SPT by the distributed controller that received the GSReq NLRI TLV 4700 and transmits the GSRep NLRI TLV 5400). When the SPT has not been grown pursuant to the GSReq NLRI TLV 4700, the Error Code and Reasons field 5460 includes explanatory information (e.g., an error code or other information) related to a reason or cause of the failure to grow the SPT and/or information relating to why a shortest path from the start node to the destination node cannot be built in the SPT.

Figure 55:
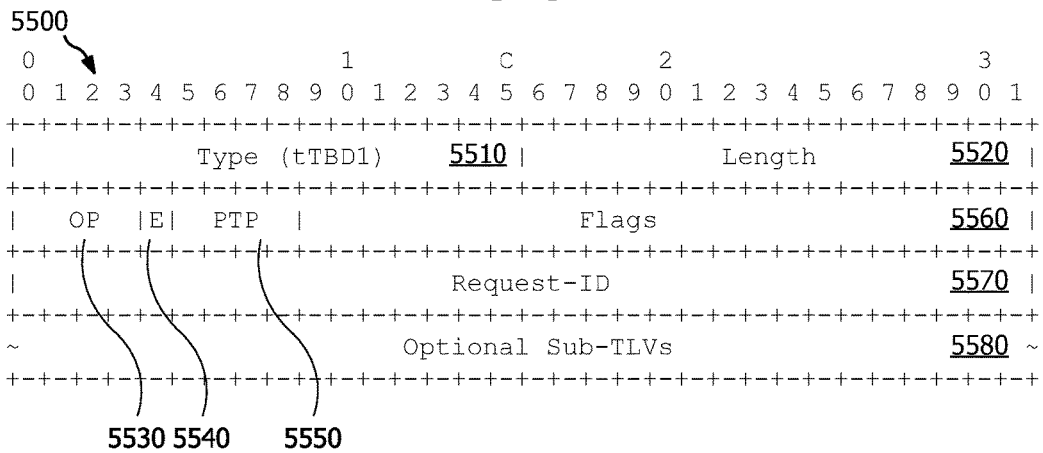
FIG. 55 is an embodiment of a Controller Request Parameters (CRP) TLV.

Referring now to FIG. 55, an embodiment of a CRP TLV 5500 is shown. The CRP TLV 5500 is implemented in a message transmitted, in some embodiments, between two network elements (e.g., between any one or more of the child controllers 108 and the parent controller 106 of FIG. 1 and/or between any two of the distributed controllers 210A-210E of FIG. 2), for example, in any of the messages described herein. In some embodiments, the CRP TLV 5500 is implemented in the CRP field of any of the various messages described herein and transmitted between two network elements. A message suitable for carrying the CRP TLV 5500 is transmitted, in some embodiments, in the SDN NLRI TLV 600 of FIG. 6, for example, in the SDN NLRI Value field 630.

As shown in FIG. 55, the CRP TLV 5500 includes a Type field 5510, a Length field 5520, an Optimization Parameter (OP) field 5530, an Edge of Domain (E) field 5540, a Path Computation and Tunnel Creation parameter (PTP) field 5550, a Flags field 5560, a Request-ID field 5570, and an Optional Sub-TLVs field 5580. In some embodiments, the OP field 5530, the E field 5540, and the PTP field 5550 are each a portion of the Flags field 5560 for which a particular definition or reservation exists while a remainder of the Flags field 5560 is undefined or reserved (e.g., such that a remainder of the Flags field 5560 contains bits set to "0"). The Type field 5510 includes an identifier of the CRP TLV 5500 that indicates an intended meaning of the CRP TLV 5500 and content of the CRP TLV 5500 and may be determined according to a particular implementation of the CRP TLV 5500. Therefore, a particular value of the Type field 5510 of the CRP TLV 5500 is not limited herein. The Length field 5520 indicates a length of the CRP TLV 5500 which is dependent upon a particular content included in the CRP TLV 5500, and therefore a particular value of the Length field 5520 of the CRP TLV 5500 is not limited herein. The OP field 5530, in some embodiments, is a four-bit field that specifies a desired optimization for path and/or tunnel segments computed and/or created in response to a message containing the CRP TLV 5500. For example, the path and/or tunnel segments computed and/or created such that an IGP metric is optimized, a TE metric is optimized, a number of hops taken in a network is optimized, etc. In some embodiments, contents of the OP field 5530 are defined as shown in the below Table 2.

TABLE 2

| OP | Meaning (Optimize on) |
|---|---|
| 1 | IGP metric |
| 2 | TE metric |
| 3 | Hop counts |
| 4-15, 0 | Undefined/Reserved |

The E field 5540, in some embodiments, is a one-bit field that specifies whether nodes included in an exception list (e.g., in an exception list such as that included in the CPSReq NLRI TLV 2200, as discussed above with respect to FIG. 22) should be included in path segment computations. For example, when the E field 5540 is set to "1," a child controller receiving the CRP TLV 5500 may compute a shortest path segment satisfying any given constraints from an identified start node to each of the edge nodes of the domain controlled by the child controller except for nodes included in a given exception list. The PTP field 5550, in some embodiments, is a four-bit field that indicates a role and/or responsibility of distributed controllers within a DSCS. For example, the PTP field 5550 may include an indication of a master controller in the DSCS controlling or the master controller initiating actions in the DSCS. In some embodiments, contents of the PTP field 5550 are defined as shown in the below Table 3.

TABLE 3

| PTP | Meaning (Procedure indicated) |
|---|---|
| 1 | Master controller Controls Path computation (MCP) |
| 2 | Master controller Controls Tunnel creation (MCT) |
| 3 | Master controller Initiated Path computation (MIP) |
| 4 | Master controller Initiated Tunnel creation (MIT) |
| 5 | Master controller Initiates Path computation and Tunnel creation in one round (MIPT) |
| 6-15, 0 | Undefined/Reserved |

The Request-ID field 5570 includes an identifier that identifies the tunnel related operation request with which the CRP TLV 5500 is associated. The identifier may be a unique identifier that uniquely identifies the particular tunnel related operation request or the identifier may be a general identifier that identifies a category to which the tunnel related operation request belongs (e.g., such as create, remove, etc.). The Optional Sub-TLVs field 5580, in some embodiments, contains Sub-TLVs that may be optional to operation of a network element that receives the Optional Sub-TLVs but which, when present, provide additional information related to path segment computation and/or tunnel creation in a network in which the network element operates. For example, in a DSCS, such as the DSCS 200 of FIG. 2, Optional Sub-TLVs which may be included in the Optional Sub-TLVs field 5580 include an Originator Sub-TLV, a From Controller Sub-TLV, and a Target Controller Sub-TLV, each of which is discussed in greater detail below.

Figure 56:
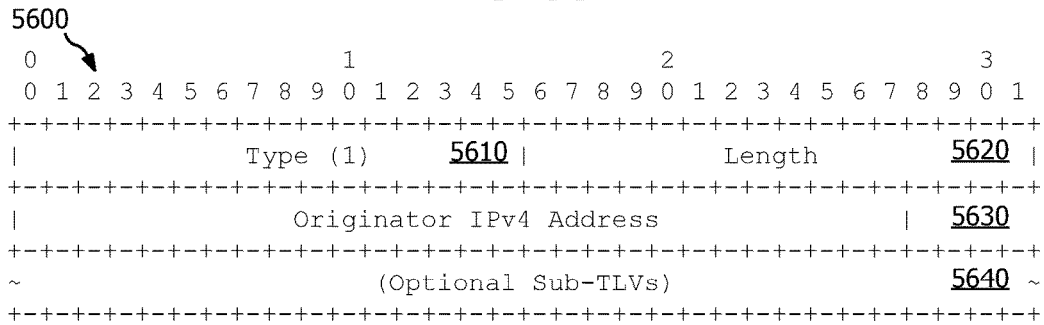
FIG. 56 is an embodiment of an Originator Sub-TLV.

Referring now to FIG. 56, an embodiment of an Originator Sub-TLV 5600 is shown. The Originator Sub-TLV 5600 is implemented in a message transmitted, in some embodiments, between two network elements (e.g., between any one or more of the child controllers 108 and the parent controller 106 of FIG. 1 and/or between any two of the distributed controllers 210A-210E of FIG. 2), for example, in the Optional Sub-TLVs field 5580 of the CRP TLV 5500, as discussed above with respect to FIG. 55. A message suitable for carrying the Originator Sub-TLV 5600 in the CRP TLV 5500 is transmitted, in some embodiments, in the SDN NLRI TLV 600 of FIG. 6, for example, in the SDN NLRI Value field 630.

As shown in FIG. 56, the Originator Sub-TLV 5600 includes a Type field 5610, a Length field 5620, an Originator IPv4 Address field 5630, and an Optional Sub-TLVs field 5640. The Type field 5610 includes an identifier of the Originator Sub-TLV 5600 that indicates an intended meaning of the Originator Sub-TLV 5600 and content of the Originator Sub-TLV 5600 and may be determined according to a particular implementation of the Originator Sub-TLV 5600. Therefore, a particular value of the Type field 5610 of the Originator Sub-TLV 5600 is not limited herein. The Length field 5620 indicates a length of the Originator Sub-TLV 5600 which is dependent upon a particular content included in the Originator Sub-TLV 5600, and therefore a particular value of the Length field 5620 of the Originator Sub-TLV 5600 is not limited herein.

The Originator IPv4 Address field 5630 includes an IPv4 address of a message originator in a DSCS, such as the DSCS 200 of FIG. 2. The Originator IPv4 Address field 5630, in some embodiments, enables other distributed controllers in the DSCS to identify the initial source of a message (e.g., a request message) when the distributed controllers receive the message. The originator, in some embodiments, is a master controller in the DSCS. When the master controller is not adjacent to a distributed controller which is a target of a message being sent by the master controller (e.g., in which case the distributed controller may be referred to as a target controller), the master controller transmits the message to a distributed controller which is adjacent to the master controller and is along a route or path to the target controller. For example, the master controller transmits a message to an adjacent distributed controller that is a next hop node to the target controller from the master controller as defined by a routing table. Each distributed controller along the route between the master controller and the target controller relays the message to its adjacent distributed controller that is the next hop node to the target controller (e.g., as again defined by a routing table) until the target controller receives the message.

When the target controller receives the message, the target controller performs any operations requested by the message and, in some embodiments, sends a reply message to the master controller identified as the message originator by the IPv4 address included in the Originator IPv4 Address field 5630. The target controller sends the reply message to the master controller by transmitting the reply message to a distributed controller that is adjacent to the target controller and which is a next hop node on a route between the target controller and the master controller (e.g., as defined by a routing table). Each distributed controller along the route between the target controller and the master controller relays the reply message to its adjacent distributed controller which is the next hop node to the master controller (e.g., as again defined by a routing table) until the master controller receives the reply message. When the master controller receives the reply message, in some embodiments the master controller performs one or more actions in response to receipt of the reply message and/or a content of the reply message. It should be noted that while the Originator Sub-TLV 5600 is defined as including an Originator IPv4 Address field 5630 that includes an IPv4 address, the Originator Sub-TLV 5600 may alternatively include a Originator IPv6 Address field that includes an IPv6 address. The Optional Sub-TLVs field 5640, in some embodiments, contains Sub-TLVs that may be optional to operation of a network element that receives the Optional Sub-TLVs but which, when present, provide additional information related to path segment computation and/or tunnel creation in a network in which the network element operates and a content of the Optional Sub-TLVs field 5640 of the Originator Sub-TLV 5600 are not limited herein.

Referring now to FIG. 57, an embodiment of a From Controller Sub-TLV 5700 is shown. The From Controller Sub-TLV 5700 is implemented in a message transmitted, in some embodiments, between two network elements (e.g., between any one or more of the child controllers 108 and the parent controller 106 of FIG. 1 and/or between any two of the distributed controllers 210A-210E of FIG. 2), for example, in the Optional Sub-TLVs field 5580 of the CRP TLV 5500, as discussed above with respect to FIG. 55. A message suitable for carrying the From Controller Sub-TLV 5700 in the CRP TLV 5500 is transmitted, in some embodiments, in the SDN NLRI TLV 600 of FIG. 6, for example, in the SDN NLRI Value field 630. The From Controller Sub-TLV 5700, in some embodiments, identifies a distributed controller which constructed a message (e.g., a request message) and/or from which a message (e.g., a request message) is sent.

As shown in FIG. 57, the From Controller Sub-TLV 5700 includes a Type field 5710, a Length field 5720, a From Controller IPv4 Address field 5730, and an Optional Sub-TLVs field 5740. The Type field 5710 includes an identifier of the From Controller Sub-TLV 5700 that indicates an intended meaning of the From Controller Sub-TLV 5700 and content of the From Controller Sub-TLV 5700 and may be determined according to a particular implementation of the From Controller Sub-TLV 5700. Therefore, a particular value of the Type field 5710 of the From Controller Sub-TLV 5700 is not limited herein. The Length field 5720 indicates a length of the From Controller Sub-TLV 5700 which is dependent upon a particular content included in the From Controller Sub-TLV 5700, and therefore a particular value of the Length field 5720 of the From Controller Sub-TLV 5700 is not limited herein. The From Controller IPv4 Address field 5730 includes an IPv4 address of a distributed controller which constructed a message and/or from which a message is sent in a DSCS such as the DSCS 200 of FIG. 2. For example, in a DSCS, a first distributed controller may construct and send a first message to a second distributed controller (e.g., a GSReq, as discussed above with respect to FIG. 47). In such a scenario, an address of the first distributed controller is included in the From Controller IPv4 Address field 5730 of the From Controller Sub-TLV 5700 to identify the first distributed controller as a source of the first message. After performing actions pursuant to the first message, in some embodiments, the second distributed controller constructs and sends a second message to a third distributed controller. In such a scenario, an address of the second distributed controller is included in the From Controller IPv4 Address field 5730 of the From Controller Sub-TLV 5700 to identify the second distributed controller as a source of the second message. In some embodiments, an address included in the From Controller IPv4 Address field 5730 and an address included in an Originator IPv4 Address field 5630 of an Originator Sub-TLV 5600, as discussed above, may be the same, while in other embodiments the addresses may be different.

It should be noted that while the From Controller Sub-TLV 5700 is defined as including a From Controller IPv4 Address field 5730 that includes an IPv4 address, the From Controller Sub-TLV 5700 may alternatively include a From Controller IPv6 Address field that includes an IPv6 address. The Optional Sub-TLVs field 5740, in some embodiments, contains Sub-TLVs that may be optional to operation of a network element that receives the Optional Sub-TLVs but which, when present, provide additional information related to path segment computation and/or tunnel creation in a network in which the network element operates and a content of the Optional Sub-TLVs field 5740 of the From Controller Sub-TLV 5700 are not limited herein.

Referring now to FIG. 58, an embodiment of a Target Controller Sub-TLV 5800 is shown. The Target Controller Sub-TLV 5800 is implemented in a message transmitted, in some embodiments, between two network elements (e.g., between any one or more of the child controllers 108 and the parent controller 106 of FIG. 1 and/or between any two of the distributed controllers 210A-210E of FIG. 2), for example, in the Optional Sub-TLVs field 5580 of the CRP TLV 5500, as discussed above with respect to FIG. 55. A message suitable for carrying the Target Controller Sub-TLV 5800 in the CRP TLV 5500 is transmitted, in some embodiments, in the SDN NLRI TLV 600 of FIG. 6, for example, in the SDN NLRI Value field 630. The Target Controller Sub-TLV 5800, in some embodiments, identifies a distributed controller which is an intended destination for a message (e.g., a request message) constructed and transmitted by a distributed controller (e.g., the distributed controller identified by the From Controller IPv4 Address field 5730 of the From Controller Sub-TLV 5700, as discussed above with respect to FIG. 57).

As shown in FIG. 58, the Target Controller Sub-TLV 5800 includes a Type field 5810, a Length field 5820, a Target Controller IPv4 Address field 5830, and an Optional Sub-TLVs field 5840. The Type field 5810 includes an identifier of the Target Controller Sub-TLV 5800 that indicates an intended meaning of the Target Controller Sub-TLV 5800 and content of the Target Controller Sub-TLV 5800 and may be determined according to a particular implementation of the Target Controller Sub-TLV 5800. Therefore, a particular value of the Type field 5810 of the Target Controller Sub-TLV 5800 is not limited herein. The Length field 5820 indicates a length of the Target Controller Sub-TLV 5800 which is dependent upon a particular content included in the Target Controller Sub-TLV 5800, and therefore a particular value of the Length field 5820 of the Target Controller Sub-TLV 5800 is not limited herein. The Target Controller IPv4 Address field 5830 includes an IPv4 address of a distributed controller which is targeted by a message constructed and sent by another distributed controller in a DSCS, such as the DSCS 200 of FIG. 2. For example, in a DSCS, a first distributed controller may construct and send a first message to a second distributed controller (e.g., a GSReq, as discussed above with respect to FIG. 47). In such a scenario, an address of the second distributed controller is included in the Target Controller IPv4 Address field 5830 of the Target Controller Sub-TLV 5800 to identify the second distributed controller as a target of the first message. After performing actions pursuant to the first message, in some embodiments, the second distributed controller constructs and sends a second message to a third distributed controller. In such a scenario, an address of the third distributed controller is included in the Target Controller IPv4 Address field 5830 of the Target Controller Sub-TLV 5800 to identify the third distributed controller as a target of the second message.

It should be noted that while the Target Controller Sub-TLV 5800 is defined as including a Target Controller IPv4 Address field 5830 that includes an IPv4 address, the Target Controller Sub-TLV 5800 may alternatively include a Target IPv6 Address field that includes an IPv6 address. The Optional Sub-TLVs field 5840, in some embodiments, contains Sub-TLVs that may be optional to operation of a network element that receives the Optional Sub-TLVs but which, when present, provide additional information related to path segment computation and/or tunnel creation in a network in which the network element operates and a content of the Optional Sub-TLVs field 5840 of the Target Controller Sub-TLV 5800 are not limited herein.

Figure 59:
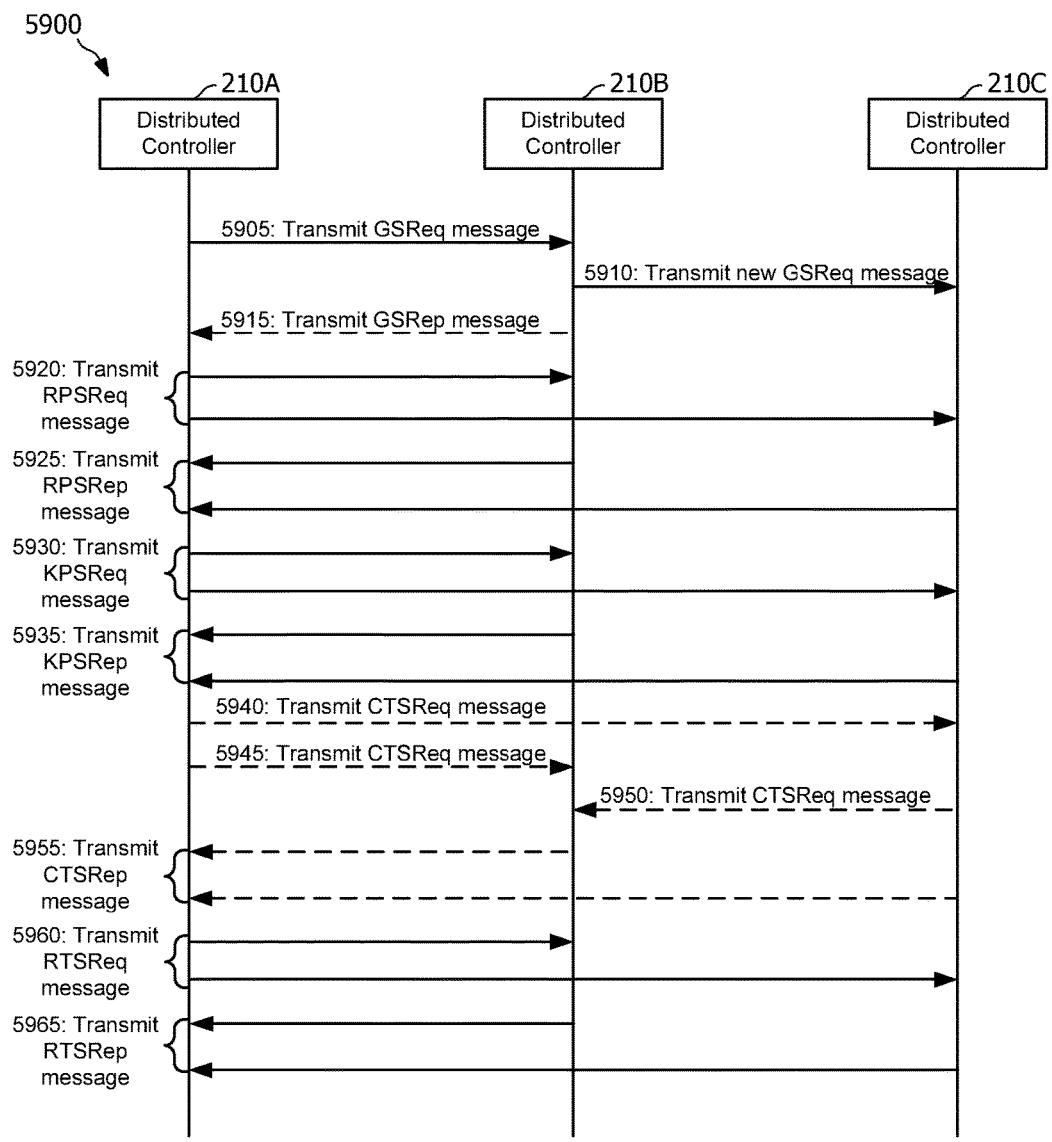
FIG. 59 is an embodiment of a protocol diagram of exchanging control traffic between network elements according to DSCS.

Referring now to FIG. 59, an embodiment of a protocol diagram 5900 of exchanging control traffic between network elements (e.g., between any two of the distributed controllers 210A-210E of FIG. 2) to transport and/or route data traffic from a source to a destination according to a DSCS such as the DSCS 200 of FIG. 2 is shown. As described above, a distributed controller is configured to communicate with one or more other distributed controllers, each of which controlling a domain, to communicate data between and/or among the domains (e.g., from a source to a destination while traversing any one or more of the domains). Each of the distributed controllers controls a corresponding domain that has connections to domains of other distributed controllers. In some embodiments, the distributed controller 210A may have no, or limited, detailed information and knowledge of the domains controlled by other distributed controllers (e.g., by a distributed controller 210B). In such embodiments, when the distributed controller 210A receives a request to route data traffic from a source node to a destination node (e.g., source and destination network elements), the distributed controller 210A transmits one or more requests to the distributed controller 210B to compute, remove, and/or keep path segments through the domain 220B for routing the data traffic from the source to the destination. Additionally, the distributed controller 210A may transmit one or more requests to the distributed controller 210B to create and/or remove tunnel segments corresponding to the path segments through the domains controlled by the distributed controller 210B. In some embodiments, the distributed controller 210B transmits a reply to the distributed controller 210A and/or one or more requests to another distributed controller 210C after receiving a request to perform an action from the distributed controller 210A, or after performing the action. In yet other embodiments, the distributed controller 210A may be referred to as a master controller and may be configured to control one or more other distributed controllers. It should be noted that while a plurality of steps may be illustrated in the protocol diagram 5900, any one or more of the steps may be omitted, performed substantially simultaneously with another step, or performed in an order with respect to the other steps of the protocol diagram 5900, or steps not shown, that varies from an exemplary order shown in FIG. 59, unless otherwise stated. Additionally, while the distributed controllers 210A, 210B, and 210C are referred to for the sake of clarity and ease of discussion with respect to FIG. 59, it should be noted that the distributed controllers 210A, 210B, and 210C are each merely representative of any one of the distributed controllers 210A-210E, or other distributed controllers of the DSCS 200 which are not shown, unless otherwise stated. Furthermore, the communications among the distributed controllers 210A-210B, and 210C with respect to FIG. 59 may be extended to any number of distributed controllers.

When the distributed controller 210A receives a request to create an E2E tunnel (e.g., to transport, route, and/or communicate data) from a source to a destination, the distributed controller 210A allocates a GTID for the E2E tunnel (e.g., so that an E2E tunnel that crosses multiple domains may be globally identified) and a PID for an E2E path to be computed for the E2E tunnel. Subsequently, at step 5905, the distributed controller 210A transmits a GSReq NLRI TLV 4700 (e.g., having a format and content as discussed above with respect to FIG. 47) to the distributed controller 210B for computing a set of path segments in the respective domain 220Band growing a SPT for use in forming the E2E tunnel. The distributed controller 210B, in some embodiments, controls a domain in which a starting or source node of the E2E tunnel is located. The SPT is transmitted by the distributed controller 210A to the distributed controller 210B to begin a process of growing the SPT until a distributed controller 210A-210B determines that the destination node is included in the SPT, and thus the SPT is complete.

When the distributed controller 210B receives the GSReq NLRI TLV 4700, the distributed controller 210B computes path segments from the start node to each edge node of the domain controlled by the distributed controller 210B. The distributed controller 210B then adds the computed path segmentss to the candidate list received in the GSReq NLRI TLV 4700. The distributed controller 210B further selects a node from the candidate list that has a minimum cost associated with reaching the node from the starting node and adds the selected node to the SPT received in the GSReq NLRI TLV 4700. After adding the selected node to the SPT, at step 5910 the distributed controller 210B transmits a new GSReq NLRI TLV 4700 (e.g., having a format and content as discussed above with respect to FIG. 47) to the distributed controller 210C to request the distributed controller 210C to continue growing the SPT. The new GSReq NLRI TLV 4700 includes the node newly added to the SPT by the distributed controller 210B as the starting node for the distributed controller 210C. The distributed controller 210C, and subsequent distributed controllers 210A-210E, repeat the process of the distributed controller 210B until such time as the destination node is included in the SPT.

In some embodiments, at step 5915 the distributed controller 210B transmits a GSRep NLRI TLV 5400 (e.g., having a format and content as discussed above with respect to FIG. 54) to the distributed controller 210A (and subsequent distributed controllers in the DSCS may send a GSRep NLRI TLV 5400 to a respective distributed controller from which they received a GSReq NLRI TLV). The GSRep NLRI TLV 5400 informs the distributed controller from which a GSReq NLRI TLV 4700 was received whether the SPT was successfully grown in response to the GSReq NLRI TLV 4700 and either the resulting SPT when growing the SPT was successful, or an error code and/or explanation when growing the SPT has failed.

After a shortest path satisfying a set of constraints, if any are provided, between a source and a destination is computed, the distributed controller 210A (e.g., as the distributed controller which originated the computation of the shortest path) may delete path segments which were computed by the distributed controller 210B and/or 210C but which are not included in the shortest path. Additionally, when the distributed controllers 210B and/or 210C transmits a GSRep NLRI TLV 5400 to the distributed controller 210A that reports growing the SPT has failed, the distributed controller 210A may delete path segments which were computed according to the GSReq NLRI TLV 5400. To delete the computed path segments which are not includes in the SPT, the distributed controller 210A sends, at step 5920, a RPSReq NLRI TLV 3400 to the distributed controller 210B and/or 210C. The RPSReq NLRI TLV 3400, in some embodiments, has a format and content as discussed above with respect to FIG. 34.

After receiving the RPSReq NLRI TLV 3400, the distributed controller 210B and/or 210C remove one or more computed path segments that were previously stored by the respective distributed controller 210B and/or 210C (e.g., such as after computing the path segments in response to receiving a GSReq NLRI TLV 4700). Subsequently, at step 5925, the distributed controller 210B and/or 210C transmits a RPSRep NLRI TLV 3500 (e.g., having a format and content as discussed above with respect to FIG. 35) to the distributed controller 210A. The RPSRep NLRI TLV 3500, in some embodiments, includes the GTID and the PID, a status of the path segment removal according to the RPSReq NLRI TLV 3400 (e.g., a status of "success" indicating that the path segments requested for removal have been successfully removed or a status of "fail" indicating that the path segments requested for removal cannot be removed), and, when the status is "fail," an error code and reasons for the failure to remove the requested path segments.

After a shortest path satisfying a set of constraints, if any are provided, between a source and a destination is computed, at step 5930 the distributed controller 210A may transmit a KPSReq NLRI TLV 3700 (e.g., having a format and content as discussed above with respect to FIG. 37) to request that the distributed controller 210B and/or 210C keep path segments previously computed and stored (e.g., path segments which were computed and stored by the distributed controller 210B and/or 210C in response to a GSReq NLRI TLV 4700). The KPSReq NLRI TLV 3700, in some embodiments comprises the GTID and the PID, as well as a list of node pairs (e.g., starting node address with a corresponding ending node address for a respective path segment).

After receiving the KPSReq NLRI TLV 3700, the distributed controller 210B and/or 210C keeps one or more path segments that were previously computed and stored by the distributed controller 210B and/or 210C. In some embodiments, the path segments are associated with and/or included in the shortest path computed by one or more distributed controllers (e.g., including, but not limited to, the distributed controllers 210B and/or 210C) according to one or more GSReq NLRI TLV 4700. In some embodiments, the distributed controller 210B and/or 210C removes or deletes one or more path segments that were previously stored by the distributed controller 210B and/or 210C but are not included in the KPSReq NLRI TLV 3700. Subsequently, at step 5935, the distributed controller 210B and/or 210C transmits a KPSRep NLRI TLV 3800 (e.g., having a format and content as discussed above with respect to FIG. 38) to the distributed controller 210A. The KPSRep NLRI TLV 3800, in some embodiments, includes the GTID and the PID, a status of path segment retention according to the KPSReq NLRI TLV 3700 (e.g., a status of "success" indicating that the path segments requested for retention have been successfully kept by the distributed controller 210B and/or 210C or a status of "fail" indicating that the path segments requested for retention cannot be kept by the distributed controller 210B and/or 210C), and, when the status is "fail," an error code and reasons for the failure to keep the requested path segments.

Once a shortest path is known, for example, after being computed by one or more distributed controllers according to one or more GSReq NLRI TLV 4700, the distributed controller 210A transmits one or more CTSReq NLRI TLV 3900 (e.g., having a format and content as discussed above with respect to FIG. 39) to the distributed controller 210B and/or 210C to create tunnel segments (e.g., by assigning labels to the tunnel segments and determining or writing cross connects, etc.) corresponding to the computed path segments. In some embodiments, the tunnels cross multiple domains. The distributed controller 210A transmits the CTSReq NLRI TLVs 3900, in some embodiments, in a reverse order of the shortest path such that a distributed controller 210B and/or 210C that controls a respective domain 220B and/or 220C in which the destination node is located receives a first CTSReq NLRI TLV 3900 transmitted by the distributed controller 210A (step 5940) and a distributed controller 210B and/or 210C that controls a respective domain 220B and/or 220C in which the source node is located receives a last CTSReq NLRI TLV 3900 transmitted by the distributed controller 210A (step 5945). In some embodiments, the distributed controller 210A controls tunnel creation by sending a CTSReq NLRI TLV 3900 to each distributed controller 210B and/or 210C as shown in FIG. 59. In other embodiments, the distributed controller 210A sends (step 5940) a CTSReq NLRI TLV 3900 only to the distributed controller 210B and/or 210C which controls a respective domain 220B and/or 220C which contains the destination of the shortest path. The distributed controller 210B and/or 210C which controls a respective domain 220B and/or 220C which contains the destination of the shortest path subsequently sends (step 5950) CTSReq NLRI TLV 3900 to other distributed controllers 210B and/or 210C along the shortest path. In yet other embodiments, the distributed controller 210A does not send an explicit CTSReq NLRI TLV 3900, but rather indicates in another message transmitted according to the various embodiments of the present disclosure that the distributed controller 210B and/or 210C which controls a respective domain 220B and/or 220C which contains the destination of the shortest path should initiate tunnel creation once the shortest path is known by sending (step 5950) CTSReq NLRI TLV 3900 to other distributed controllers 210B and/or 210C along the shortest path.

As discussed above, in some embodiments, a CTSReq NLRI TLV 3900 suitable for transmission from the distributed controller 210A to the distributed controller 210B and/or 210C includes the GTID and PID allocated by the distributed controller 210A, a path segment from a start-node to an end-node and/or path segment details and an Explicit Route Object (ERO), and a label and an interface if the respective domain 220B and/or 220C controlled by the distributed controller 210B and/or 210C receiving the CTSReq NLRI TLV 3900 does not contain the destination node.

After receiving the CTSReq NLRI TLV 3900, the distributed controller 210B and/or 210C allocates and reserves link bandwidth along the path segment identified by the start-node and the end-node, and details for which the distributed controller 210B and/or 210C has previously stored along with an association to the GTID and the PID, assigns labels along the path segment, and writes cross connects on each of the nodes along the path segment. For a distributed controller 210B and/or 210C controlling a respective domain 220B and/or 220C that does not include the destination node, the distributed controller 210B and/or 210C writes the cross connect on an edge or boundary node to a downstream domain using a label and interface of the downstream domain that was received by the distributed controller 210B and/or 210C in the CTSReq NLRI TLV 3900 from the distributed controller 210A. For a distributed controller 210B and/or 210C controlling a domain which does not include the source node, the distributed controller 210B and/or 210C includes a label and an interface in a reply message to the distributed controller 210A. The interface connects an edge node of an upstream domain along the E2E path and the label is allocated for the interface on a node that is a next hop of the edge node.

After creating the tunnel segments according to the CTSReq NLRI TLV 3900, at step 5955, the distributed controller 210B and/or 210C may transmit a CTSRep NLRI TLV 4300 (e.g., having a format and content as discussed above with respect to FIG. 43) to the distributed controller 210A. The CTSRep NLRI TLV 4300, in some embodiments, includes the GTID and the PID, a status of tunnel segment creation according to the CTSReq NLRI TLV 3900 (e.g., a status of "success" indicating that the requested tunnel segments have been successfully created by the distributed controller 210B and/or 210C or a status of "fail" indicating that the requested tunnel segments cannot be created by the distributed controller 210B and/or 210C), when the status is "fail," an error code and reasons for the failure to create the requested tunnel segments, and when the domain controlled by the distributed controller 210B and/or 210C transmitting the CTSRep NLRI TLV 4300 is not a source domain and the status is "success," a label and an interface, as discussed above.

After creating tunnel segments, in some embodiments the distributed controller 210A receives a request to delete at least one of the tunnel segments. The request is received from, for example, a user or an application. When the distributed controller 210A is requested to remove a tunnel segment, or the distributed controller 210A receives a CTSRep NLRI TLV 4300 from a distributed controller 210B and/or 210C that includes a status of "fail," at step 5960 the distributed controller 210A transmits a RTSReq NLRI TLV 4400 (e.g., having a format and content as discussed above with respect to FIG. 44) to the distributed controller 210B and/or 210C to delete the tunnel segment. As discussed above, in some embodiments, a RTSReq NLRI TLV 4400 suitable for transmission from the distributed controller 210A to the distributed controller 210B and/or 210C includes the GTID and PID allocated by the distributed controller 210A.

After receiving the RTSReq NLRI TLV 4400, the distributed controller 210B and/or 210C releases labels assigned along the path segments within the respective domain 220B and/or 220C controlled by the distributed controller 210B and/or 210C and associated with the GTID and PID and removes the cross connects on each node along the path segments. When the distributed controller 210B and/or 210C also reserved the link bandwidth associated with the GTID and PID, the distributed controller 210B and/or 210C releases the reserved link bandwidth. After removing the tunnel segment as requested by the distributed controller 210A in the RTSReq NLRI TLV 4400, at step 5965 the distributed controller 210B and/or 210C transmits a RTSRep NLRI TLV 4500 (e.g., having a format and content as discussed above with respect to FIG. 45) to the distributed controller 210A. The RTSRep NLRI TLV 4500, in some embodiments, includes the GTID and PID, a status of tunnel removal according to the RTSReq NLRI TLV 4400 (e.g., a status of "success" indicating that the requested tunnel segments have been successfully removed by the distributed controller 210B and/or 210C or a status of "fail" indicating that the requested tunnel segments cannot be removed by the distributed controller 210B and/or 210C), and when the status is "fail," an error code and reasons for the failure to remove the requested tunnel segments.

Figure 60:
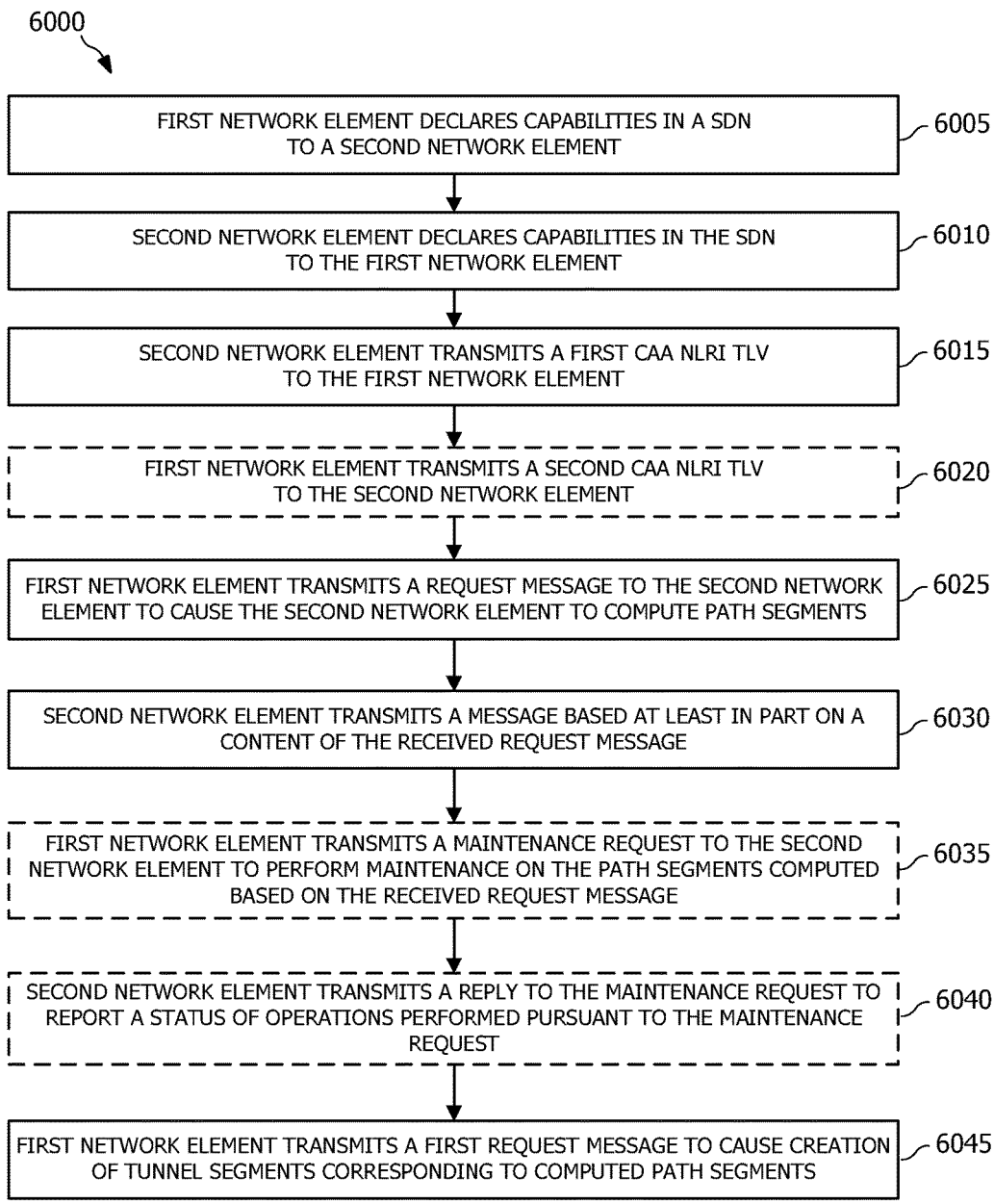
FIG. 60 is a flowchart of an embodiment of a method for communicating among network elements in a SDN operating according to border gateway protocol (BGP).

Referring now to FIG. 60, a flowchart of an embodiment of a method 6000 for communicating among network elements in a SDN operating according to BGP is shown. The method 6000 is implemented, in some embodiments, by a first network element (e.g., any one of the parent controller 106 or one of the child controllers 108 of the HSCS 100 of FIG. 1 or by any one of the distributed controllers 210A-210E of the DSCS 200 of FIG. 2) when the network element is operating in a SDN according to BGP and wishes to perform communication with another network element (e.g., any other one of the parent controller 106 or one of the child controllers 108 of the HSCS 100 of FIG. 1 or by any other one of the distributed controllers 210A-210E of the DSCS 200 of FIG. 2) also operating in the SDN and according to BGP. It should be noted that while a plurality of steps may be illustrated in the method 6000, any one or more of the steps may be omitted, performed substantially simultaneously with another step, or performed in an order with respect to the other steps of the method 6000, or steps not shown, that varies from an exemplary order illustrated in FIG. 60, unless otherwise stated. For example, any portion of the steps of the method 6000 may be performed by the first network element only, by a second network element only, by both the first network element and the second network element, and/or by any combination of the first network element, the second network element, a third network element, and/or other network elements not shown.

At step 6005, a first network element declares its capabilities in a SDN to a second network element. The first network element declares its capabilities, for example, during or after establishment of a BGP session between the first network element and the second network element, both of which are BGP speakers in the BGP session. The first network element declares its capabilities, in some embodiments, by transmitting a first CSC capability triplet 300 in a first Open Message, for example, as discussed above with respect to FIG. 3, to the second network element. At step 6010, the second network element transmits a second CSC capability triplet 300 in a second Open Message to the first network element. In some embodiments, transmission of the second CSC capability triplet 300 is responsive to receiving the first CSC capability triplet. The second network element transmits the second CSC capability triplet 300 to declare its capabilities to the first network element. In some embodiments, transmission of the first CSC capability triplet 300 and the second CSC capability triplet 300 is performed in a manner substantially similar to that as discussed above with respect to FIGS. 4 and 5.

At step 6015, the second network element transmits a first CAA NLRI TLV 700 to the first network element. The second network element transmits the first CAA NLRI TLV 700 to, for example, inform the first network element of details related to connections and accesses of a domain controlled by the second network element. The second network element transmits the first CAA NLRI TLV 700 in a SDN NLRI TLV 600, for example as discussed above with respect to FIG. 7. Optionally, at step 6020, the first network element transmits a second CAA NLRI TLV 700 to the second network element. The first network element transmits the second CAA NLRI TLV 700 to, for example, inform the second network element of details related to connections and accesses of a domain controlled by the first network controller. The first network element transmits the second CAA NLRI TLV 700 in a SDN NLRI TLV 600, for example as discussed above with respect to FIG. 7. In some embodiments, transmission of the second CAA NLRI TLV 700 is responsive to receiving the first CAA NLRI TLV 700.

At step 6025, the first network element transmits a request message to the second network element to cause the second network element to compute path segments through the domain controlled by the second network element. The request message, in some embodiments is a CPSReq, such as the CPSReq NLRI TLV 2200, as discussed above with respect to FIG. 22, and is transmitted in an HSCS such as the HSCS 100 discussed above with respect to FIG. 1. In other embodiments, the request message is a GSReq, such as the GSReq NLRI TLV 4700, as discussed above with respect to FIG. 47, and is transmitted in a DSCS such as the DSCS 200 discussed above with respect to FIG. 2.

At step 6030, the second network element transmits a message based at least in part on a content of the request message received at step 6025. For example, when the request message received at step 6025 is a CPSReq, at step 6030 the second network element, after computing path segments pursuant to the CPSReq, transmits a CPSRep, such as the CPSRep NLRI TLV 3200, as discussed above with respect to FIG. 32, to the first network element. When the request message received at step 6025 is a GSReq, at step 6030 the second network element, after computing path segments and growing a SPT pursuant to the GSReq, in some embodiments transmits a second GSReq to a third network element to request the third network element to further grow the SPT. Optionally, after transmitting the second GSReq to the third network element, the second network element may transmit a GSRep, such as the GSRep NLRI TLV 5400, as discussed above with respect to FIG. 54, to the first network element to inform the first network element of the SPT after the second network element performs an operation pursuant to the GSReq. In some embodiments, the second network element may transmit the GSRep to the first network element without transmitting a second GSReq to a third network element, for example, when the second network element is unable to grow the SPT in response to the GSReq received at step 6025 or when a destination node specified in the GSReq received at step 6025 is located within the domain controlled by the second network element.

Optionally, at step 6035, the first network element transmits a maintenance request message to the second network element to perform maintenance on the path segments previously computed by the second network element. For example, the request message may be a RPSReq, such as the RPSReq NLRI TLV 3400, as discussed above with respect to FIG. 34, or a KPSReq, such as the KPSReq NLRI TLV 3700, as discussed above with respect to FIG. 37. After receiving and performing operations pursuant to the request message, at step 6040 the second network element transmits a reply message to the first network element to report a status of the operations performed pursuant to the request message. For example, the reply message may be a RPSRep, such as the RPSRep NLRI TLV 3500, as discussed above with respect to FIG. 35, or a KSPRep, such as the KPSRep NLRI TLV 3800, as discussed above with respect to FIG. 38.

At step 6045, the first network element transmits a first request message to cause creation of tunnel segments corresponding to the path segments computed in response to the request message transmitted at step 6025. The first request message, in some embodiments is a CTSReq, such as the CTSReq NLRI TLV 3900, as discussed above with respect to FIG. 39.

In an embodiment, the first network element sends the first request message to the third network element to cause the third network element (e.g., when the third network element controls a domain that includes a destination of an E2E tunnel being constructed according to one or more steps of the method 6000) to create tunnel segments through the domain controlled by the third network element and which correspond to path segments previously computed by the third network element. After creating the tunnel segments (or attempting to create the tunnel segments but failing) the third network element, may reply to the first network element (e.g., via a CTSRep such as the CTSRep NLRI TLV 4300, as discussed above with respect to FIG. 43) indicating a status of the tunnel segment creation by the third network element. When the tunnel segment creation by the third network element succeeds, the first network element then sends a second request message to the second network element to cause the second network element to create tunnel segments through the domain controlled by the second network element. After creating the tunnel segments (or attempting to create the tunnel segments but failing) the second network element, may reply to the first network element (e.g., via a CTSRep such as the CTSRep NLRI TLV 4300, as discussed above with respect to FIG. 43) indicating a status of the tunnel segment creation by the second network element. The first network element may continue sending request messages for tunnel segment creation to, and receiving reply messages from, each network element that controls a domain that has path segments which are on a shortest path from a source to a destination and along which an E2E tunnel is being created until the E2E tunnel has been created, or until the E2E tunnel cannot be created because tunnel segment creation by a network element fails.

In another embodiment, the first network element sends the first request message to third network element to cause the third network element (e.g., when the third network element controls a domain that includes a destination of an E2E tunnel being constructed according to one or more steps of the method 6000) to create tunnel segments through the domain controlled by the third network element and which correspond to path segments previously computed by the third network element. In response to the first request message, the third network element creates the tunnel segments through the domain controlled by the third network element. When creation of the tunnel segments by the third network element fails, the third network element removes any partially created tunnel segments and transmits a reply to the first network element (e.g., via a CTSRep such as the CTSRep NLRI TLV 4300, as discussed above with respect to FIG. 43) indicating a failure of the tunnel segment creation by the third network element. When creation of the tunnel segments by the third network element succeeds, the third network element sends a second request message to the second network element. The second request message is, for example, a CTSReq such as the CTSReq NLRI TLV 3900, as discussed above with respect to FIG. 39. The second request message requests the second network element to create tunnel segments through the domain controlled by the second network element and which correspond to path segments previously computed by the second network element. When the tunnel segment creation by the second network element fails, the second network element transmits a reply to the third network element (e.g., via a CTSRep such as the CTSRep NLRI TLV 4300, as discussed above with respect to FIG. 43) indicating a failure of the tunnel segment creation by the second network element. When the tunnel segment creation by the second network element succeeds and the second network element contains the source of the E2E tunnel, the second network element transmits a reply to the first network element (e.g., via a CTSRep such as the CTSRep NLRI TLV 4300, as discussed above with respect to FIG. 43) indicating a success of the tunnel segment creation, thereby indicating completion of the E2E tunnel. When the tunnel segment creation by the second network element succeeds, and when the second element does not contain the source of the E2E tunnel, the second network element then sends a third request message to a next upstream network element to cause the upstream network element to create tunnel segments through the domain controlled by the upstream network element. The upstream network element may operate in a manner substantially similar to the second network element with respect to the third network element until such time as a network element controlling a domain that contains the source of the E2E tunnel creates tunnel segments, thereby completing the E2E tunnel.

In another embodiment, when the request message transmitted by the first network element (e.g., a master controller) at step 6025 is a GSReq, the GSReq also causes a network element which controls a domain that contains a destination of the E2E tunnel (e.g., a destination controller) to initiate creation of tunnel segments corresponding to the path segments computed in response to the request message transmitted at step 6025. For example, when a CRP NLRI TLV included in the GSReq indicates to compute path segments and create tunnel segments in one round, as discussed above, the destination controller may begin creating tunnel segments corresponding to computed path segments automatically once a shortest path between a source and the destination of the E2E tunnel has been determined without receiving an additional request message from the first network controller. When the destination controller determines that the destination for the E2E tunnel is in the domain controlled by the destination controller, and the destination controller computes path segments through the domain controlled by the destination controller to complete a shortest path from the source to the destination for the E2E tunnel, in some embodiments the destination controller sends a reply message to the first network controller to indicate that the shortest path has been successfully computed (e.g., via a GSRep such as the GSRep NLRI TLV 5400, as discussed above with respect to FIG. 54). After sending the reply message to the first network element, the destination controller creates the tunnel segments through the domain controlled by the destination controller. When creation of the tunnel segments by the destination controller fails, the destination controller removes any partially created tunnel segments and transmits a reply to the first network element (e.g., via a CTSRep such as the CTSRep NLRI TLV 4300, as discussed above with respect to FIG. 43) indicating a failure of the tunnel segment creation by the destination controller. When creation of the tunnel segments by the destination controller succeeds, the destination controller sends a second request message to a second network element that controls an upstream domain of the destination domain along the shortest path. The second request message is, for example, a CTSReq such as the CTSReq NLRI TLV 3900, as discussed above with respect to FIG. 39. The second request message requests the second network element to create tunnel segments through the domain controlled by the second network element and which correspond to path segments previously computed by the second network element. When the tunnel segment creation by the second network element fails, the second network element transmits a reply to the destination controller (e.g., via a CTSRep such as the CTSRep NLRI TLV 4300, as discussed above with respect to FIG. 43) indicating a failure of the tunnel segment creation by the second network element. When the tunnel segment creation by the second network element succeeds and the second network element contains the source of the E2E tunnel, the second network element transmits a reply to the first network element (e.g., via a CTSRep such as the CTSRep NLRI TLV 4300, as discussed above with respect to FIG. 43) indicating a success of the tunnel segment creation, thereby indicating completion of the E2E tunnel. When the tunnel segment creation by the second network element succeeds, and when the second element does not contain the source of the E2E tunnel, the second network element then sends a third request message to a next upstream network element to cause the upstream network element to create tunnel segments through the domain controlled by the upstream network element. The upstream network element may operate in a manner substantially similar to the second network element with respect to the destination controller until such time as a network element controlling a domain that contains the source of the E2E tunnel creates tunnel segments, thereby completing the E2E tunnel.

Figure 61:
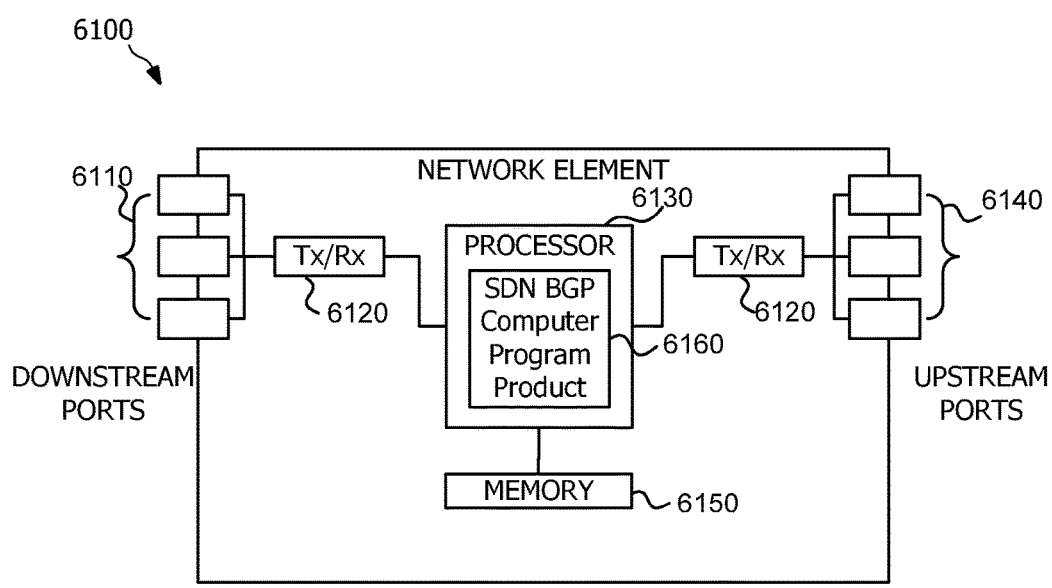
FIG. 61 is a schematic diagram of a network element according to various embodiments.

Referring now to FIG. 61, a schematic diagram of a network element 6100 according to various embodiments of the present disclosure is shown. Network element 6100 may be any suitable processing device capable of operation in an SDN, communication according to BGP, and performing the functions disclosed herein such as a network element, node, and/or controller capable of operation within an architecture such as the HSCS 100 of FIG. 1 and/or the DSCS 200 of FIG. 2. For example, the network element 6100 is suitable for implementation as a parent controller 106, any one or more child controllers 108, a second level parent controller 110, any one or more second level child controllers 112, an internal node 114, and/or a boundary node 116, each as discussed above with respect to FIG. 1, and/or any one or more distributed controllers 210A-210E, boundary nodes 230, and/or internal nodes 240 as discussed above with respect to FIG. 2. Network element 6100 is configured to implement at least some of the features/methods disclosed herein, communicate according to at least some of the protocol diagrams disclosed herein, and/or transmit or receive any one or more of the messages, NLRI TLVs, TLVs, Sub-TLVs, and/or objects disclosed herein. In various embodiments, for instance, the features/methods of this disclosure are implemented using hardware, firmware, and/or software installed to run on hardware.

Network element 6100 is a device (e.g., an access point, an access point station, a router, a switch, a gateway, a bridge, a server, a client, a user-equipment, a mobile communications device, etc.) that transports data through a network, system, and/or domain, and/or provides services to other devices in a network or performs computational functions. In one embodiment, the network element 6100 is an apparatus and/or system configured to implement the HSCS disclosed herein.

The network element 6100 comprises one or more downstream ports 6110 coupled to a transceiver (Tx/Rx) 6120, which are transmitters, receivers, or combinations thereof. The Tx/Rx 6120 transmits and/or receives frames from other network elements via the downstream ports 6110. Similarly, the network element 6100 comprises another Tx/Rx 6120 coupled to a plurality of upstream ports 6140, wherein the Tx/Rx 6120 transmits and/or receives frames from other nodes via the upstream ports 6140. The downstream ports 6110 and/or the upstream ports 6140 may include electrical and/or optical transmitting and/or receiving components. In another embodiment, the network element 6100 comprises one or more antennas (not shown) coupled to the Tx/Rx 6120. The Tx/Rx 6120 transmits and/or receives data (e.g., packets) from other computing or storage devices wirelessly via the one or more antennas.

A processor 6130 is coupled to the Tx/Rx 6120 and is configured to perform communication between the network element 6100 and another network element communicating according to BGP in a SDN. In an embodiment, the processor 6130 comprises one or more multi-core processors and/or memory modules 6150, which functions as data stores, buffers, etc. The processor 6130 is implemented as a general processor or as part of one or more application specific integrated circuits (ASICs), field-programmable gate arrays (FPGAs), and/or digital signal processors (DSPs). Although illustrated as a single processor, the processor 6130 is not so limited and alternatively comprises multiple processors. The processor 6130 further comprises processing logic configured to execute a SDN BGP computer program product 6160 that is configured to facilitate BGP communication among SDN network elements or controllers to compute a shortest path across multiple domains from a source to a destination and/or to create an E2E tunnel.

FIG. 61 also illustrates that a memory module 6150 is coupled to the processor 6130 and is a non-transitory medium configured to store various types of data. Memory module 6150 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 6150 may be used to house the instructions for carrying out the various embodiments described herein. For example, the memory module 6150 may comprise the SDN BGP computer program product 6160, which is executed by processor 6130.

It is understood that by programming and/or loading executable instructions onto the network element 6100, at least one of the processor 6130 and/or the memory module 6150 are changed, transforming the network element 6100 in part into a particular machine or apparatus, for example, a SDN element having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Disclosed herein is a network element configured with a means for communication among SDN controllers communicating according to a BGP. The network element includes means for computing path segments through one or more domains each controller by SDN controllers through various extensions to BGP communications protocols. The network element further include means for performing path computation, path segment maintenance, tunnel segment creation, tunnel segment maintenance, capability advertisement, and various other communication in a SDN and creation of an E2E path and/or tunnel through the SDN. The network element further include means for creation of the E2E tunnel by requesting each SDN controller controlling a domain that includes a portion of the E2E path to create tunnel segments through its respective domain. The network element further include means for requesting a SDN controller that controls a domain that includes a destination of the E2E path to initiate creation of the E2E tunnel. The network element further include means for instructing an SDN controller that controls a domain that includes a destination of the E2E path initiates creation of the E2E tunnel automatically once the E2E path is computed without receiving an additional request message from the first network element.

Additional embodiments are cited in the following clauses.

Clause 1. A first network element comprising:

a memory comprising instructions executable by a processor; and a processor coupled to the memory and configured to execute the instructions, wherein executing the instructions causes the processor to:

receive, from a second network element during a BGP communication session, a communications capabilities message indicating capabilities of the second network element;

receive, from the second network element, an advertisement message indicating connections and accesses of a second domain controlled by the second network element;

receive a request to route data between a source located in a first domain and a destination;

transmit a first request message to the second network element to cause the second network element to compute a path segment through the second domain; and transmit a second request message to create a tunnel segment of an E2E tunnel between the source and the destination crossing the first domain and the second domain.

Clause 2. The first network element of clause 1, wherein the first request message is a CPSReq, wherein the first network element is a parent controller of the second network element, and wherein the processor further receives, from the second network element, a CPSRep containing information relating to the path segment requested for computation according to the CPSReq.

Clause 3. The first network element of any of clauses 1-2, wherein the first request message is a first GSReq, and wherein the processor further receives, from the second network element, a GSRep containing information relating to the path segment and growing a SPT requested for computation according to the GSReq.

Clause 4. The first network element of any of clauses 1-3, wherein transmitting the first request message to the second network element causes the second network element to transmit a second GSReq to a third network element controlling a third domain after computing the path segment and growing the SPT according to the first GSReq when the destination is not located in the second domain.

Clause 5. The first network element of any of clauses 1-4, wherein the destination is located in the third domain, wherein the first network element transmits the second request message to the third network element to cause the third network element to create a first tunnel segment of the E2E tunnel crossing the third domain, and wherein the first network element transmits a third request message to the second network element to cause the second network to create a second tunnel segment of the E2E tunnel crossing the second domain.

Clause 6. The first network element of any of clauses 1-5, wherein the destination is located in the third domain, and wherein the first network element transmits the second request message to the third network element to cause the third network element to:

create a first tunnel segment of the E2E tunnel crossing the third domain; and transmit a third request message to the second network element to cause the second network to create a second tunnel segment of the E2E tunnel crossing the second domain.

Clause 7. The first network element of any of clauses 1-6, wherein the destination is located in the third domain, wherein transmitting the second request message includes a flag in the first request message that instructs the third network controller to:

create a first tunnel segment of the E2E tunnel crossing the third domain after a shortest path between the source and the destination is determined; and transmit a third request message to the second network element to cause the second network to create a second tunnel segment of the E2E tunnel crossing the second domain after the third network element creates the first tunnel segment.

Clause 8. The first network element of any of clauses 1-7, wherein receiving the communications capabilities message comprises receiving an Open Message comprising a CSC capability triplet, and wherein the CSC capability triplet comprises a plurality of capability flags configured to convey capabilities of the second network element.

Clause 9. The first network element of any of clauses 1-8, wherein the capability flags comprise:

a Path Segments flag configured to indicate support for computing path segments in a SDN communicating according to BGP;

a Tunnel Segment flag configured to indicate support for creating tunnel segments in the SDN communicating according to BGP;

an E2E Tunnel flag configured to indicate support for creating and maintaining an E2E LSP tunnel in the SDN communicating according to BGP;

a Parent Controller flag configured to indicate functionality as a parent controller in the SDN communicating according to BGP;

a Child Controller flag configured to indicate functionality as a child controller in the SDN communicating according to BGP;

a Distributed Controller flag configured to indicate functionality as a distributed controller in the SDN communicating according to BGP; and a plurality of Level flags configured to collectively indicate a hierarchical level of the second network element when the SDN is a hierarchical SDN control system.

Clause 10. The first network element of any of clauses 1-9, wherein the first request message and the second request message each comprise a CRP TLV.

Clause 11. The first network element of any of clauses 1-10, wherein the CRP TLV specifies an optimization scheme for segments created according to the first request message and the second request message and a responsibility of distributed controllers in a SDN when the SDN is a distributed SDN control system.

Clause 12. A first network element configured to control a first domain, the first network element comprising:

a memory comprising instructions executable by a processor; and a processor coupled to the memory and configured to execute the instructions, wherein executing the instructions causes the processor to:

transmit, to a second network element during a BGP communication session, a communication capabilities message indicating capabilities of the first network element;

transmit an advertisement message to the second network element, wherein the advertisement message indicates connections and accesses of the first domain;

receive a first request message that instructs the first network element to compute path segments for use in creating an E2E tunnel, wherein each path segment connects one edge node of the first domain to another edge node of the first domain;

compute the path segments according to the first request message;

receive a second request message that instructs the first network element to create a first tunnel segment through the first domain for use in the E2E tunnel, wherein the second request message indicates at least a start node and an end node for the tunnel segment; and create the first tunnel segment according to the second request message.

Clause 13. The first network element of clause 12, wherein a destination of the E2E tunnel is located in a second domain controlled by a third network element, wherein the first network element receives the first request message from the second network element, and wherein the first network element receives the second request message from the third network element.

Clause 14. The first network element of any of clauses 12-13, wherein a destination of the E2E tunnel is located in the first domain, wherein a shortest path from a source of the E2E tunnel to the destination of the E2E tunnel crosses a third domain controlled by a third network element, and wherein the processor further transmits, to the third network element, a third request message to cause the third network to create a second tunnel segment of the E2E tunnel crossing the third domain after the first network element creates the first tunnel segment.

Clause 15. The first network element of clauses 12-14, wherein transmitting the communication capabilities message comprises transmitting an Open Message comprising a CSC capability triplet, and wherein the CSC capability triplet comprises a plurality of capability flags configured to convey capabilities of the first network element.

Clause 16. A network element implemented method of communication among SDN controllers communicating according to a BGP, comprising:

declaring capabilities of the network element in a SDN according to a CSC capability triplet included in an Open Message;

computing a path segment in the SDN for use in creating an E2E tunnel; and creating a first tunnel segment corresponding to the path segment in the SDN, wherein the first tunnel segment forms a portion of the E2E tunnel.

Clause 17. The method of clause 16, further comprising:

receiving a GSReq;

computing the path segment in the SDN for use in creating the E2E tunnel in response to the GSReq;

growing a SPT based on the computed path segment and in response to the GSReq;

receiving a first request to create a first tunnel segment; and creating the first tunnel segment corresponding to the path segment in the SDN in response to the request to create the first tunnel segment.

Clause 18. The method of clauses 16-17, further comprising transmitting a second request to create a second tunnel segment to a controller of an upstream domain along a path of the E2E tunnel.

Clause 19. The method of clauses 16-18, further comprising:

creating the first tunnel segment corresponding to the path segment in the SDN automatically after a shortest path from a source of the E2E tunnel to a destination of the E2E tunnel is computed; and transmitting a request to create a second tunnel segment to a controller of an upstream domain along a path of the E2E tunnel.

Clause 20. The method of clauses 16-19, further comprising receiving an advertisement message indicating connections and accesses of a domain in the SDN.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A first network element comprising:

a memory comprising instructions executable by a processor; and a processor coupled to the memory and configured to execute the instructions, wherein executing the instructions causes the processor to:

receive, from a second network element during a border gateway protocol (BGP) communication session, a communications capabilities message indicating capabilities of the second network element;

receive, from the second network element, an advertisement message indicating connections and accesses of a second domain controlled by the second network element;

receive a request to route data between a source located in a first domain and a destination;

transmit a first request message to the second network element to cause the second network element to compute a path segment through the second domain, wherein the first request message is a Request for Computing Path Segment (CPSReq);

receive, from the second network element, a Reply for Computing Path Segment (CPSRep) containing information relating to the path segment requested for computation according to the CPSReq; and transmit a second request message to create a tunnel segment of an end-to-end (E2E) tunnel between the source and the destination crossing the first domain and the second domain, wherein the first network element is a parent controller of the second network element.

2. The first network element of claim 1, wherein receiving the communications capabilities message comprises receiving an Open Message comprising a communications among software defined network (SDN) controllers (CSC) capability triplet, and wherein the CSC capability triplet comprises a plurality of capability flags configured to convey capabilities of the second network element.

3. The first network element of claim 2, wherein the capability flags comprise:

a Path Segments flag configured to indicate support for computing path segments in a software defined network (SDN) communicating according to BGP;

a Tunnel Segment flag configured to indicate support for creating tunnel segments in the SDN communicating according to BGP;

an E2E Tunnel flag configured to indicate support for creating and maintaining an E2E label switched path (LSP) tunnel in the SDN communicating according to BGP;

a Parent Controller flag configured to indicate functionality as a parent controller in the SDN communicating according to BGP;

a Child Controller flag configured to indicate functionality as a child controller in the SDN communicating according to BGP;

a Distributed Controller flag configured to indicate functionality as a distributed controller in the SDN communicating according to BGP; and a plurality of Level flags configured to collectively indicate a hierarchical level of the second network element when the SDN is a hierarchical SDN control system.

4. A first network element comprising:

a memory comprising instructions executable by a processor; and a processor coupled to the memory and configured to execute the instructions, wherein executing the instructions causes the processor to:

receive, from a second network element during a border gateway protocol (BGP) communication session, a communications capabilities message indicating capabilities of the second network element;

receive, from the second network element, an advertisement message indicating connections and accesses of a second domain controlled by the second network element;

receive a request to route data between a source located in a first domain and a destination;

transmit a first request message to the second network element to cause the second network element to compute a path segment through the second domain, wherein the first request message is a first Request for Growing Shortest Path Tree (SPT) (GSReq);

receive, from the second network element, a Reply for Growing SPT (GSRep) containing information relating to the path segment and growing a SPT requested for computation according to the GSReq; and transmit a second request message to create a tunnel segment of an end-to-end (E2E) tunnel between the source and the destination crossing the first domain and the second domain.

5. The first network element of claim 4, wherein transmitting the first request message to the second network element causes the second network element to transmit a second GSReq to a third network element controlling a third domain after computing the path segment and growing the SPT according to the first GSReq when the destination is not located in the second domain.

6. The first network element of claim 5, wherein the destination is located in the third domain, wherein the first network element transmits the second request message to the third network element to cause the third network element to create a first tunnel segment of the E2E tunnel crossing the third domain, and wherein the first network element transmits a third request message to the second network element to cause the second network to create a second tunnel segment of the E2E tunnel crossing the second domain.

7. The first network element of claim 5, wherein the destination is located in the third domain, and wherein the first network element transmits the second request message to the third network element to cause the third network element to:

create a first tunnel segment of the E2E tunnel crossing the third domain; and transmit a third request message to the second network element to cause the second network to create a second tunnel segment of the E2E tunnel crossing the second domain.

8. The first network element of claim 5, wherein the destination is located in the third domain, wherein transmitting the second request message includes a flag in the first request message that instructs the third network element to:

create a first tunnel segment of the E2E tunnel crossing the third domain after a shortest path between the source and the destination is determined; and transmit a third request message to the second network element to cause the second network element to create a second tunnel segment of the E2E tunnel crossing the second domain after the third network element creates the first tunnel segment.

9. A first network element comprising:

a memory comprising instructions executable by a processor; and a processor coupled to the memory and configured to execute the instructions, wherein executing the instructions causes the processor to:

receive, from a second network element during a border gateway protocol (BGP) communication session, a communications capabilities message indicating capabilities of the second network element;

receive, from the second network element, an advertisement message indicating connections and accesses of a second domain controlled by the second network element;

receive a request to route data between a source located in a first domain and a destination;

transmit a first request message to the second network element to cause the second network element to compute a path segment through the second domain; and transmit a second request message to create a tunnel segment of an end-to-end (E2E) tunnel between the source and the destination crossing the first domain and the second domain, wherein the first request message and the second request message each comprise a Controller Request Parameters (CRP) type-length-value (TLV).

10. The first network element of claim 9, wherein the CRP TLV specifies an optimization scheme for segments created according to the first request message and the second request message and a responsibility of distributed controllers in a software defined network (SDN) when the SDN is a distributed SDN control system.

11. A first network element configured to control a first domain, the first network element comprising:

a memory comprising instructions executable by a processor; and a processor coupled to the memory and configured to execute the instructions, wherein executing the instructions causes the processor to:

transmit, to a second network element during a border gateway protocol (BGP) communication session, a communication capabilities message indicating capabilities of the first network element;

transmit an advertisement message to the second network element, wherein the advertisement message indicates connections and accesses of the first domain;

receive, from the second network element, a first request message that instructs the first network element to compute path segments for use in creating an end-to-end (E2E) tunnel, wherein each path segment connects one edge node of the first domain to another edge node of the first domain, and wherein a destination of the E2E tunnel is located in a second domain controlled by a third network element;

compute the path segments according to the first request message;

receive, from the third network element, a second request message that instructs the first network element to create a first tunnel segment through the first domain for use in the E2E tunnel, wherein the second request message indicates at least a start node and an end node for the tunnel segment; and create the first tunnel segment according to the second request message.

12. The first network element of claim 11, wherein transmitting the communication capabilities message comprises transmitting an Open Message comprising a communications among software defined network (SDN) controllers (CSC) capability triplet, and wherein the CSC capability triplet comprises a plurality of capability flags configured to convey capabilities of the first network element.

13. A first network element configured to control a first domain, the first network element comprising:

a memory comprising instructions executable by a processor; and a processor coupled to the memory and configured to execute the instructions, wherein executing the instructions causes the processor to:

transmit, to a second network element during a border gateway protocol (BGP) communication session, a communication capabilities message indicating capabilities of the first network element;

transmit an advertisement message to the second network element, wherein the advertisement message indicates connections and accesses of the first domain;

receive a first request message that instructs the first network element to compute path segments for use in creating an end-to-end (E2E) tunnel, wherein each path segment connects one edge node of the first domain to another edge node of the first domain, a destination of the E2E tunnel is located in the first domain, and a shortest path from a source of the E2E tunnel to the destination of the E2E tunnel crosses a third domain controlled by a third network element;

compute the path segments according to the first request message;

receive a second request message that instructs the first network element to create a first tunnel segment through the first domain for use in the E2E tunnel, wherein the second request message indicates at least a start node and an end node for the tunnel segment;

create the first tunnel segment according to the second request message; and transmit, to the third network element, a third request message to cause the third network to create a second tunnel segment of the E2E tunnel crossing the third domain after the first network element has created the first tunnel segment.

14. A network element implemented method of communication among software defined network (SDN) controllers communicating according to a border gateway protocol (BGP), comprising:

declaring capabilities of the network element in a SDN according to a communications among SDN controllers (CSC) capability triplet included in an Open Message;

receiving a request for growing shortest path tree (SPT) (GSReq);

computing a path segment in the SDN for use in creating an end-to-end (E2E) tunnel in response to the GSReq;

growing a SPT based on the computed path segment and in response to the GSReq;

receiving a first request to create a first tunnel segment; and creating a first tunnel segment corresponding to the path segment in the SDN, wherein the first tunnel segment forms a portion of the E2E tunnel in response to the request to create the first tunnel segment.

15. The method of claim 14, further comprising transmitting a second request to create a second tunnel segment to a controller of an upstream domain along a path of the E2E tunnel.

16. The method of claim 14, further comprising:

creating the first tunnel segment corresponding to the path segment in the SDN automatically after a shortest path from a source of the E2E tunnel to a destination of the E2E tunnel is computed; and transmitting a request to create a second tunnel segment to a controller of an upstream domain along a path of the E2E tunnel.

17. The method of claim 14, further comprising receiving an advertisement message indicating connections and accesses of a domain in the SDN.

\* \* \* \* \*